United States Patent [19]
Arnold et al.

[11] Patent Number: 6,154,549
[45] Date of Patent: Nov. 28, 2000

[54] METHOD AND APPARATUS FOR PROVIDING SOUND IN A SPATIAL ENVIRONMENT

[75] Inventors: Glenn Arnold, Knoxville, Tenn.; Daniel Bates, Culver City, Calif.

[73] Assignee: Extreme Audio Reality, Inc., Secaucus, N.J.

[21] Appl. No.: 08/851,103

[22] Filed: May 2, 1997

Related U.S. Application Data

[63] Continuation-in-part of application No. 08/665,515, Jun. 18, 1996.

[51] Int. Cl.[7] .................................................. G10H 7/00
[52] U.S. Cl. .......................... 381/104; 381/59; 381/77; 704/206
[58] Field of Search ................... 84/723, 741; 381/59, 381/77, 104; 704/206

[56] References Cited

U.S. PATENT DOCUMENTS

| | | |
|---|---|---|
| 4,121,058 | 10/1978 | Jusko et al. . |
| 4,524,451 | 6/1985 | Watanabe . |
| 4,525,855 | 7/1985 | Willcocks . |
| 4,532,647 | 7/1985 | Willcocks . |
| 4,807,217 | 2/1989 | Ide . |
| 5,043,970 | 8/1991 | Holman . |
| 5,181,249 | 1/1993 | Schiller . |
| 5,216,718 | 6/1993 | Fukuda . |
| 5,222,059 | 6/1993 | Holman . |
| 5,339,363 | 8/1994 | Fosgate . |
| 5,341,430 | 8/1994 | Aulia et al. . |
| 5,371,799 | 12/1994 | Lowe et al. . |
| 5,386,082 | 1/1995 | Higashi ................................ 84/630 |
| 5,406,634 | 4/1995 | Anderson et al. ..................... 381/82 |
| 5,487,113 | 1/1996 | Mark et al. . |
| 5,500,900 | 3/1996 | Chen et al. . |
| 5,521,981 | 5/1996 | Gehring . |
| 5,524,054 | 6/1996 | Spille . |
| 5,579,396 | 11/1996 | Iida et al. . |

Primary Examiner—David R. Hudspeth
Assistant Examiner—Daniel Abebe
Attorney, Agent, or Firm—Coudert Brothers

[57] ABSTRACT

A method and apparatus for providing sound in a spatial environment is provided. Control is provided over the perceived position of sound sources, including perceived positions behind the listener or listeners. The invention is effective for multiple simultaneous listeners distributed throughout the spatial environment. The invention provides techniques for real-time interaction with graphic images, computer game controls, or other computer-based events. The invention provides control over the relative amplitude of signals provided to each of a plurality of spatially diverse transducers. By controlling the relative amplitudes of signals applied to each of the transducers, the present invention provides control over the perceived position of sound sources in a spatial environment with respect to one or more listeners. Attenuation parameters may be stored in a table, indexed by the spatial region to which they apply, and used to adjust the relative amplitude of each of the transducers used to produce a sound.

44 Claims, 28 Drawing Sheets

METHOD AND APPARATUS FOR PROVIDING SOUND IN A SPATIAL ENVIRONMENT

This is a continuation-in-part of application Ser. No. 08/665,515, filed Jun. 18, 1996.

BACKGROUND OF THE INVENTION

1. Field of the Invention

The present invention relates to a method and apparatus for providing and controlling sound in a spatial environment.

2. Background Art

When hearing sounds, people can hear not only information about the sounds themselves, but also about the locations of the sound sources producing the sounds. Often, however, systems for producing or reproducing sound cannot accurately convey the same senses of direction and position. Thus, a system is needed that can create the perception of sound sources being located in different places than the loudspeakers being used to provide the sound as well as the perception that the sound sources are moving with respect to the listener.

Humans derive much information about their environment from their sense of hearing. Even when one is deprived of other sensory inputs, one can obtain a good understanding of one's surroundings through hearing alone. One can sense direction, distance, amplitude, spectral content, and timing of sound sources. Such parameters are meaningful when they relate to an actual source sound that is physically located at a specific location.

However, it is often desirable to simulate sound sources and their locations. One example involves reproduction of sound. A recording may be made of an orchestra playing music. Since different instruments are located at different locations within the orchestra, it is important to convey the same sense of position during playback in order to achieve faithful reproduction.

Another example involves synthesis of sound that is intended to convey the same parameters that are sensed from actual sound sources. An attempt may be made to create the sense that a bumble bee or a helicopter is flying by the listener. Ideally, it would be possible to convey the sense that sound is originating from one or more locations around a listener. Since sound sources would be perceived to exist but would not require actual sound generating means to be at the same place the sound seems to be originating, such sound sources are referred to as apparent sound sources.

Initial attempts at synthesizing and reproducing sound were monophonic. Since sound was generated from a single loudspeaker located at a single location, the sound was perceived as coming from that single location, not the potentially many locations of the original sound sources. Thus, monophonic techniques lost all information relating to the position of the original sound sources.

To provide some sense of position, stereophonic reproduction was developed. For a stereophonic recording, two microphones were spaced horizontally and positioned in front of the original sound sources, for example, the instruments in an orchestra. Two separate recordings were made, one from each microphone. These two separate recordings were then played back over separate loudspeakers separated horizontally by some distance. When adjusted properly, the perceived locations of the individual sound sources would lie along a line segment between the two loudspeakers. As long as the locations of the original sound sources were along such a line segment, and assuming the two microphones had been positioned correctly, the positions of the perceived sound sources would roughly correspond to the positions of the original sound sources. However, actual sound sources are rarely constrained to such specific configurations. Thus, stereophonic techniques cannot accurately convey the position information associated with most configurations of original sound sources.

Attempts were also made to reproduce sound using quadraphonic techniques. Quadraphonic techniques record sound signals received from four microphones. The four sound signals are denoted left front, right front, left rear, and right rear. As with stereophonic techniques, two separate channels are used for the left front and right front sound signals. The left rear and right rear sound signals are modulated onto the left front and right front sound signals, respectively, and recorded on the same two channels used to record the left front and right front signals. By using only two recording channels, the quadraphonic techniques maintain backwards compatibility with stereophonic techniques. To reproduce sound, the two channels are played back, and the left rear and right rear signals are demodulated. The resulting four sound signals are fed to four loudspeakers to attempt to convey meaningful position information. However, quadraphonic recording techniques do not provide interactive control of the position information that the techniques are attempting to convey. There is no provision for interactive control in conjunction with synthesized images or computer-based game controls. Moreover, the requirement for four separate sound signals has traditionally hindered synthesis of sounds with controllable position information.

Another sound reproduction technique was developed to provide improved position perception without requiring more than the two (left and right) channels of traditional stereophonic techniques. The technique involves the use of three loudspeakers. Two loudspeakers are positioned in front of a listener and reproduce the left and right sound signals as described in relation to stereophonic techniques. A third loudspeaker is positioned behind the listener. A sound signal that is obtained either by subtracting the right sound signal from the left sound signal or by subtracting the left sound signal from the right sound signal is applied to the third loudspeaker. This sound signal that represents the difference between the left and right sound signals helps enhance position perception. As with quadraphonic techniques, this technique also does not provide interactive control of the position information attempted to be conveyed. There is also no provision for interactive control in conjunction with synthesized images or computer-based game controls. Furthermore, additional circuitry is needed to generate the sound signal representing the difference of the left and right sound signals.

Another attempt at providing sound that creates the impression of surrounding the listener (i.e., surround sound) was made using the three loudspeakers of the above technique in combination with one additional loudspeaker. The additional loudspeaker was a center loudspeaker between the left and right loudspeakers. The center loudspeaker helps reinforce the perception of sound coming from directly in front of a listener. Otherwise, this technique suffers from the same disadvantages as the three loudspeaker technique. A variation on this technique split the left minus right difference signal into two loudspeakers positioned behind the listener. This arguably offered some improvement in position perception, but did not otherwise overcome the disadvantages of the previous technique. Another variation on this technique used frequency dependent masking to convey information. Frequency dependent masking alters the natural audio frequency spectrum and distorts the sound signals being reproduced.

Attempts have also been made to widen the perceived positioning of stereophonic techniques. Some of these attempts have filtered the sound signals and introduced delays in the sound signals. Most of these techniques suffer from the disadvantage that they cannot create the perception that sound is emanating from a source behind the listener. Even those that can arguably cause some sensation that the sound is behind the listener cannot overcome an ambiguity in perceived location for sounds intended to be perceived as originating directly in front of and directly behind the listener (i.e., at azimuth bearings of 0° and 180°). Such techniques generally have the disadvantage of requiring the listener to be perfectly positioned with respect to the loudspeakers in order to achieve the desired perception. Some of these techniques even require specific parameters of the anatomy of the listener's ears to be determined before attempting to provide accurate position perception. These techniques are listener dependent, do not support multiple simultaneous listeners, and must be reconfigured to accommodate different listeners.

Some audio processing equipment utilizes panning controls to set the balance between sound levels generated by multiple loudspeakers. For instance, stereophonic systems often use a panning potentiometer commonly referred to as a balance control to control the relative levels of left and right loudspeakers. Some systems provide a panning potentiometer commonly referred to as a fader to control the relative levels of front and rear loudspeakers. Some sound studio equipment combines these panning controls into a single control mechanism. Nevertheless, such controls do not allow individual control of perceived position information for multiple simultaneous sound sources. Furthermore, such controls do not provide dynamic interaction with graphic images or computer-based game controls. Also, the relationship between gain and potentiometer position is generally fixed, preventing accurate dynamic control of perceived position, particularly for sound signals of widely varying amplitudes.

Thus, disadvantages abound with prior art techniques for attempting to control the perceived position of sound sources.

SUMMARY OF THE INVENTION

The present invention provides a method and apparatus for providing sound in a spatial environment. The present invention allows control over the perceived position of sound sources, including perceived positions behind the listener or listeners. The present invention provides the desired effect for multiple simultaneous listeners distributed throughout the spatial environment. The present invention is independent of particular anatomical parameters of the listeners. The present invention provides techniques for real-time interaction with graphic images, computer game controls, or other computer-based events.

The present invention controls signals representative of sounds from sound sources. The invention controls the relative amplitude of signals provided to each of a plurality of transducers arranged in a distributed manner. Loudspeakers are a common type of transducer with which the present invention may be practiced. By making a particular loudspeaker louder relative to another loudspeaker for a given sound, the perception is created that an apparent sound source corresponding to sounds produced by the loudspeakers is located closer to the louder loudspeaker. Similarly, making a particular loudspeaker relatively softer can make an apparent sound source seem to be farther from that particular loudspeaker. By carefully controlling the relative levels of signals applied to each of the loudspeakers, the present invention provides precise control over the perceived position of sound sources in a spatial environment with respect to one or more listeners.

In one embodiment of the present invention, a spatial environment is defined to include a plurality of spatial regions. Attenuation parameters are values that specify the extent to which sound signals should be made louder or softer. For each region, attenuation parameters are determined that provide adjustment of the amplitude of signals provided to each of a plurality of transducers so as to simulate the sounds that would be produced by a sound source located within that region. The attenuation parameters may be determined mathematically, empirically, or by any other suitable technique. When determining attenuation parameters mathematically, the desired spatial environment may be modelled, the additive effects of multiple power levels or sound pressure levels may be calculated, the parameters for particular regions may be interpolated from parameters for other regions, or other mathematical techniques may be employed. Empirical techniques may also be used. For example, a physical model of a desired spatial environment may be constructed and measurements of acoustic parameters may be made. It is also possible to construct a mathematical framework that is then refined by incorporation of empirical data. Such an approach helps compensate for non-ideal phenomena that are difficult to model mathematically.

Once determined, the attenuation parameters may be stored in a table and indexed by the spatial region to which they apply. When it is desired to produce a sound having an apparent sound source within a particular spatial region, attenuation parameters that relate to that particular region may be obtained from the table. The attenuation parameters may then be used to adjust the relative amplitude of each of the transducers used to produce the sound. The resulting sound is perceived by one or more listeners, who may be situated at various locations either internal to or external to the defined spatial environment, as being produced by a sound source located within the designated region.

DETAILED DESCRIPTION OF THE INVENTION

Figure 1:
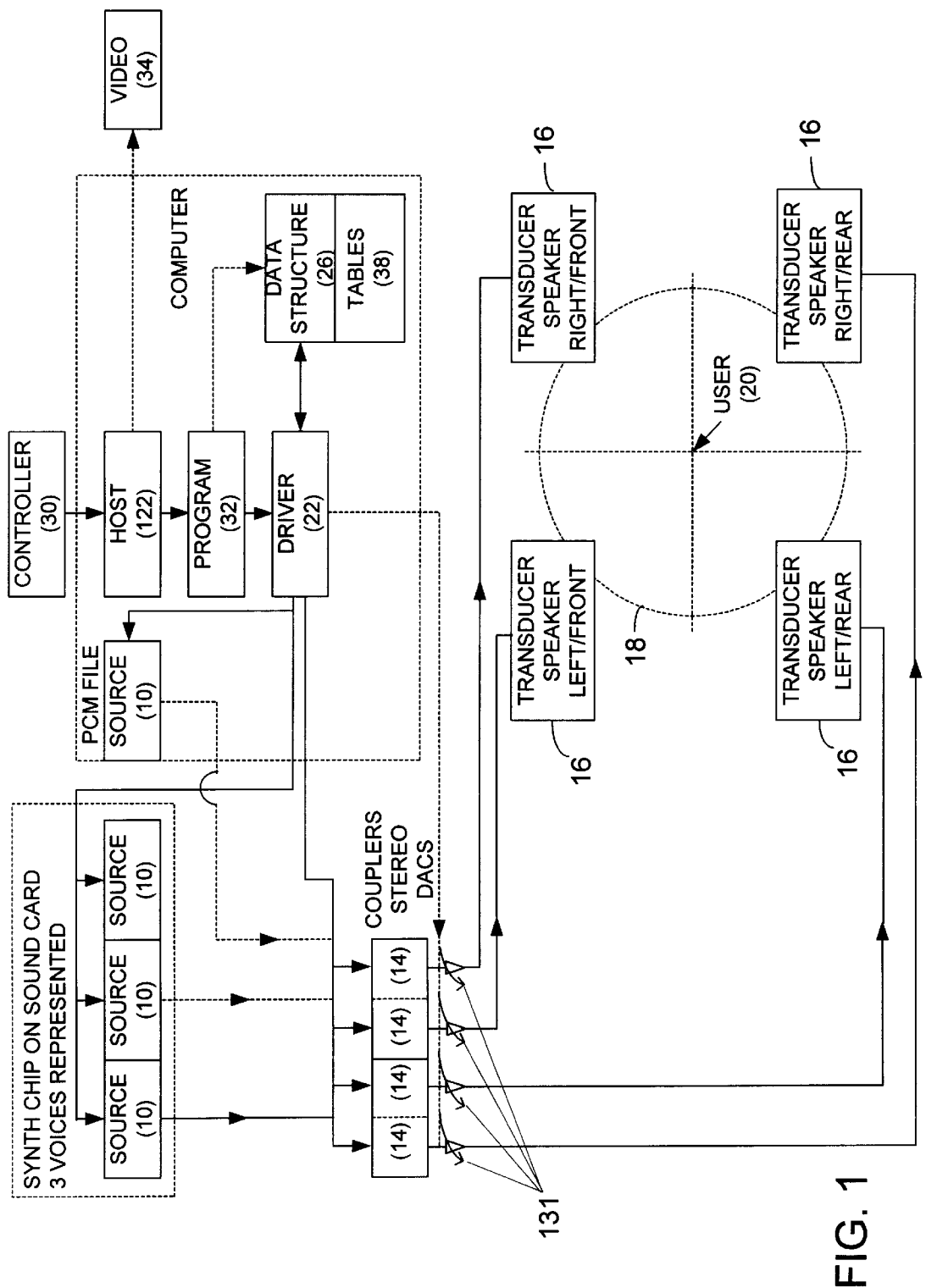
FIG. 1 is a block diagram illustrating one embodiment of a system according to the present invention.

A method and apparatus for providing sound in a spatial environment is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

While listeners typically perceive sounds qualitatively, sound can also be analyzed quantitatively. One quantitative parameter of sound is its sound pressure level. The sound pressure level affects how loud a sound is qualitatively perceived to be. The sound pressure level also can affect the perceived direction and distance toward a sound source. Other parameters that are related to the sound pressure level are the sound power of a sound source and the sound intensity, which is a measure of acoustical energy flux through a defined area. Sound pressure level is often a convenient parameter since it can be easily measured and is a parameter to which ears are sensitive.

Ears can detect very small periodic pressure variations that are interpreted as sound. Ears respond to changes in sound pressure ranging from the threshold of audibility, which varies from person to person, but typically corresponds to a sound pressure amplitude of about $2 \times 10^{-5}$ $N/m^2$ (newtons/meter$^2$) at a frequency of 1000 Hz, to sound pressure amplitude many orders of magnitude greater than that.

To accommodate the wide range of a pressure stimuli to which ears are sensitive, it is convenient to measure sound pressures on a logarithmic scale in units called decibels (dB). Sound pressure level in decibels is defined as:

$$L_p = 20 \log p/p_0.$$

Since this equation for sound pressure level provides a logarithmic expression for p relative to $p_0$, a standard reference value is assigned to $p_0$ to provide an absolute reference for sound pressure level. Since a pressure amplitude of $2 \times 10^{-5}$ $n/m^2$ is the nominal threshold of audibility, it is commonly used as such a standard reference value for $p_0$. The sound pressure level $p_0 = 2 \times 10^{-5}$ $n/m^2$ is assigned a sound pressure decibel level of 0 dB. Expressed in other units, $p_0 = 20$ micropascals = $2 \times 10^{-4}$ dynes/cm$^2$ = $2 \times 10^{-4}$ microbars. (For comparison, atmospheric pressure is $10^5$ $N/m^2$, or $10^6$ microbars). Thus, extremely small variations in air pressure can be detected by the ear. Sound pressure levels may be measured by a sound level meter, comprising a microphone, an amplifier, and a meter calibrated in decibels.

Decibels also provide a convenient technique for logarithmically expressing other acoustic parameters such as sound power level and sound intensity level. Sound power level refers to the total sound power emitted by a source in all directions. Sound power is measured in watts (one watt equals one joule of energy per second or kilograms times meters$^2$ over seconds$^3$). Audible sounds are produced with an extremely small amount of power. Thus, sound power levels are expressed in decibels relative to a picowatt ($10^{-12}$ watt). Sound power level (in decibels) is defined as:

$$L_w = 10 \log W/W_0,$$

where W is the sound power emitted by the source, and the reference power $W_0 = 10^{-12}$ watt.

The relationship between sound pressure level and sound power level depends on several factors, including the geometry of the source and the room. If the sound power level of a source is increased by 10 dB, the sound pressure level also increases by 10 dB, provided everything else remains the same. If a source radiates sound equally in all directions and there are no reflecting surfaces nearby, the sound pressure level decreases by 6 dB each time the distance from the source doubles. Propagation in a free field is illustrated in the Table 1 below:

TABLE 1

ISOTROPIC RADIATION OF SOUND IN FREE SPACE

| DISTANCE | SIL or SPL |
|---|---|
| 0 m | 0 dB |
| 1 m | −11 dB |
| 2 m | −17 dB |
| 4 m | −23 dB |
| 8 m | −29 dB |
| 16 m | −35 dB |
| 32 m | −41 dB |
| 64 m | −47 dB |
| 128 m | −53 dB |
| 256 m | −59 dB |
| 512 m | −65 dB |
| 1024 m | −71 dB |

The decibel is also used to express sound intensity, which is the rate of energy flow across a unit area. The reference for measuring sound intensity level is $I_0=10^{-12}$ watt/m$^2$, and the sound intensity level is defined as:

$$L_I = 10 \log I/I_0.$$

For a free progressive wave in air (e.g., a plane wave traveling down a tube or a spherical wave traveling outward from a source), sound pressure level and sound intensity level are equal ($L_p \approx L_I$). This equality is not always accurate, however, because sound waves from many directions contribute to sound pressure at a point.

When a point source (or any source that radiates equally in all directions) radiates into free space, the intensity of the sound varies as $1/r^2$ (and the source pressure varies as $1/r$), where r is the distance from the source S. This may be understood as a given amount of sound power being distributed over the surface of an expanding sphere with area $4\pi r^2$.

$$I = W/4\pi r^2,$$

where W is the power of the source. An environment in which there are no reflections is called a free field. In a free field, the sound intensity level decreases by 6 dB each time the distance from the source is doubled. The sound intensity level (or sound pressure level) at a distance of one meter from a source in a free field is 11 dB less than the sound power level of the source. This is easily shown as follows:

$$I = \frac{W}{4\pi r^2} = \frac{W}{4\pi r(1)};$$

$$L_I = 10 \log \frac{I}{10^{-12}} = 10 \log \frac{W}{10^{-12}} - 10 \log 4\pi = L_W - 11 \approx L_P$$

Similarly it can be shown that a distance of two meters, $L_I$ is 17 dB less than $L_W$.

It is also possible for a source to be resting on a hard, sound-reflecting surface and radiating hemispherical waves. Under those conditions, the sound intensity level $L_I$ and the sound pressure $L_p$ at a distance of one meter are 8 dB less than the sound power level, once again diminishing by 6 dB each time the distance is doubled. In actual practice, few sound sources radiate sound equally in all directions, and there are often reflecting surfaces nearby that destroy the symmetry of the spherical or hemispherical waves.

Decibels are also useful for expressing signals levels for sound to be produced or reproduced, for example using digital techniques. A digital-to-analog converter (DAC) may be used to convert a digital representation of a sound to an analog representation that may be converted to an acoustic form by a transducer. A DAC takes as an input a digital value and produces as an output an analog electrical signal, for example a voltage or current, corresponding to the digital value. The relationship between the digital value and the analog electrical signal may vary from one type of DAC to another. For example, one type of DAC provides a full output with a 16-bit input having a digital value of 65535 (all bits equal to one). One example of a DAC of this type reduces its analog output voltage by 6 dBV (decibels relative to one volt) each time the digital value at its input is reduced by half. This reduction in analog output voltage also provides a corresponding reduction in power output at transducers that are driven with a signal based on the analog output voltage of the DAC. These relationships are illustrated in Table 2 below:

TABLE 2

| POWER (16-Bit Linear) | POWER (%) | POWER | POWER (dB) | VOLTAGE (V) | VOLTAGE (dBV) |
|---|---|---|---|---|---|
| 65535 FFFFh | 100 | 1 | 0 | 1.0 | 0 |
| 57343 DFFFh | 87.5 | 7/8 | −.58 | 0.935 | −1.16 |
| 49151 BFFFh | 75 | 3/4 | −1.25 | 0.866 | −2.50 |
| 40959 9FFFh | 62.5 | 5/8 | −2.04 | 0.791 | −4.08 |
| 36863 8FFFh | 56.25 | 9/16 | −2.50 | 0.750 | −5.00 |
| 32768 8000h | 50 | 1/2 | −3.01 | 0.707 | −6.02 |
| 24576 6000h | 37.5 | 3/8 | −4.26 | 0.612 | −8.52 |
| 16384 4000h | 25 | 1/4 | −6.02 | 0.500 | −12.04 |
| 12288 3000h | 18.75 | 3/16 | −7.27 | 0.433 | −14.54 |
| 8192 2000h | 12.5 | 1/8 | −9.03 | 0.354 | −18.06 |
| 4096 1000h | 6.25 | 1/16 | −12.04 | 0.250 | −24.08 |
| 0 0000h | 0 | 0 | −∞ | 0 | −∞ |

Much of the development of systems for producing and reproducing sound has been directed toward providing accurate reproduction of spectral components of the sound. These efforts have culminated in the development of digital audio techniques that provide very accurate spectral reproduction and control of spectral components over a bandwidth determined by the sampling rate used. Unfortunately, this emphasis on spectral accuracy has not been accompanied by corresponding developments in the ability to convey audio information useful for perceiving the position of sound sources in a spatial environment with respect to one or more listeners. Thus, during sound reproduction, accurate perception of the original positions of recorded sound sources by one or more listeners over a broad spatial environment is difficult to achieve. During sound synthesis, accurate placement of synthetic sound sources in such an environment has also been difficult.

The present invention provides a method and apparatus for control of perceived position of sound sources in a spatial environment with respect to one or more listeners. The present invention may be practiced with a plurality of spatial environments with either one spatial environment at a given time or with multiple simultaneous spatial environments. The present invention provides the ability to perceptually position multiple simultaneous sound sources in the spatial environments. The present invention also allows perceptually diffuse sound sources to be produced concurrently with sound sources at perceptually discrete locations. The perceptual positioning of sound sources may be dynamically altered to produce the sensation of relative motion between the sound sources and one or more listeners.

The present invention uses a plurality of transducers at spatially diverse locations relative to one or more listeners. The present invention controls the relative amplitudes of signals used to drive the plurality of transducers. By accurately controlling the relative amplitudes, the present invention allows accurate control of the perceived positions of sound sources within a spatial environment with respect to the listeners.

One embodiment of the present invention constructs tables containing attenuation parameters used to control the relative amplitudes of signals for a number of discrete regions defined within a specified spatial environment. Reference is made to the tables for each region within which a sound source is to be perceived as being located. The attenuation parameters are applied to the signals used to drive the transducers so as to effect control over the perceived positions of sound sources whose sounds are represented by the signals.

FIG. 1 is a block diagram illustrating one embodiment of a system according to the present invention. This embodiment comprises a controller 30, a host 12, a video display 34, a program 32, a driver 22, a data structure 26, tables 38, one or more sound sources 10, couplers 14, mixing stage 131, transducers 16, spatial environment 18, and a user 20. Sound sources 10 may be any type of sound source, for example a pulse code modulated (PCM) sound file, a wavetable synthesizer or data, frequency modulation (FM) synthesizer or data. In one embodiment, a sound source may be controlled using any suitable technique, for example, musical instrument digital interface (MIDI), common gateway interface (CGI) script, practical extraction and report language (PERL), hypertext markup language (HTML), compiled source code, executables, or any other suitable technique. Such control may be performed locally in relation to the sound source or may be performed remotely, for example over the internet or another network or communication medium. Sound sources 10 may be controlled by and used in conjunction with host 12. Sound sources 10 provide digital sound data to couplers 14. Couplers 14 may be digital-to-analog converters (DACs), digital line drivers, or some other coupling devices. Couplers 14 provide an output used to drive transducers 16. Transducers 16 convert electrical energy of input signals to acoustic energy representative of the input signals.

Transducers 16 are illustrated as being in the vicinity of spatial environment 18. The actual positioning of transducers 16 may be varied. Individual gain adjustment of the audio signals driving transducers 16 or changes in the attenuation parameters stored in tables 38 may be used to adjust for changes in positioning of transducers 16. Spatial environment 18 is illustrated with user 20 at its center, although user 20 may be at a different location relative to spatial environment 18 or multiple users 20 may be at various locations. All users 20 perceive position of sound sources in relation to their locations relative to spatial environment 18. The size and configuration of spatial environment 18 may be adjusted in an almost infinite number of ways by changing the spacing and placement of transducers 16 and the attenuation parameters stored in tables 38.

In one embodiment of the present invention, driver 22, which may be implemented as software operating on host processor 12, as software operating on a separate processor, or as hardware, receives information from program 32 and controls the operation of sound source 10, couplers 14, mixing stage 131, transducers 16, and other sound subsystem components so as to provide sound as desired. Driver 22 may be configured to accommodate different types of sound sources 10, couplers 14, mixing stages 131, transducers 16, and other sound subsystem components.

Driver 22 controls the amplitude attenuation of the sound produced by each of transducers 16. Driver 22 may effect the attenuation control by subjecting signals representative of sound to attenuation anywhere along the path from program 32 to transducers 16. The attenuation parameters stored in data structure 26 provide reference values by which such amplitude attenuation may be achieved. By applying the correct amplitude attenuation to the sound provided by each of transducers 16, the perceptual locations of each sound source 10 can be controlled within one or more spatial environments. Thus, user 20 is able to derive the sensation of being surrounded by various sound sources located at one or more specific or diffuse locations within one or more spatial environments. With reference to the present invention, attenuation may refer to reduction in amplitude or to modification of amplitude that may include decrease, increase, or both. Thus, by providing what is referred to as attenuation control, the present invention provides the general ability to control the relative amplitudes of a plurality of signals used in conjunction with a plurality of spatially diverse transducers.

Program 32 or host processor 12 may provide an output signal to cause driver 22 to instruct one or more of sound sources 10 to produce any desired sounds at a selected volume level and to cause driver 22 to create the perception that each sound is located at a specific or diffuse location relative to spatial environment 18. Such sound sources 10 are, as an example, shown connected to four couplers 14 which translate signals representative of sounds to the four transducers 16. While four transducers 16 are illustrated, it will be appreciated that the present invention may be practiced with any plural number of transducers 16. Tables 38 and couplers 14 may be selected to provide adequate capacity for the desired number of transducers.

In accordance with one embodiment of the invention, program 32 sends position information regarding the sounds to be produced to driver 22. The position information may specify coordinates in any of many possible formats, for example, two-dimensional Cartesian, three-dimensional Cartesian, polar, cylindrical, spherical, or other well-known geometric coordinate systems. The position information may also specify a particular sector or region defined within the spatial environment. Reference is made to data structure 26 to determine the attenuation parameters that correspond to the specified position information. In one example of a four transducer system, the attenuation parameters include individual attenuation values for each of the left and right, front and rear transducers 16 for dynamically positioning the perceived sound source with respect to the spatial environment. Position information may be designated by program 32, and such position information may be modified by user 20 and controller 30, thereby allowing for interaction between user 20 and the perceived position of the sound sources.

User 20 may operate controller 30. Controller 30 provides an input to host 12. Controller 30 may be a device such as a joystick, a mouse, a gun, a headset, eyeglasses, or some other pointing device, position sensing device, direction sensing device, or control device configured to provide a position or direction signal to host processor 12 or to program 32, which may be operated by host processor 12. Host processor 12 may be a central processing unit (CPU), such as the CPU of a general purpose computer system or the microcontroller of a special purpose computer system, such as a set top box or arcade game. Host 12 provides a video output signal to video display 34. Program 32 may provide control of the video output signal provided to video display 34.

Program 32 represents information used in conjunction with host 12 to configure host 12 to perform the desired operations. Program 32 may be a game program, an application program, or information stored in a read only memory (ROM). When program 32 wishes to produce a sound in a spatial environment, program 32 passes information to driver 22. The information passed from program 32 to driver 22 may include information relating to the sound to be produced and the location at which the sound is intended to be perceived. Driver 22 uses information stored in data structure 26. Data structure 26 comprises tables 38. Each of tables 38 provides attenuation parameters based on desired perceived position for a specific spatial configuration. For example, for a table 38 that relates to a circular spatial configuration surrounding user 20 horizontally, such a table 38 contains attenuation information for each of transducers 16 to produce sound coming from a perceived position at a plurality of angles surrounding user 20.

A plurality of tables 38 may be provided. Some of tables 38 may be provided by default, allowing program 32 to utilize the default tables without having to specifically configure tables 38. However, program 32 may specifically configure one or more of tables 38 to provide desired spatial configurations. Thus, program 32 may use data structure 26 without altering it or may customize data structure 26 as desired.

The invention allows dynamic selection of which of tables 38 is to be used to produce a given sound. Thus, one of tables 38 may be used to produce a given sound at a first time, while another of tables 38 may be used to produce the sound at a later time. As an example, this feature of the invention may be used to alter the sound being produced if a user directs movement from one environment, such as a first room of a computer game, to another environment, such as a second room of a computer game. Since tables 38 may represent various simulated environments, for example a small room, a large room, an open field, a forest, a tunnel, or some other terrestrial or extraterrestrial environment, the invention affords great realism or even surrealism in the production of sounds.

When program 32 passes sound and position information to driver 22, driver 22 references data structure 26 containing tables 38 to determine the correct attenuation parameters corresponding to the position information received from program 32. Having derived the attenuation parameters from tables 38, driver 22 applies the appropriate attenuation to the sound information before sound is produced at transducers 16.

Driver 22 may process the sound information as received from program 32 to apply the correct attenuation. Driver 22 may use the sound information from program 32 to determine one or more sound sources 10 and may apply the appropriate attenuation at sound sources 10. Driver 22 may pass sound information from program 32 to sound sources 10, and sound sources 10 may pass digitized sound data to couplers 14. Alternatively, driver 22 may pass digitized sound data directly to couplers 14. Couplers 14 may be signal processing elements, for example digital to analog converters (DACs). Driver 22 may control couplers 14 to provide the appropriate attenuation at couplers 14. Alternatively, driver 22 may control a mixing stage 131 coupled to the output of couplers 14 so as to provide appropriate attenuation at mixing stage 131.

Analog sound signals may be provided directly from couplers 14 to transducer 16, from mixing stage 131 to transducer 16, or from an additional gain stage following mixer 131 to transducer 16. Transducer 16 may be a plurality of loudspeakers positioned at diverse locations with respect to the spatial environment. In an embodiment with four transducers 16, transducer 16 may be placed in a square configuration where each of transducers 16 is at a vertex of a square. Alternatively, transducer 16 may be oriented in any configuration providing adequate spatial diversity. For example, with four transducers 16, transducer 16 may be positioned at the vertices of a rectangle, a trapezoid, a rhombus, or some other polygonal configuration. Such polygons need not be physically realized in any form, but may be merely imaginary shapes having vertices defined by the position of transducer 16.

The gain or efficiency of transducer 16 may be individually controlled so as to alter or compensate for the physical positioning of transducer 16. Such control over gain or efficiency of individual transducer 16 also allows adjustment of the position of the spatial environments defined according to data structure 26 relative to the physical locations of transducer 16. Thus, the present invention may be readily adapted to any desired listening environment regardless of specific constraints imposed on the physical positioning of transducer 16.

Figure 2:
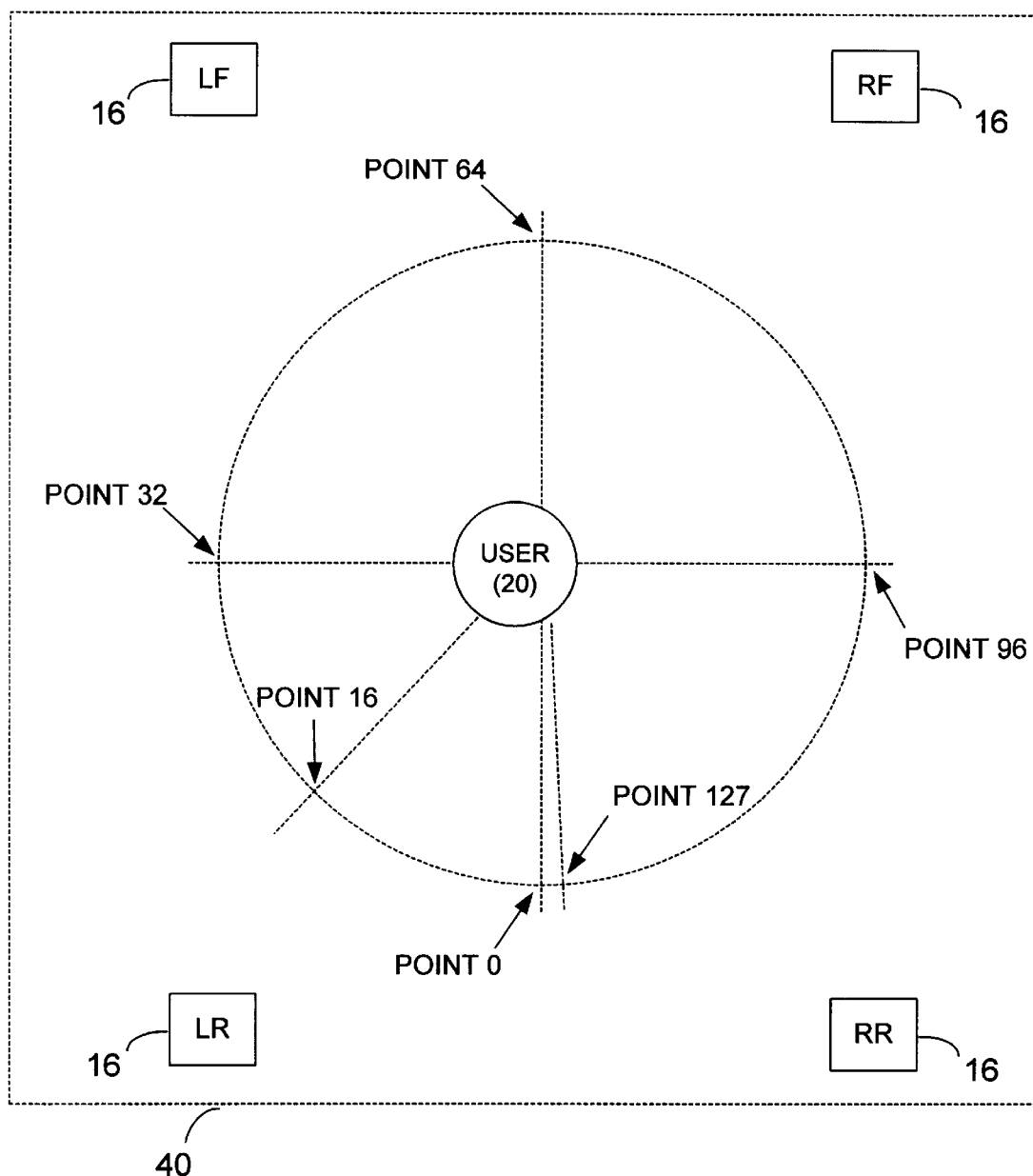
FIG. 2 is a plan view diagram illustrating one example of an embodiment of the present invention for providing sound in a circular spatial environment.

FIG. 2 is a plan view diagram illustrating one example of an embodiment of the present invention for providing sound in a circular spatial environment. The circular spatial environment is preferably defined as a plurality of azimuth bearings surrounding user 20 in a horizontal plane. Transducers 16 are preferably positioned in a square configuration or some other polygonal configuration surrounding user 20. Preferably, the center of the spatial environment being defined should be located approximately central to the polygon whose vertices are defined by the positions of transducer 16. When the invention is practiced with spatial environments for which a center is not readily apparent, the geometric centroid of the spatial environment may be determined and will be understood to be a center or to be located within a central region. Alternatively, efficiency or gain adjustments may be made to transducer 16 so as to position the spatial environment as desired.

In one embodiment of a circular sound environment, 128 points are defined to be equally spaced on an imaginary circle surrounding user 20. In this example, point 64 is oriented directly in front of user 20, point 32 is located directly to the left of user 20, point 96 is located directly to the right of user 20, and point 0 is located directly behind user 20. If a sound is desired to be perceived as coming diagonally from the left and behind the user, for example, at point 16, information is derived from table 38 corresponding to point 16 of the circular spatial environment to provide correct attenuation parameters for the sound produced as transducer 16. Likewise, at table 38 for the circular spatial environment illustrated in FIG. 2 contains attenuation parameters for producing sounds with perceived positions from point 0 to point 127 around the circular spatial environment surrounding user 20.

If the configuration of FIG. 2 is practiced with four transducers 16, the transducers 16 are designated left front (LF), right front (RF), right rear (RR), and left rear (LR). Table 38 corresponding to this circular spatial environment contains attenuation constants for each of the four transducers 16 (LF, RF, RR, LR). An example of a table 38 for a circular spatial environment is set forth in Table 3 below.

The first column of Table 3 specifies a decimal value for the enumerated position in the circular spatial environment. The second column of Table 3 specifies a hexadecimal value representative of attenuation to be applied to the signal provided to a left front transducer 16. The third column of Table 3 specifies a hexadecimal value representative of attenuation to be applied to the signal provided to a right front transducer 16. The fourth column of Table 3 specifies a hexadecimal value representative of attenuation to be applied to the signal provided to a right rear transducer 16. The fifth column of Table 3 specifies a hexadecimal value representative of attenuation to be applied to the signal provided to a left rear transducer 16. The hexadecimal values of the second through fifth columns of Table 3 are based on a linear attenuation curve having a minimum attenuation corresponding to the hexadecimal value 0×FFFF and a maximum attenuation corresponding to the hexadecimal value 0×0000. An attenuation level of 6 dBV down relative to the minimum attenuation level corresponds to a hexadecimal value of 0×8000, and one of 12 dBV down corresponds to 0×4000.

TABLE 3

| Position | LF | RF | RR | LR |
|---|---|---|---|---|
| 000 | 0x07FF | 0x07FF | 0x9D01 | 0xA8D8 |
| 001 | 0x07FF | 0x07FF | 0x987F | 0xB05C |
| 002 | 0x07FF | 0x07FF | 0x941D | 0xB831 |
| 003 | 0x07FF | 0x07FF | 0x8FDA | 0xC05A |
| 004 | 0x07FF | 0x07FF | 0x8BB7 | 0xC8DA |
| 005 | 0x07FF | 0x07FF | 0x87B2 | 0xD1B4 |
| 006 | 0x07FF | 0x07FF | 0x83CA | 0xDAEB |
| 007 | 0x07FF | 0x07FF | 0x07FF | 0xE482 |
| 008 | 0x07FF | 0x07FF | 0x5A3F | 0xE7CA |
| 009 | 0x07FF | 0x07FF | 0x3FFF | 0xEF1D |
| 010 | 0x07FF | 0x07FF | 0x2DBF | 0xEE7B |
| 011 | 0x07FF | 0x07FF | 0x20CB | 0xF1E5 |
| 012 | 0x07FF | 0x07FF | 0x173F | 0xF55A |
| 013 | 0x07FF | 0x07FF | 0x0FFF | 0xF8DA |
| 014 | 0x07FF | 0x07FF | 0x0ABF | 0xFC67 |
| 015 | 0x07FF | 0x07FF | 0x07FF | 0xFFFF |
| 016 | 0x0ABF | 0x07FF | 0x07FF | 0xFC67 |
| 017 | 0x0FFF | 0x07FF | 0x07FF | 0xF8DA |
| 018 | 0x173F | 0x07FF | 0x07FF | 0xF55A |
| 019 | 0x20CB | 0x07FF | 0x07FF | 0xF1E5 |
| 020 | 0x2DBF | 0x07FF | 0x07FF | 0xEE7B |
| 021 | 0x3FFF | 0x07FF | 0x07FF | 0xEB1D |
| 022 | 0x583F | 0x07FF | 0x07FF | 0xE7CA |
| 023 | 0x07FF | 0x07FF | 0x07FF | 0xE482 |
| 024 | 0x83CA | 0x07FF | 0x07FF | 0xDAEB |
| 025 | 0x87B2 | 0x07FF | 0x07FF | 0xD1B4 |
| 026 | 0x8BB7 | 0x07FF | 0x07FF | 0xC8DA |
| 027 | 0x8FDA | 0x07FF | 0x07FF | 0xC05A |
| 028 | 0x941D | 0x07FF | 0x07FF | 0xB831 |
| 029 | 0x987F | 0x07FF | 0x07FF | 0xB05C |
| 030 | 0x9D01 | 0x07FF | 0x07FF | 0xA8D8 |
| 031 | 0xA1A4 | 0x07FF | 0x07FF | 0xA1A4 |
| 032 | 0xA8D8 | 0x07FF | 0x07FF | 0x9D01 |
| 033 | 0xB05C | 0x07FF | 0x07FF | 0x987F |
| 034 | 0xB831 | 0x07FF | 0x07FF | 0x941D |
| 035 | 0xC05A | 0x07FF | 0x07FF | 0x8FDA |
| 036 | 0xC8DA | 0x07FF | 0x07FF | 0x8BB7 |
| 037 | 0xD1B4 | 0x07FF | 0x07FF | 0x87B2 |
| 038 | 0xDAEB | 0x07FF | 0x07FF | 0x83CA |

TABLE 3-continued

| Position | LF | RF | RR | LR |
|---|---|---|---|---|
| 039 | 0xE482 | 0x07FF | 0x07FF | 0x07FF |
| 040 | 0xE7CA | 0x07FF | 0x07FF | 0x5A3F |
| 041 | 0xEB1D | 0x07FF | 0x07FF | 0x3FFF |
| 042 | 0xEE7B | 0x07FF | 0x07FF | 0x2DBF |
| 043 | 0xF1E5 | 0x07FF | 0x07FF | 0x20CB |
| 044 | 0xF55A | 0x07FF | 0x07FF | 0x173F |
| 045 | 0xF8DA | 0x07FF | 0x07FF | 0x0FFF |
| 046 | 0xFC67 | 0x07FF | 0x07FF | 0x0ABF |
| 047 | 0xFFFF | 0x07FF | 0x07FF | 0x07FF |
| 048 | 0xFC67 | 0x0ABF | 0x07FF | 0x07FF |
| 049 | 0xF8DA | 0x0FFF | 0x07FF | 0x07FF |
| 050 | 0xF55A | 0x173F | 0x07FF | 0x07FF |
| 051 | 0xF1E5 | 0x20CB | 0x07FF | 0x07FF |
| 052 | 0xEE7B | 0x2DBF | 0x07FF | 0x07FF |
| 053 | 0xEB1D | 0x3FFF | 0x07FF | 0x07FF |
| 054 | 0x37CA | 0x5A3F | 0x07FF | 0x07FF |
| 055 | 0xE482 | 0x07FF | 0x07FF | 0x07FF |
| 056 | 0xDAEB | 0x83CA | 0x07FF | 0x07FF |
| 057 | 0xD1B4 | 0x87B2 | 0x07FF | 0x07FF |
| 058 | 0xc8DA | 0x8BB7 | 0x07FF | 0x07FF |
| 059 | 0xC05A | 0x8FDA | 0x07FF | 0x07FF |
| 060 | 0xB831 | 0x941D | 0x07FF | 0x07FF |
| 061 | 0x505C | 0x987F | 0x07FF | 0x07FF |
| 062 | 0xA8D8 | 0x9D01 | 0x07FF | 0x07FF |
| 063 | 0xA1A4 | 0xA1A4 | 0x07FF | 0x07FF |
| 064 | 0x9D01 | 0xA8D8 | 0x07FF | 0x07FF |
| 065 | 0x987F | 0xB05C | 0x07FF | 0x07FF |
| 066 | 0x941D | 0xB831 | 0x07FF | 0x07FF |
| 067 | 0x8FDA | 0xC05A | 0x07FF | 0x07FF |
| 068 | 0x8BB7 | 0xC8DA | 0x07FF | 0x07FF |
| 069 | 0x87B2 | 0xD1B4 | 0x07FF | 0x07FF |
| 070 | 0x83CA | 0xDAEB | 0x07FF | 0x07FF |
| 071 | 0x07FF | 0xE482 | 0x07FF | 0x07FF |
| 072 | 0x5A3F | 0xE7CA | 0x07FF | 0x07FF |
| 073 | 0x3FFF | 0xEB1D | 0x07FF | 0x07FF |
| 074 | 0x2DBF | 0xEE7B | 0x07FF | 0x07FF |
| 075 | 0x20CB | 0xF1E5 | 0x07FF | 0x07FF |
| 076 | 0x173F | 0xF55A | 0x07FF | 0x07FF |
| 077 | 0x0FFF | 0xF8DA | 0x07FF | 0x07FF |
| 078 | 0x0ABF | 0xFC67 | 0x07FF | 0x07FF |
| 079 | 0x07FF | 0xFFFF | 0x07FF | 0x07FF |
| 080 | 0x07FF | 0xFC67 | 0x0ABF | 0x07FF |
| 081 | 0x07FF | 0xF8DA | 0x07FF | 0x07FF |
| 082 | 0x07FF | 0xF55A | 0x173F | 0x07FF |
| 083 | 0x07FF | 0xF1E5 | 0x20CB | 0x07FF |
| 084 | 0x07FF | 0xEE7B | 0x2DBF | 0x07FF |
| 085 | 0x07FF | 0xEB1D | 0x3FFF | 0x07FF |
| 086 | 0x07FF | 0xE7CA | 0x5A3F | 0x07FF |
| 087 | 0x07FF | 0xE482 | 0x07FF | 0x07FF |
| 088 | 0x07FF | 0xDAEB | 0x83CA | 0x07FF |
| 089 | 0x07FF | 0xD1B4 | 0x87B2 | 0x07FF |
| 090 | 0x07FF | 0xC8DA | 0x8BB7 | 0x07FF |
| 091 | 0x07FF | 0xC05A | 0x8FDA | 0x07FF |
| 092 | 0x07FF | 0xB831 | 0x941D | 0x07FF |
| 093 | 0x07FF | 0xB05C | 0x987F | 0x07FF |
| 094 | 0x07FF | 0xA8D8 | 0x9D01 | 0x07FF |
| 095 | 0x07FF | 0xA1A4 | 0xA1A4 | 0x07FF |
| 096 | 0x07FF | 0x9D01 | 0xA8D8 | 0x07FF |
| 097 | 0x07FF | 0x987F | 0xB05C | 0x07FF |
| 098 | 0x07FF | 0x941D | 0xB831 | 0x07FF |
| 099 | 0x07FF | 0x8FDA | 0xC05A | 0x07FF |
| 100 | 0x07FF | 0x87B2 | 0xC8Da | 0x07FF |
| 101 | 0x07FF | 0x87B2 | 0xD1B4 | 0x07FF |
| 102 | 0x07FF | 0x83CA | 0xDAEB | 0x07FF |
| 103 | 0x07FF | 0x7FFF | 0xE482 | 0x07FF |
| 104 | 0x07FF | 0x5A3F | 0xE7CA | 0x07FF |
| 105 | 0x07FF | 0x3FFF | 0xEB1D | 0x07FF |
| 106 | 0x07FF | 0x2DBF | 0xEE7B | 0x07FF |
| 107 | 0x07FF | 0x20CB | 0xF1E5 | 0x07FF |
| 108 | 0x07FF | 0x173F | 0xF55A | 0x07FF |
| 109 | 0x07FF | 0x07FF | 0xF8DA | 0x07FF |
| 110 | 0x07FF | 0x0ABF | 0xFC67 | 0x07FF |
| 111 | 0x07FF | 0x07FF | 0xFFFF | 0x07FF |
| 112 | 0x07FF | 0x07FF | 0xFC67 | 0x0ABF |
| 113 | 0x07FF | 0x07FF | 0xF8DA | 0x07FF |
| 114 | 0x07FF | 0x07FF | 0xF55A | 0x173F |
| 115 | 0x07FF | 0x07FF | 0xF1E5 | 0x20CB |

TABLE 3-continued

| Position | LF | RF | RR | LR |
|---|---|---|---|---|
| 116 | 0x07FF | 0x07FF | 0xEE7B | 0x2DBF |
| 117 | 0x07FF | 0x07FF | 0xEB1D | 0x3FFF |
| 118 | 0x07FF | 0x07FF | 0xE7CA | 0x5A3F |
| 119 | 0x07FF | 0x07FF | 0xE482 | 0x7FFF |
| 120 | 0x07FF | 0x07FF | 0xDAEB | 0x83CA |
| 121 | 0x07FF | 0x07FF | 0xD1B4 | 0x87B2 |
| 122 | 0x07FF | 0x07FF | 0xC8DA | 0x8BB7 |
| 123 | 0x07FF | 0x07FF | 0xC05A | 0x8FDA |
| 124 | 0x07FF | 0x07FF | 0xB831 | 0x941D |
| 125 | 0x07FF | 0x07FF | 0xB05C | 0x987F |
| 126 | 0x07FF | 0x07FF | 0xA8DA | 0x9D01 |
| 127 | 0x07FF | 0x07FF | 0xA1A4 | 0xA1A4 |

The correspondence between the desired attenuation levels for each defined region and the value used to program the sound subsystem (which appears in hexadecimal in the Table 3) may depend upon the type of sound subsystem used. To obtain the exemplary values provided in Table 3, which are suitable for a linear DAC, dBV values may be converted to linear values by dividing by −20 and raising 10 to the resulting value. This yields the antilogarithm, which corresponds to a linear scale. The final value may be expressed in hexadecimal (as in Table 3), decimal, or any other base or numerical convention.

As a general solution over a limited range for any DAC, a polynomial may be determined that will provide a curve fitting a plurality of data points that correspond to known pairs of values expressing desired sound level and DAC values. For example, if x represents the sound attenuation level in dBV and y represents the 16-bit value to be used to control the gain or attenuation of the DAC, and if known data points, expressed as (x, y), are (0, 65535), (6, 32768), (12, 16384), (24, 4096), (30, 2048), then a fourth-order polynomial can be solved to provide a curve over the range 0–30 dBV. The polynomial is of the form $ax^4+bx^3+cx^2+dx+e=y$. When solved using conventional techniques, for example linear algebra using Gaussian elimination, the variables are found to have the following values: $a \approx 0.10533$, $b \approx -9.9542$, $c \approx -380.17$, $d \approx -7406.6$, and $e=65535$. Polynomials may be solved for other types of DACs, higher or lower order polynomials may be used, and different numbers of data points may be used.

Figure 3:
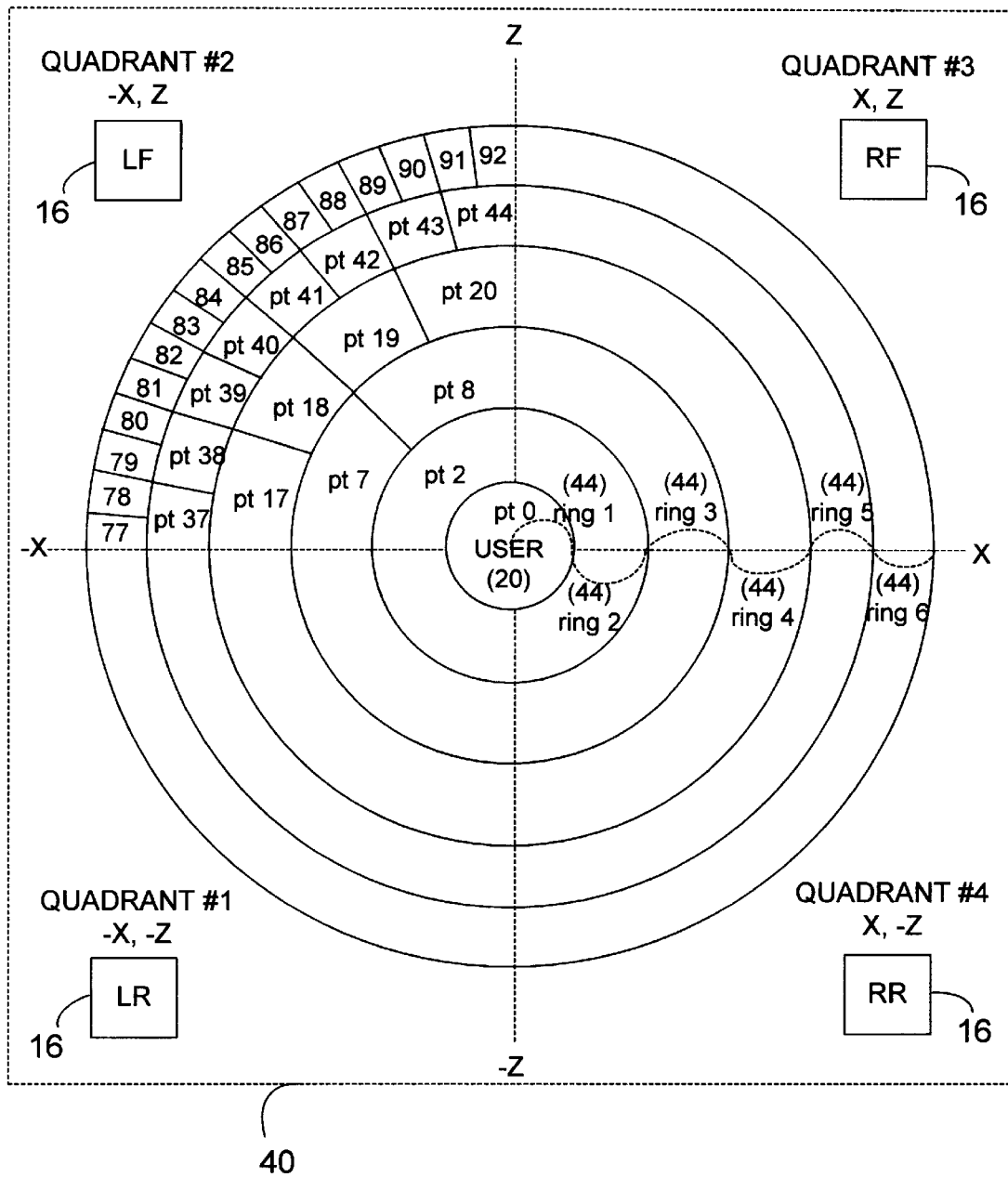
FIG. 3 is a plan view diagram illustrating one embodiment of the present invention having a circular spatial environment where the apparent position of sound sources can be controlled both angularly and radially.

FIG. 3 is a plan view diagram illustrating one embodiment of the present invention having a circular spatial environment where the apparent position of sound sources can be controlled both angularly and radially. To provide control over the radial position of the perceived sound source, the embodiment illustrated in FIG. 3 designates a plurality of rings 44. The innermost ring 44, which is referred to as ring 1, specifies a single point, known as point 0, or a small area approximately central to the spatial environment. The second of rings 44 known as ring 2, surrounds the ring known as ring 1. Likewise, a ring know as ring 3 surrounds ring 2 and a ring known as ring 4 surrounds ring 3. Ring 5 surrounds ring 4 and ring 6 surrounds ring 5. Rings 44 are divided angularly into a plurality of sectors. These sectors are in one example numbered from 0 to 124. Sector 0 includes all of ring 1. Ring 2 is divided into four sectors, sectors 1–4. Ring 3 is divided into 8 sectors, sectors 5–12. Ring 4 is divided into 16 sectors, sectors 13–28. Ring 5 is divided into 32 sectors, sectors 29–60. Ring 6 is divided into 64 sectors, sector 61–124. Each sector is defined as all points having a radius between two fixed values and a azimuth position between two fixed angular values.

The table 38 corresponding to the spatial environment illustrated in FIG. 3 contains attenuation parameters for each of the sectors defined as illustrated in FIG. 3. If program 32 passes position information to driver 22 corresponding to the spatial environment illustrated in FIG. 3, driver 22 uses the position information to determine the sector in which a sound source is desired to be perceived. When the appropriate sector is identified, the attenuation parameters from the corresponding table 38 are used to attenuate the sound signals provided to each of transducer 16 so as to produce the sensation that a sound source is located within the desired sector.

Various attenuation parameters may be used in conjunction with the spatial environment illustrated in FIG. 3. For example, attenuation parameters may be selected so as to provide a constant total power from all transducers 16. By maintaining constant power independent of position, the relative amplitude of the sound remains the same regardless of position. Such attenuation parameters are particularly useful if it is desired to maintain a specific amplitude level and to allow sounds to have a wide dynamic range regardless of the desired placement of the sound sources. A table 38 for such attenuation parameters for the spatial environment illustrated in FIG. 3 is set forth in Table 4 below.

The first column of Table 4 specifies a decimal value for the enumerated position in the spatial environment. The second column of Table 4 specifies a hexadecimal value representative of attenuation to be applied to the signal provided to a left front transducer 16. The third column of Table 4 specifies a hexadecimal value representative of attenuation to be applied to the signal provided to a right front transducer 16. The fourth column of Table 4 specifies a hexadecimal value representative of attenuation to be applied to the signal provided to a right rear transducer 16. The fifth column of Table 4 specifies a hexadecimal value representative of attenuation to be applied to the signal provided to a left rear transducer 16. The hexadecimal values of the second through fifth columns of Table 4 are based on a linear attenuation curve having a minimum attenuation corresponding to the hexadecimal value 0xFFFF and a maximum attenuation corresponding to the hexadecimal value 0x0000. An attenuation level of 6 dBV down relative to the minimum attenuation level corresponds to a hexadecimal value of 0x8000, and one of 12 dBV down corresponds to 0x4000.

TABLE 4

| Position | LF | RF | RR | LR |
|---|---|---|---|---|
| 000 | 0x71E2 | 0x71E2 | 0x71E2 | 0x71E2 |
| 001 | 0x6B6F | 0x5A3F | 0x6B6F | 0x87B2 |
| 002 | 0x87B2 | 0x6B6F | 0x5A3F | 0x6B6F |
| 003 | 0x6B6F | 0x87B2 | 0x6B6F | 0x5A3F |
| 004 | 0x5A3F | 0x6B6F | 0x87B2 | 0x6B6F |
| 005 | 0x5068 | 0x5068 | 0x87B2 | 0x87B2 |
| 006 | 0x71E2 | 0x3FFF | 0x71E2 | 0x941D |
| 007 | 0x87B2 | 0x5068 | 0x5068 | 0x87B2 |
| 008 | 0x941D | 0x71E2 | 0x3FFF | 0x71E2 |
| 009 | 0x87B2 | 0x87B2 | 0x5068 | 0x5068 |
| 010 | 0x71E2 | 0x941D | 0x71E2 | 0x3FFF |
| 011 | 0x5068 | 0x87B2 | 0x87B2 | 0x5068 |
| 012 | 0x3FFF | 0x71E2 | 0x941D | 0x71E2 |
| 013 | 0x331F | 0x331F | 0x941D | 0x941D |
| 014 | 0x331F | 0x331F | 0x5FA2 | 0xC5FB |
| 015 | 0x331F | 0x331F | 0x331F | 0xDE13 |
| 016 | 0x5FA2 | 0x331F | 0x331F | 0xC5FB |
| 017 | 0x941D | 0x331F | 0x331F | 0x941D |
| 018 | 0xC5FB | 0x331F | 0x331F | 0x5FA2 |
| 019 | 0xDE13 | 0x331F | 0x331F | 0x331F |
| 020 | 0xC5FB | 0x5FA2 | 0x331F | 0x331F |
| 021 | 0x941D | 0x941D | 0x331F | 0x331F |
| 022 | 0x5FA2 | 0xC5FB | 0x331F | 0x331F |

TABLE 4-continued

| Position | LF | RF | RR | LR |
|---|---|---|---|---|
| 023 | 0x331F | 0xDE13 | 0x331F | 0x331F |
| 024 | 0x331F | 0xC5FB | 0x5FA2 | 0x331F |
| 025 | 0x331F | 0x941D | 0x941D | 0x331F |
| 026 | 0x331F | 0x5FA2 | 0xC5FB | 0x331F |
| 027 | 0x331F | 0x331F | 0xDE13 | 0x331F |
| 028 | 0x331F | 0x331F | 0xC5FB | 0x5FA2 |
| 029 | 0x1A22 | 0x1A22 | 0xA8D8 | 0xA8D8 |
| 030 | 0x1A22 | 0x1A22 | 0x7F10 | 0xB987 |
| 031 | 0x1A22 | 0x1A22 | 0x5FA2 | 0xCBC4 |
| 032 | 0x1A22 | 0x1A22 | 0x31B8 | 0xDCCE |
| 033 | 0x1A22 | 0x1A22 | 0x1A22 | 0xEF29 |
| 034 | 0x31B8 | 0x1A22 | 0x1A22 | 0xDCCE |
| 035 | 0x5FA2 | 0x1A22 | 0x1A22 | 0xCBC4 |
| 036 | 0x7F10 | 0x1A22 | 0x1A22 | 0xB987 |
| 037 | 0xA8D8 | 0x1A22 | 0x1A22 | 0xA8D8 |
| 038 | 0xB987 | 0x1A22 | 0x1A22 | 0x7F10 |
| 039 | 0xCBC4 | 0x1A22 | 0x1A22 | 0x5FA2 |
| 040 | 0xDCCE | 0x1A22 | 0x1A22 | 0x31B8 |
| 041 | 0xEF29 | 0x1A22 | 0x1A22 | 0x1A22 |
| 042 | 0xDCCE | 0x31B8 | 0x1A22 | 0x1A22 |
| 043 | 0xCBC4 | 0x5FA2 | 0x1A22 | 0x1A22 |
| 044 | 0xB987 | 0x7F10 | 0x1A22 | 0x1A22 |
| 045 | 0xA8D8 | 0xA8D8 | 0x1A22 | 0x1A22 |
| 046 | 0x7F10 | 0xB987 | 0x1A22 | 0x1A22 |
| 047 | 0x5FA2 | 0xCBC4 | 0x1A22 | 0x1A22 |
| 048 | 0x31B8 | 0xDCCE | 0x1A22 | 0x1A22 |
| 049 | 0x1A22 | 0xEF29 | 0x1A22 | 0x1A22 |
| 050 | 0x1A22 | 0xDCCE | 0x31B8 | 0x1A22 |
| 051 | 0x1A22 | 0xCBC4 | 0x5FA2 | 0x1A22 |
| 052 | 0x1A22 | 0xB987 | 0x7F10 | 0x1A22 |
| 053 | 0x1A22 | 0xA8D8 | 0xA8D8 | 0x1A22 |
| 054 | 0x1A22 | 0x7F10 | 0xB987 | 0x1A22 |
| 055 | 0x1A22 | 0x5FA2 | 0xCBC4 | 0x1A22 |
| 056 | 0x1A22 | 0x31B8 | 0xDCCe | 0x1A22 |
| 057 | 0x1A22 | 0x1A22 | 0xEF29 | 0x1A22 |
| 058 | 0x1A22 | 0x1A22 | 0xDCCE | 0x31B8 |
| 059 | 0x1A22 | 0x1A22 | 0xCBC4 | 0x5FA2 |
| 060 | 0x1A22 | 0x1A22 | 0xB987 | 0x7F10 |
| 061 | 0x07FF | 0x07FF | 0xA1A4 | 0xA1A4 |
| 062 | 0x07FF | 0x07FF | 0x987F | 0xB05C |
| 063 | 0x07FF | 0x07FF | 0x8FDA | 0xC05A |
| 064 | 0x07FF | 0x07FF | 0x87B2 | 0xD1B4 |
| 065 | 0x07FF | 0x07FF | 0x07FF | 0xE482 |
| 066 | 0x07FF | 0x07FF | 0x3FFF | 0xEB1D |
| 067 | 0x07FF | 0x07FF | 0x20CB | 0xF1E5 |
| 068 | 0x07FF | 0x07FF | 0x07FF | 0xF8DA |
| 069 | 0x07FF | 0x07FF | 0x07FF | 0xFFFF |
| 070 | 0x0FFF | 0x07FF | 0x07FF | 0xF8DA |
| 071 | 0x0FFF | 0x07FF | 0x07FF | 0xF8DA |
| 072 | 0x3FFF | 0x07FF | 0x07FF | 0xEB1D |
| 073 | 0x07FF | 0x07FF | 0x07FF | 0xE482 |
| 074 | 0x87B2 | 0x07FF | 0x07FF | 0xD1B4 |
| 075 | 0x8FDA | 0x07FF | 0x07FF | 0xC05A |
| 076 | 0x987F | 0x07FF | 0x07FF | 0xB05C |
| 077 | 0xA1A4 | 0x07FF | 0x07FF | 0xA1A4 |
| 078 | 0xB05C | 0x07FF | 0x07FF | 0x987F |
| 079 | 0xC05A | 0x07FF | 0x07FF | 0x8FDA |
| 080 | 0xD1B4 | 0x07FF | 0x07FF | 0x87B2 |
| 081 | 0xE482 | 0x07FF | 0x07FF | 0x7FFF |
| 082 | 0xEB1D | 0x07FF | 0x07FF | 0x3FFF |
| 083 | 0xF1E5 | 0x07FF | 0x07FF | 0x20CB |
| 084 | 0xF8Da | 0x07FF | 0x07FF | 0x0FFF |
| 085 | 0xFFFF | 0x07FF | 0x07FF | 0x07FF |
| 086 | 0xF8Da | 0x0FFF | 0x07FF | 0x07FF |
| 087 | 0xF1E5 | 0x20CB | 0x07FF | 0x07FF |
| 088 | 0xEB1D | 0x3FFF | 0x07FF | 0x07FF |
| 089 | 0xE482 | 0x7FFF | 0x07FF | 0x07FF |
| 090 | 0xD1B4 | 0x77B2 | 0x07FF | 0x07FF |
| 091 | 0xC05A | 0x8FDA | 0x07FF | 0x07FF |
| 092 | 0xB05C | 0x987F | 0x07FF | 0x07FF |
| 093 | 0xA1A4 | 0xA1A4 | 0x07FF | 0x07FF |
| 094 | 0x987F | 0xB05C | 0x07FF | 0x07FF |
| 095 | 0x8FDA | 0xC05A | 0x07FF | 0x07FF |
| 096 | 0x87B2 | 0xD1B4 | 0x07FF | 0x07FF |
| 097 | 0x7FFF | 0xE482 | 0x07FF | 0x07FF |
| 098 | 0x3FFF | 0xEB1D | 0x07FF | 0x07FF |
| 099 | 0x20CB | 0xF1E5 | 0x07FF | 0x07FF |
| 100 | 0x0FFF | 0xF8DA | 0x07FF | 0x07FF |
| 101 | 0x07FF | 0xFFFF | 0x07FF | 0x07FF |
| 102 | 0x07FF | 0xF8DA | 0x0FFF | 0x07FF |
| 103 | 0x07FF | 0xF1E5 | 0x20CB | 0x07FF |
| 104 | 0x07FF | 0xEB1D | 0x3FFF | 0x07FF |
| 105 | 0x07FF | 0xE482 | 0x7FFF | 0x07FF |
| 106 | 0x07FF | 0xD1B4 | 0x87B2 | 0x07FF |
| 107 | 0x07FF | 0xC05A | 0x8FDA | 0x07FF |
| 108 | 0x07FF | 0xB05C | 0x987F | 0x07FF |
| 109 | 0x07FF | 0xA1A4 | 0xA1A4 | 0x07FF |
| 110 | 0x07FF | 0x987F | 0xB05C | 0x07FF |
| 111 | 0x07FF | 0x8FDA | 0xC05A | 0x07FF |
| 112 | 0x07FF | 0x87B2 | 0xD1B4 | 0x07FF |
| 113 | 0x07FF | 0x07FF | 0xE482 | 0x07FF |
| 114 | 0x07FF | 0x3FFF | 0xEB1D | 0x07FF |
| 115 | 0x07FF | 0x20CB | 0xF185 | 0x07FF |
| 116 | 0x07FF | 0x07FF | 0xFFFF | 0x07FF |
| 117 | 0x07FF | 0x07FF | 0xFFFF | 0x07FF |
| 118 | 0x07FF | 0x07FF | 0xF8Da | 0x0FFF |
| 119 | 0x07FF | 0x07FF | 0xF1E5 | 0x20CB |
| 120 | 0x07FF | 0x07FF | 0xEB1D | 0x3FFF |
| 121 | 0x07FF | 0x07FF | 0xE482 | 0x7FFF |
| 122 | 0x07FF | 0x07FF | 0xD1B4 | 0x87B2 |
| 123 | 0x07FF | 0x07FF | 0xC05A | 0x8FDA |
| 124 | 0x07FF | 0x07FF | 0xB05C | 0x987F |

Other attenuation parameters may be used with the spatial environment illustrated in FIG. 3. For example, attenuation parameters may be configured so as to result in greater amplitude and corresponding sound pressure level for sounds perceived as being closer to user 20 and lesser in amplitude and corresponding sound pressure level for sounds perceived as being farther from user 20. In such case, the sound pressure level decreases with increasing radius from the user 20. The relationship between radius and sound pressure level may be adjusted to provide the desired psychoacoustic effects.

Figure 5:
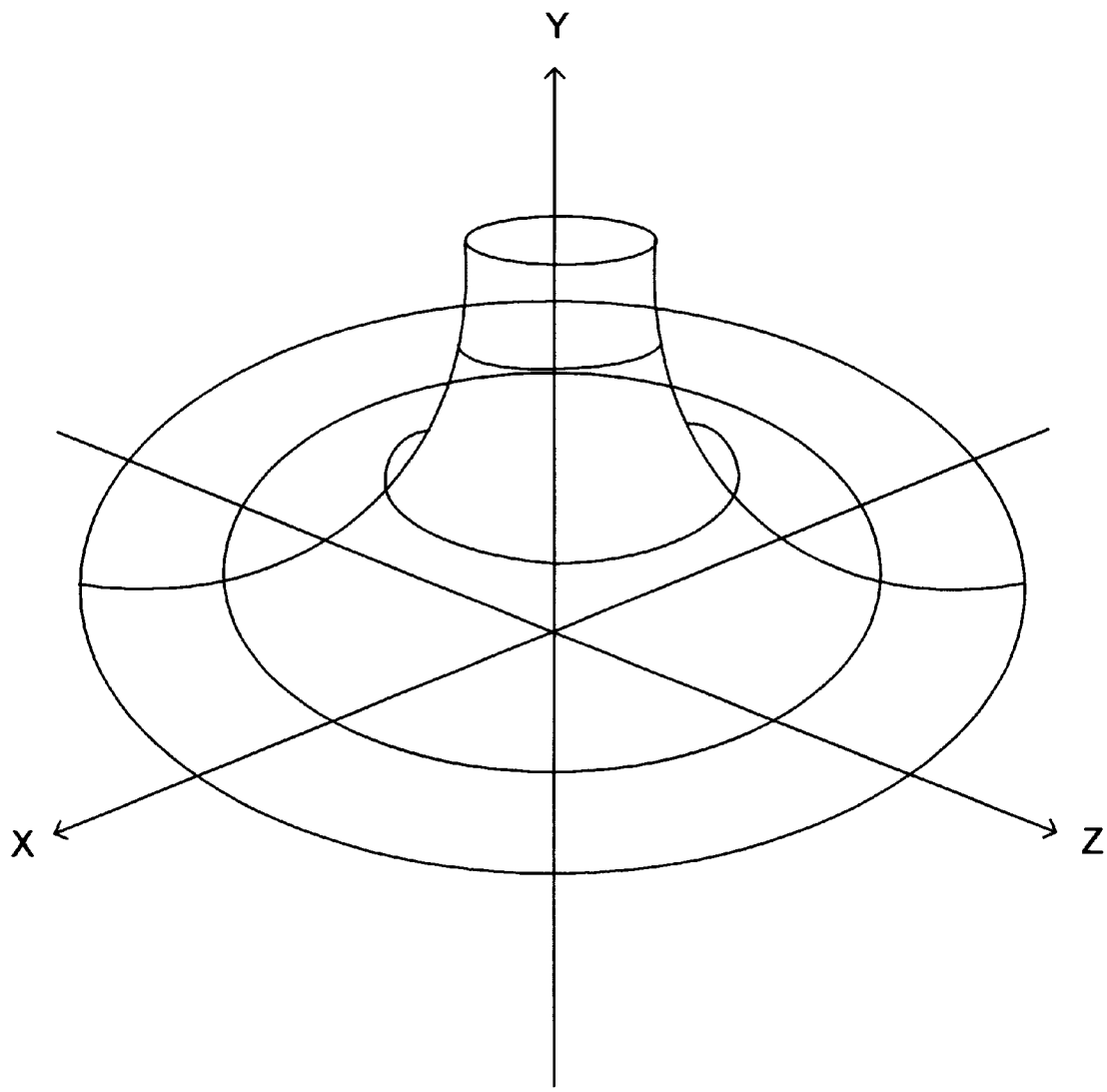
FIG. 5 is a three-dimensional diagram illustrating sound pressure levels with respect to perceived position in a circular spatial environment for one example of an acoustic effect produced by selecting attenuation parameters that result in a sound pressure level varying with radius.

FIG. 5 is a three-dimensional diagram illustrating sound pressure levels with respect to perceived position in a circular spatial environment for one example of an acoustic effect produced by selecting attenuation parameters that result in a sound pressure level varying with radius. A plane defined by the x and z axis represents a spatial environment, for example the circular spatial environment illustrated in FIG. 3. If the circular spatial environment of FIG. 3 is used, point 0 in ring 1 is represented by the intersection of the x axis and z axis. The y axis represents the sound pressure level for each spatial position in the (x, z) plane. Thus, for the attenuation parameters represented by the 3 dimensional graph of FIG. 5, sound sources have a higher sound pressure level when nearer to the y axis and a lower sound pressure level as there radius in the (x, z) plane increases. Table 5 below provides an example of attenuation parameters that may be used to provide increased sound pressure level with decreased radius and decreased sound pressure level with increased radius.

The first column of Table 5 specifies a decimal value for the enumerated position in the spatial environment. The second column of Table 5 specifies a hexadecimal value representative of attenuation to be applied to the signal provided to a left front transducer 16. The third column of Table 5 specifies a hexadecimal value representative of attenuation to be applied to the signal provided to a right front transducer 16. The fourth column of Table 5 specifies a hexadecimal value representative of attenuation to be applied to the signal provided to a right rear transducer 16. The fifth column of Table 5 specifies a hexadecimal value representative of attenuation to be applied to the signal provided to a left rear transducer 16. The hexadecimal values of the second through fifth columns of Table 5 are based on a linear attenuation curve having a minimum attenuation corresponding to the hexadecimal value 0×FFFF and a maximum attenuation corresponding to the hexadecimal value 0×0000. An attenuation level of 6 dBV down relative to the minimum attenuation level corresponds to a hexadecimal value of 0×8000, and one of 12 dBV down corresponds to 0×4000.

TABLE 5

| Position | LF | RF | RR | LR |
|---|---|---|---|---|
| 000 | 0xB58B | 0xB58B | 0xB58B | 0xB58B |
| 001 | 0xB58B | 0x8FDA | 0xB58B | 0xC05A |
| 002 | 0xC05A | 0xB58B | 0x8FDA | 0xB58B |
| 003 | 0xB58B | 0xC05A | 0xB58B | 0x8FDA |
| 004 | 0x8FDA | 0xB58B | 0xC05A | 0xB58B |
| 005 | 0x7FFF | 0x7FFF | 0xB58B | 0xB58B |
| 006 | 0x8FDA | 0x71E2 | 0x8FDA | 0xCBC4 |
| 007 | 0xB58B | 0x7FFF | 0x7FFF | 0xB58B |
| 008 | 0cCBC4 | 0x8FDA | 0x71E2 | 0x8FDA |
| 009 | 0xB58B | 0xB58B | 0x7FFF | 0x7FFF |
| 010 | 0x8FDA | 0xCBC4 | 0x8FDA | 0x71E2 |
| 011 | 0x7FFF | 0xB58B | 0xB58B | 0x7FFF |
| 012 | 0x71E2 | 0x8FDA | 0xCBC4 | 0x8FDA |
| 013 | 0x5068 | 0x5068 | 0xB58B | 0xB58B |
| 014 | 0x5068 | 0x5068 | 0x71E2 | 0xD1B4 |
| 015 | 0x5957 | 0x5068 | 0x5068 | 0xE482 |
| 016 | 0x71E2 | 0x5068 | 0x5068 | 0xD1B4 |
| 017 | 0xB58B | 0x5068 | 0x5068 | 0xB58B |
| 018 | 0xD1B4 | 0x5068 | 0x5068 | 0x71E2 |
| 019 | 0xE482 | 0x5068 | 0x5068 | 0x5068 |
| 020 | 0xD1B4 | 0x71E2 | 0x5068 | 0x5068 |
| 021 | 0xB58b | 0xB58B | 0x5068 | 0x5068 |
| 022 | 0x71E2 | 0xD1B4 | 0x5068 | 0x5068 |
| 023 | 0x5068 | 0xE482 | 0x5068 | 0x5068 |
| 024 | 0x5068 | 0xD1B4 | 0x71E2 | 0x5068 |
| 025 | 0x5068 | 0xB58B | 0xB58B | 0x5068 |
| 026 | 0x5068 | 0x71E2 | 0xD1B4 | 0x5068 |
| 027 | 0x5068 | 0x5068 | 0xE482 | 0x5068 |
| 028 | 0x5068 | 0x5068 | 0xD1B4 | 0x71E2 |
| 029 | 0x2DBF | 0x2DBF | 0xB58B | 0xB58B |
| 030 | 0x2DBF | 0x2DBF | 0x987F | 0xC5FB |
| 031 | 0x2BF | 0x2DBF | 0x7FFF | 0xD7CF |
| 032 | 0x2DBF | 0x2DBF | 0x4BEB | 0xE482 |
| 033 | 0x2DBF | 0x2DBF | 0x2DBF | 0xF1E5 |
| 034 | 0x4BEB | 0x2DBF | 0x2DBF | 0xE482 |
| 035 | 0x7FFF | 0x2DBF | 0x2DBF | 0xD7CF |
| 036 | 0x987F | 0x2DBF | 0x2DBF | 0xC5FB |
| 037 | 0xB58B | 0x2DBF | 0x2DBF | 0xB58B |
| 038 | 0xC5FB | 0x2DBF | 0x2DBF | 0x987F |
| 039 | 0xD7CF | 0x2DBF | 0x2DBF | 0x7FFF |
| 040 | 0xE482 | 0x2DBF | 0x2DBF | 0x4BEB |
| 041 | 0xF1E5 | 0x2DBF | 0x2DBF | 0x2DBF |
| 042 | 0xE482 | 0x4BEB | 0x2DBF | 0x2DBF |
| 043 | 0xD7CF | 0x7FFF | 0x2DBF | 0x2DBF |
| 044 | 0xC5FB | 0x987F | 0x2DBF | 0x2DBF |
| 045 | 0xB58B | 0xB58B | 0x2DBF | 0x2DBF |
| 046 | 0x987F | 0xC5FB | 0x2DBF | 0x2DBF |
| 047 | 0x7FFF | 0xD7CF | 0x2DBF | 0x2DBF |
| 048 | 0x4BEB | 0xE482 | 0x2DBF | 0x2DBF |
| 049 | 0x2DBF | 0xF1E5 | 0x2DBF | 0x2DBF |
| 050 | 0x2DBF | 0xE482 | 0x4BEB | 0x2DBF |
| 051 | 0x2DBF | 0xD7CF | 0x7FFF | 0x2DBF |
| 052 | 0x2DBF | 0xC5FB | 0x987F | 0x2DBF |
| 053 | 0x2DBF | 0xB58B | 0xB58B | 0x2DBF |
| 054 | 0x2DBF | 0x987F | 0xC5FB | 0x2DBF |
| 055 | 0x2DBF | 0x7FFF | 0xD7CF | 0x2DBF |
| 056 | 0x2DBF | 0x4BEB | 0xE482 | 0x2DBF |
| 057 | 0x2DBF | 0x2DBF | 0xF1E5 | 0x2DBF |
| 058 | 0x2DBF | 0x2DBF | 0xE402 | 0x4BEB |
| 059 | 0x2DBF | 0x2DBF | 0xD7CF | 0x7FFF |
| 060 | 0x2DBF | 0x2DBF | 0xC5FB | 0x987F |
| 061 | 0x07FF | 0x07FF | 0xB58B | 0xB58B |
| 062 | 0x07FF | 0x07FF | 0xA669 | 0xC05A |
| 063 | 0x07FF | 0x07FF | 0x987F | 0xCBC4 |
| 064 | 0x07FF | 0x07FF | 0x8BB7 | 0xD7CF |

TABLE 5-continued

| Position | LF | RF | RR | LR |
|---|---|---|---|---|
| 065 | 0x07FF | 0x07FF | 0x7FFF | 0xE482 |
| 066 | 0x07FF | 0x07FF | 0x3FFF | 0xEB10 |
| 067 | 0x07FF | 0x07FF | 0x20CB | 0xF1E5 |
| 068 | 0x07FF | 0x07FF | 0x0FFF | 0xF8DA |
| 069 | 0x07FF | 0x07FF | 0x07Ff | 0xFFFF |
| 070 | 0x0FFF | 0x07FF | 0x07FF | 0xF8DA |
| 071 | 0x20C8 | 0x07FF | 0x07FF | 0xF1E5 |
| 072 | 0x3FFF | 0x07FF | 0x07FF | 0xE81D |
| 073 | 0x7FFF | 0x07FF | 0x07FF | 0xE482 |
| 074 | 0x8BB7 | 0x07FF | 0x07FF | 0xD7CF |
| 075 | 0x987F | 0x07FF | 0x07FF | 0xCBC4 |
| 076 | 0xA669 | 0x07FF | 0x07FF | 0xC05A |
| 077 | 0xB58B | 0x07FF | 0x07FF | 0xB58B |
| 078 | 0xC05A | 0x07FF | 0x07FF | 0xA669 |
| 079 | 0xCBC4 | 0x07FF | 0x07FF | 0x987F |
| 080 | 0xD7Cf | 0x07FF | 0x07FF | 0x8B57 |
| 081 | 0xE482 | 0x07FF | 0x07FF | 0x07FFF |
| 082 | 0xEB1D | 0x07FF | 0x07FF | 0x3FFF |
| 083 | 0xF1E5 | 0x07FF | 0x07FF | 0x20CB |
| 084 | 0xF8DA | 0x07FF | 0x07FF | 0x0FFF |
| 085 | 0x0FFFF | 0x07FF | 0x07FF | 0x07FF |
| 086 | 0xF8DA | 0x0FFF | 0x07FF | 0x07FF |
| 087 | 0xF1E5 | 0x20CB | 0x07FF | 0x07FF |
| 088 | 0xEB1D | 0x3FFF | 0x07FF | 0x07FF |
| 089 | 0xE482 | 0x7FFF | 0x07FF | 0x07FF |
| 090 | 0xD7CF | 0x8BB7 | 0x07FF | 0x07FF |
| 091 | 0xCBC4 | 0x987F | 0x07FF | 0x07FF |
| 092 | 0xC05A | 0xA669 | 0x07FF | 0x07FF |
| 093 | 0xB58B | 0xB58B | 0x07FF | 0x07FF |
| 094 | 0xA669 | 0xC05A | 0x07FF | 0x07FF |
| 095 | 0x987F | 0xCBC4 | 0x07FF | 0x07FF |
| 096 | 0x8BB7 | 0xD7CF | 0x07FF | 0x07FF |
| 097 | 0x7FFF | 0xE482 | 0x07FF | 0x07FF |
| 098 | 0x3FFF | 0xEB1D | 0x07FF | 0x07FF |
| 099 | 0x20CB | 0xF1E5 | 0x07FF | 0x07FF |
| 100 | 0x0FFF | 0xF8DA | 0x07FF | 0x07FF |
| 101 | 0x07FF | 0xFFF | 0x07FF | 0x07FF |
| 102 | 0x07FF | 0xF8DA | 0x0FFF | 0x07FF |
| 103 | 0x07Ff | 0xF1E5 | 0x20CB | 0x07FF |
| 104 | 0x07FF | 0xEB1D | 0x3FFF | 0x07FF |
| 105 | 0x07FF | 0xE402 | 0x7FFF | 0x07FF |
| 106 | 0x07FF | 0xD7CF | 0x8BB7 | 0x07FF |
| 107 | 0x07FF | 0xCBC4 | 0x987F | 0x07FF |
| 108 | 0x07FF | 0xC05A | 0xA669 | 0x07FF |
| 109 | 0x07FF | 0xB58B | 0xB58B | 0x07FF |
| 110 | 0x07FF | 0xA669 | 0xC05A | 0x07FF |
| 111 | 0x07FF | 0x987F | 0xCBC4 | 0x07FF |
| 112 | 0x07FF | 0x8BB7 | 0xD7CF | 0x07FF |
| 113 | 0x07FF | 0x7FFF | 0xE482 | 0x07FF |
| 114 | 0x07FF | 0x3FFF | 0xEB1D | 0x07FF |
| 115 | 0x07FF | 0x20CB | 0xF1E5 | 0x07FF |
| 116 | 0x07FF | 0x0FFF | 0xF8DA | 0x07FF |
| 117 | 0x07FF | 0x07FF | 0xFFFF | 0x07FF |
| 118 | 0x07FF | 0x07FF | 0xF8DA | 0x0FFF |
| 119 | 0x07FF | 0x07FF | 0xF1B5 | 0x20CB |
| 120 | 0x07FF | 0x07FF | 0xEB1D | 0x3FFF |
| 121 | 0x07FF | 0x07FF | 0xE482 | 0x7FFF |
| 122 | 0x07FF | 0x07FF | 0xD7CF | 0x98B7 |
| 123 | 0x07FF | 0x07FF | 0xCBC4 | 0x987F |
| 124 | 0x07FF | 0x07FF | 0xC05A | 0xA669 |

Figure 6:
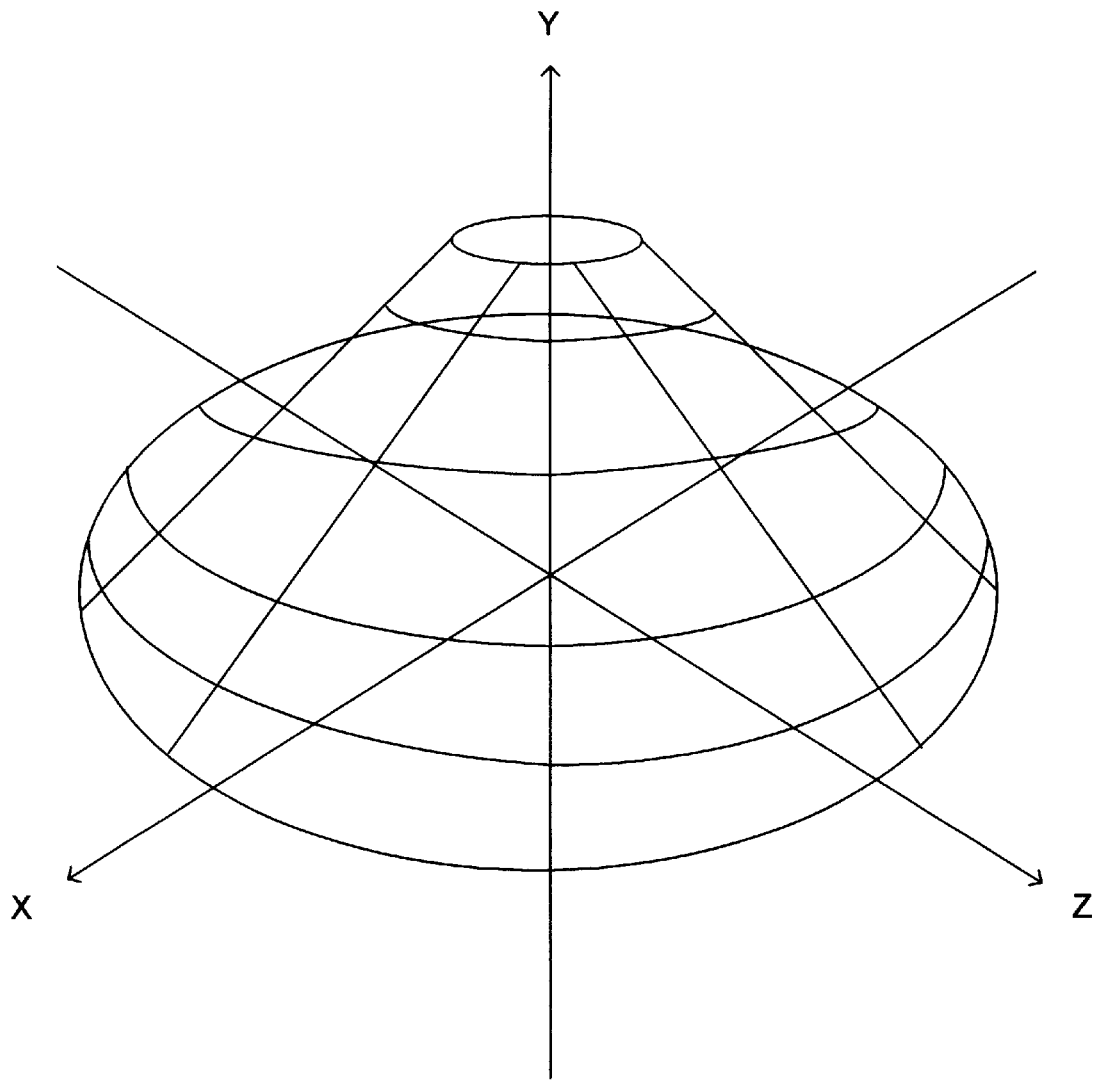
FIG. 6 is a three-dimensional diagram illustrating sound pressure levels with respect to perceived position for one embodiment of the present invention.

The relationship between radius and sound pressure level may be varied. FIG. 6 is a three-dimensional diagram illustrating sound pressure levels with respect to perceived position for one embodiment of the present invention. The embodiment of FIG. 6 differs from that of FIG. 5 in its relationship between radius and sound pressure level. FIG. 6 is approximately conically shaped, while FIG. 5 has more of a funnel shape. FIG. 6 also plots the sound pressure level along the y axis for each point on the (x, z) plane. The (x, z) plane represents the spatial environment, for example, the circular spatial environment illustrated in FIG. 3. Many other configurations are also possible according to the present invention. For example, attenuation parameters could be selected so as to result in a diagram similar to FIG.

5 or FIG. 6, but with a convex surface, for example an approximately hemispherical graph. Alternatively, the direction of the y axis in any of these graphs could be reversed so as to result in a sound source that having a higher sound pressure level at a greater radius in a lower sound pressure level at a lesser radius. Thus, the present invention provides both a technique for simulating perceptions naturally associated with the positioning of a sound source as well as a technique for synthesizing unusual sound effects that may have no natural analogy.

Figure 7:
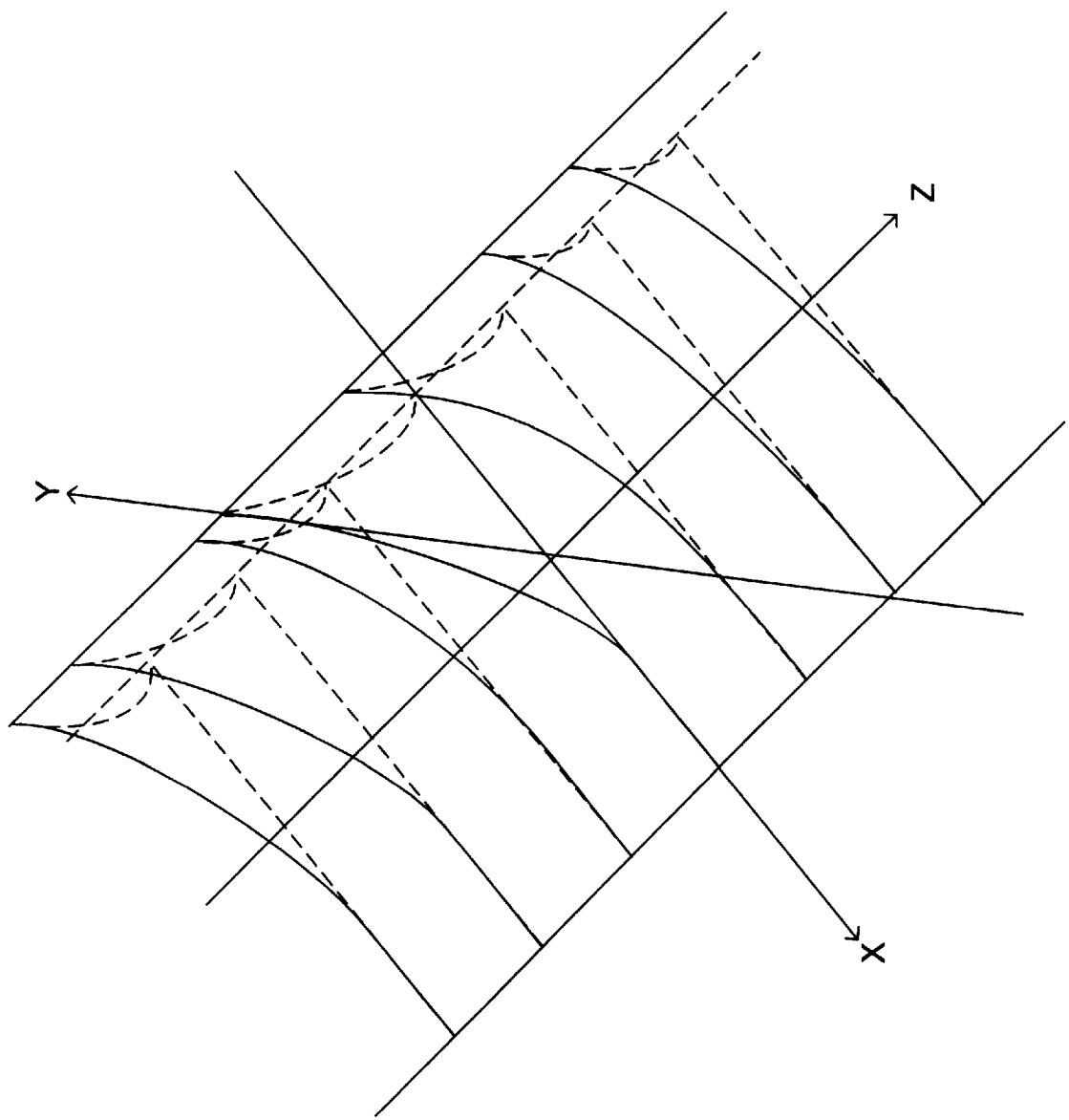
FIG. 7 is a three-dimensional diagram illustrating sound pressure level with respect to perceived position for one embodiment of the present invention.

FIG. 7 is a three-dimensional diagram illustrating sound pressure level with respect to perceived position for one embodiment of the present invention. FIG. 7 illustrates a spatial environment distributed over a portion of the (x, z) plane and attenuation parameters providing sound pressure levels plotted along the y axis. As can be seen from the graph, the maximum sound pressure level is found along the z axis, and the sound pressure level diminishes along the positive and negative directions of the x axis. The relationship between sound pressure level and the x component of position may be adjusted by selecting attenuation parameters to provide the desired effects. A configuration such as that illustrated in FIG. 7 is useful for simulating the acoustics of a hallway or tunnel, where sound is reflected and ducted along the axis of the hallway of tunnel, but attenuated off to the sides of the hallway or tunnel.

Figure 4:
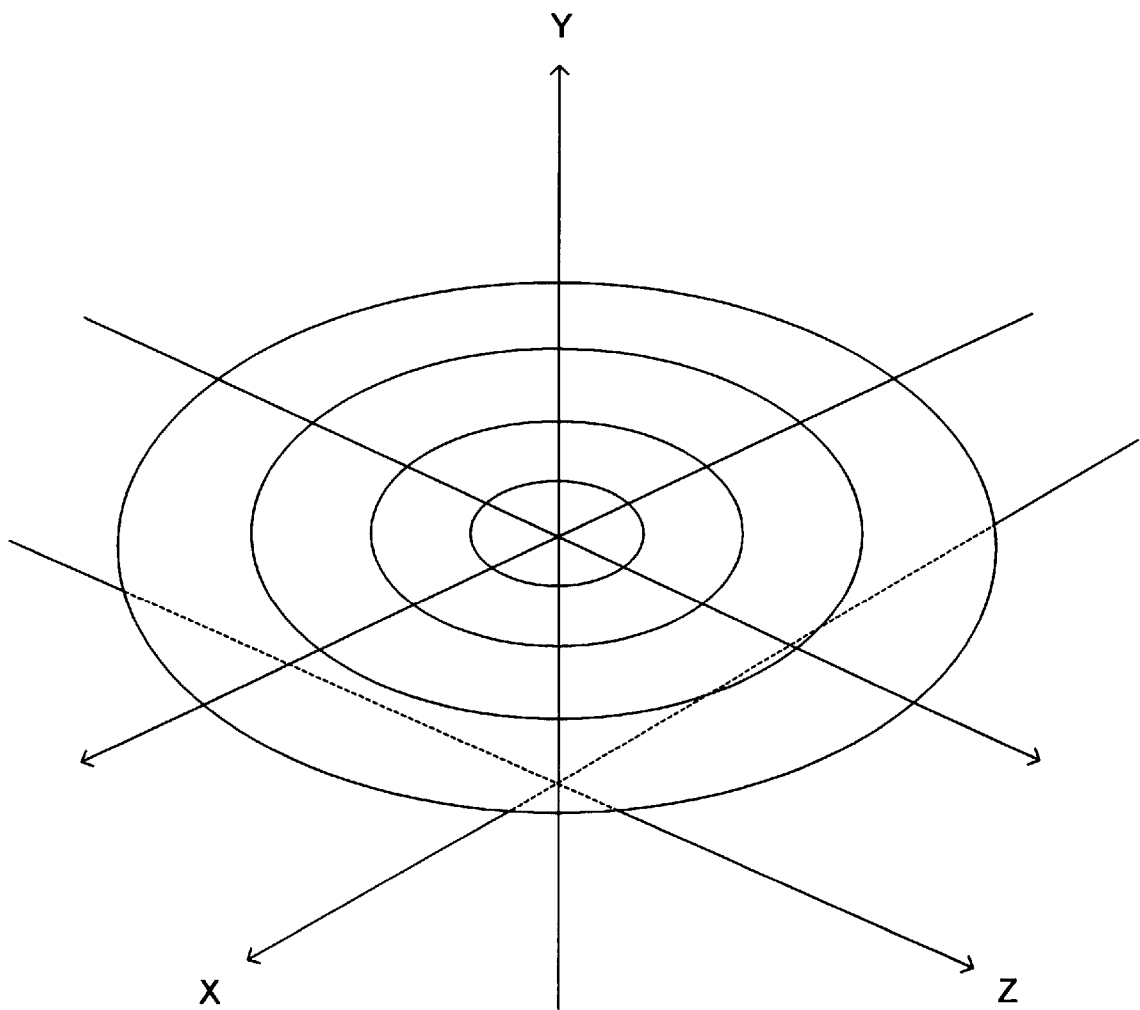
FIG. 4 is a three-dimensional diagram illustrating sound pressure level with respect to perceived position in a spatial environment defined in the (x, z) plane for one embodiment of the present invention.

FIG. 4 is a three-dimensional diagram illustrating sound pressure level with respect to perceived position in a spatial environment defined in the (x, z) plane for one embodiment of the present invention. For example, the spatial environment defined in the (x, z) plane may be the circular spatial environment of FIG. 3. The sound pressure level is plotted with respect to the y axis. As can be seen from the graph, the sound pressure level remains constant over the defined spatial environment.

In the spatial environment illustrated in FIG. 3, user 20 is preferably located at point 0 in ring 1 of the spatial environment. However, the present invention avoids disadvantages of prior art techniques by allowing user 20 to deviate from point 0 and by allowing multiple users 20 to be present at various points within the spatial environment. Even with variation in the location of user 20 or with multiple users 20, the present invention provides the desired perception of sound positioning.

Figure 8:
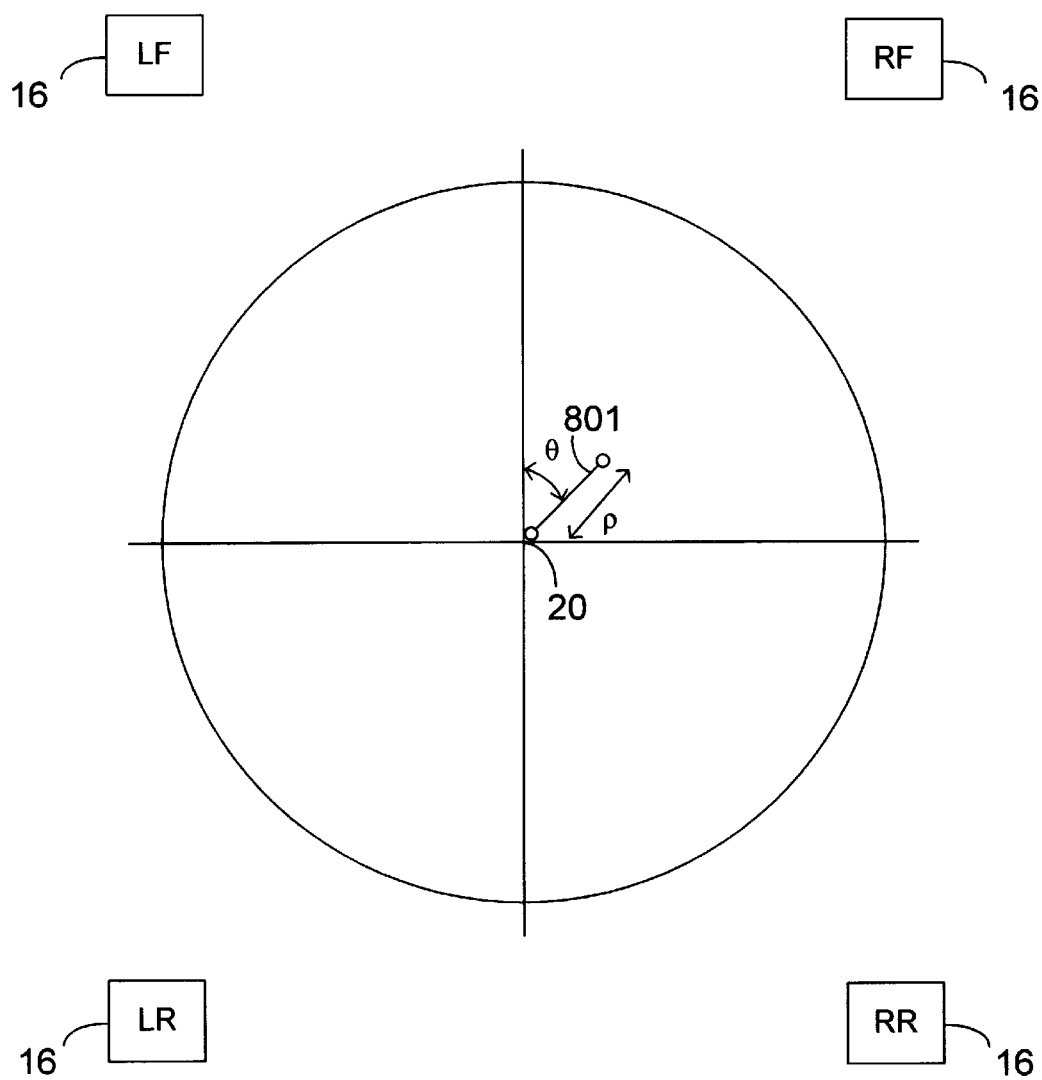
FIG. 8 is a plan view diagram illustrating an embodiment of the present invention allowing control of the perceived radial and angular positioning of a sound source.

FIG. 8 is a plan view diagram illustrating an embodiment of the present invention allowing control of the perceived radial and angular positioning of a sound source. If position information is limited to specific radial and angular locations, a table 38 may be constructed to provide attenuation parameters for those specific radial and angular locations. In FIG. 8, the radial component is represented by $\rho$ and the angular component is represented by $\theta$.

Figure 9:
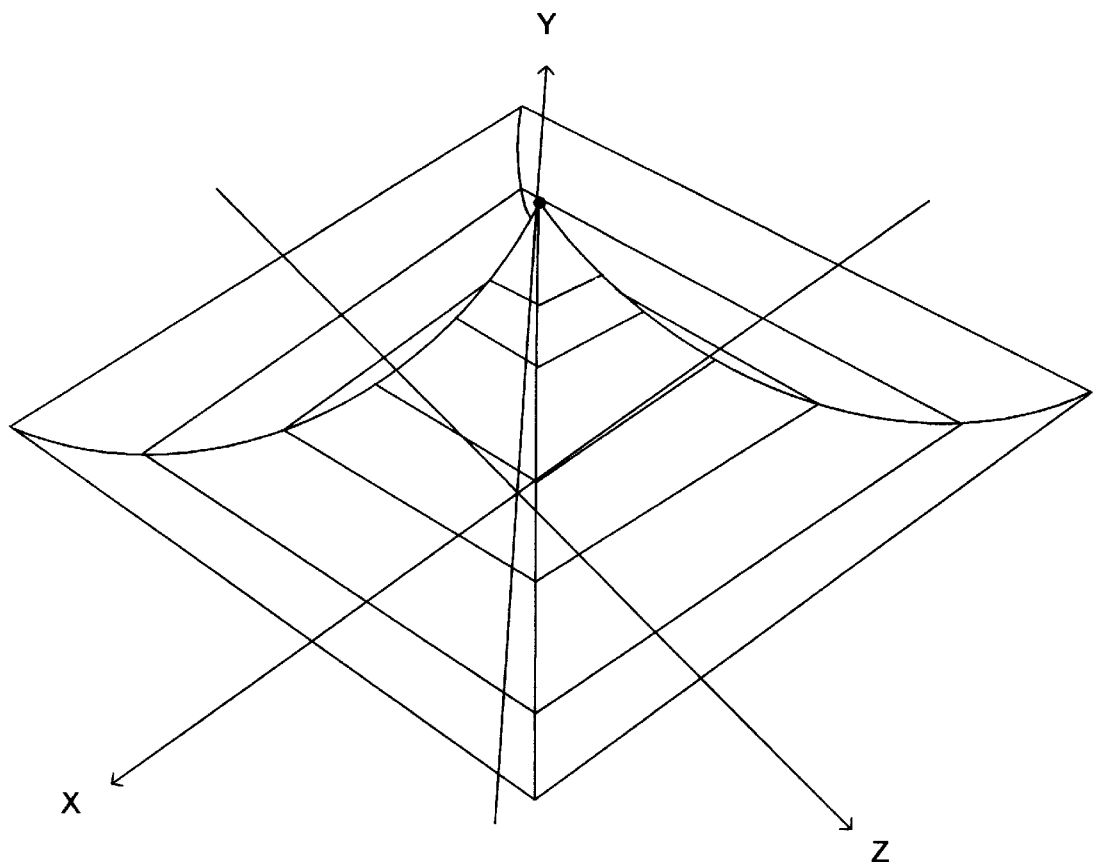
FIG. 9 is a three dimensional diagram illustrating an example of one embodiment of the present invention where sound pressure level varies over a rectilinear spatial environment.

FIG. 9 is a three dimensional graph illustrating an example of one embodiment of the present invention where sound pressure level varies over a rectilinear spatial environment. The rectilinear spatial environment is illustrated as a portion of the (x, z) plane and sound pressure level is illustrated along the y axis. As can be seen from the graph, the sound pressure level increases with proximity to the origin in the (x, z) plane and decreases with distance from the origin in the (x, z) plane. The attenuation parameters represented in FIG. 9 result in the sound pressure level of a perceived sound source being naturally louder when the source is nearer to user 20 and naturally quieter when the sound source is farther from user 20.

Figure 10:
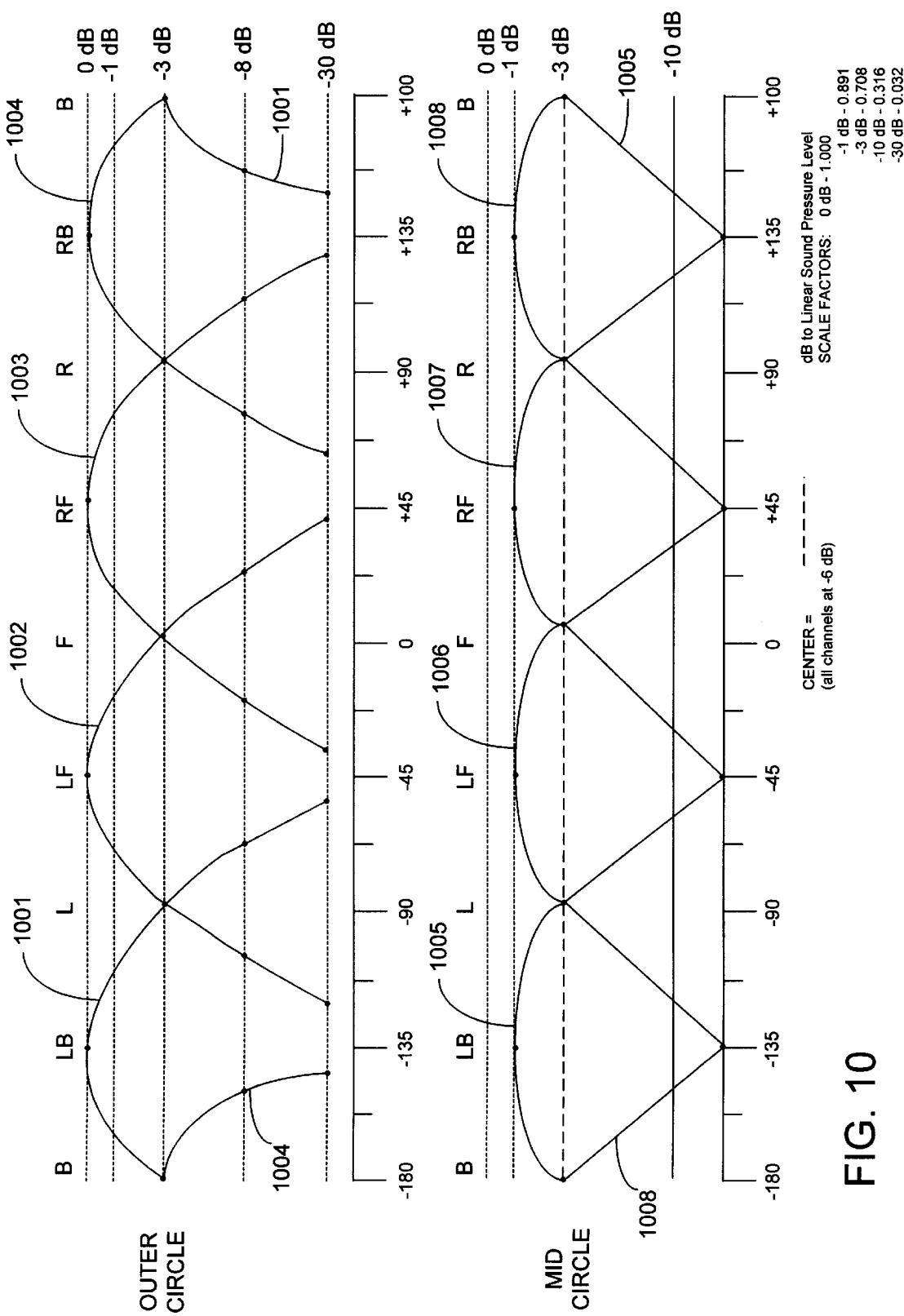
FIG. 10 is a diagram illustrating gain curves for one embodiment of the present invention.

FIG. 10 is a diagram illustrating gain curves for one embodiment of the present invention. Curve 1001 represents the power to be applied to the left back transducer 16. Curve 1002 represents the power to be applied to the left front transducer 16. Curve 1003 represents the power to be applied to the right front transducer 16. Curve 1004 represents the power to be applied to the right back transducer 16. The direction at which the sound source is to be perceived is indicated in degrees with 0 degrees being directly in front of user 20, a positive offset being to the right of user 20, and a negative offset being to the left of user 20. Thus minus 180° and plus 180° both represent the angular position directly behind user 20. As can be seen from curve 1001, if it is desired for a sound source to be perceived at minus 135°, a power level of 0 dB is applied to left back transducer 16. If it is desired to have the sound source perceived to be a minus 45°, a power level of zero decibels is applied to left front transducer 16. If it is desired for the sound source to be perceived at minus 90° (directly to the left of the user 20), a power level of minus 3 dB is applied to each of left back transducer 16 and left front transducer 16. If the sound source is desired to appear at negative 67.5°, a power level of minus 1 dB is applied to left front transducer 16 and a power level of minus 6 dB is applied to left back transducer 16. As can be seen from the graph, curves 1001, 1002, 1003, and 1004 are identical but shifted 90° to the right from the previous curve, reflecting the preferred spacing transducer of 16 of 90° with respect to each other.

Curves 1005, 1006, 1007, and 1008 represent the power levels to applied to transducers 16 to provide a perceived sound position allowing a circle lying between the circle defined by power curves 1001, 1002, 1003, 1004 and the center of the spatial environment. To make a sound source appear in a angular position of minus 135° along this smaller concentric circle, a power level of minus 1 dB is provided to the left back transducer 16 and a power level of minus 10 dB is provided to each of left front transducer 16 and right back transducer 16. If a sound is to be perceived at a angular position of minus 90° along this circle, a power level of minus 3 dB is provided to each of left back transducer 16 and left front transducer. Curves 1005, 1006, 1007, and 1008 are identical but shifted 90° to the right of the previous curve to reflect the preferred 90° spacing between transducer 16.

To make a sound appear to be centered within the spatial environment, a power level of minus 6 dB is applied to each of the left back, left front, right front and right back transducers 16.

Figure 11:
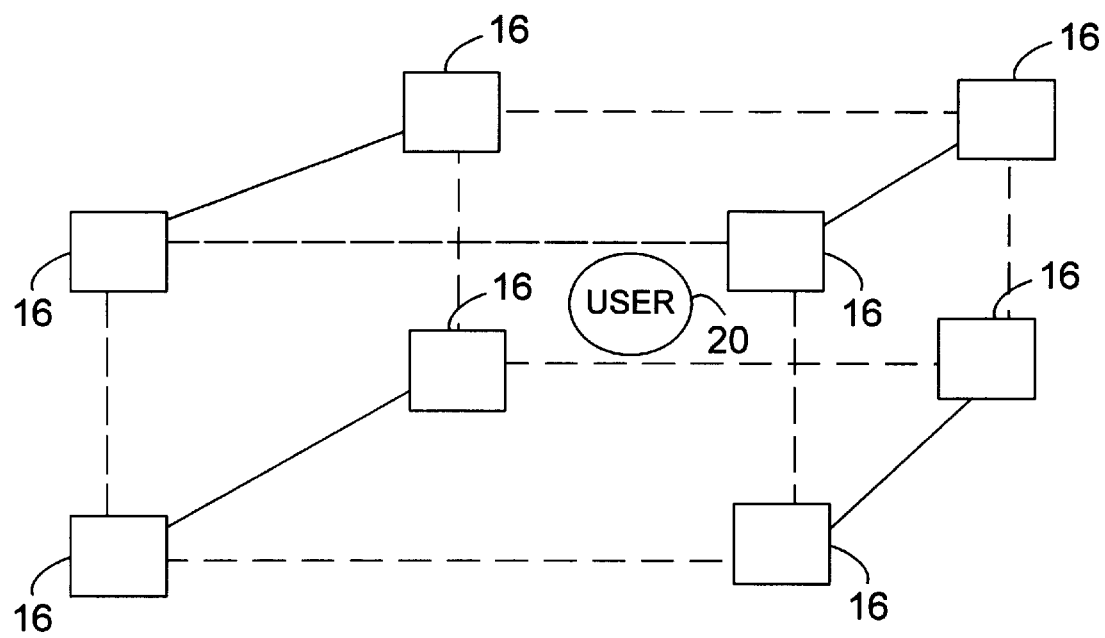
FIG. 11 is a perspective view diagram of one embodiment of the present invention.

FIG. 11 is a perspective view diagram of one embodiment of the present invention. In this embodiment, transducers 16 are spatially distributed in three dimensions surrounding user 20. Although four transducers 16 are illustrated as being located above a horizontal plane intersecting user 20 and four transducers 16 are illustrated as being located below a horizontal plane intersecting user 20, the present invention may also be practiced with other numbers of transducer 16 located in other three dimensional spatial configurations. Transducer 16 may be located at the vertices of an imaginary cube or rectangular solid or some other spatially diverse three dimensional configuration with user 20 located within the spatial environment defined by the placement of transducer 16, preferably approximately central to such spatial environment.

Figure 12:
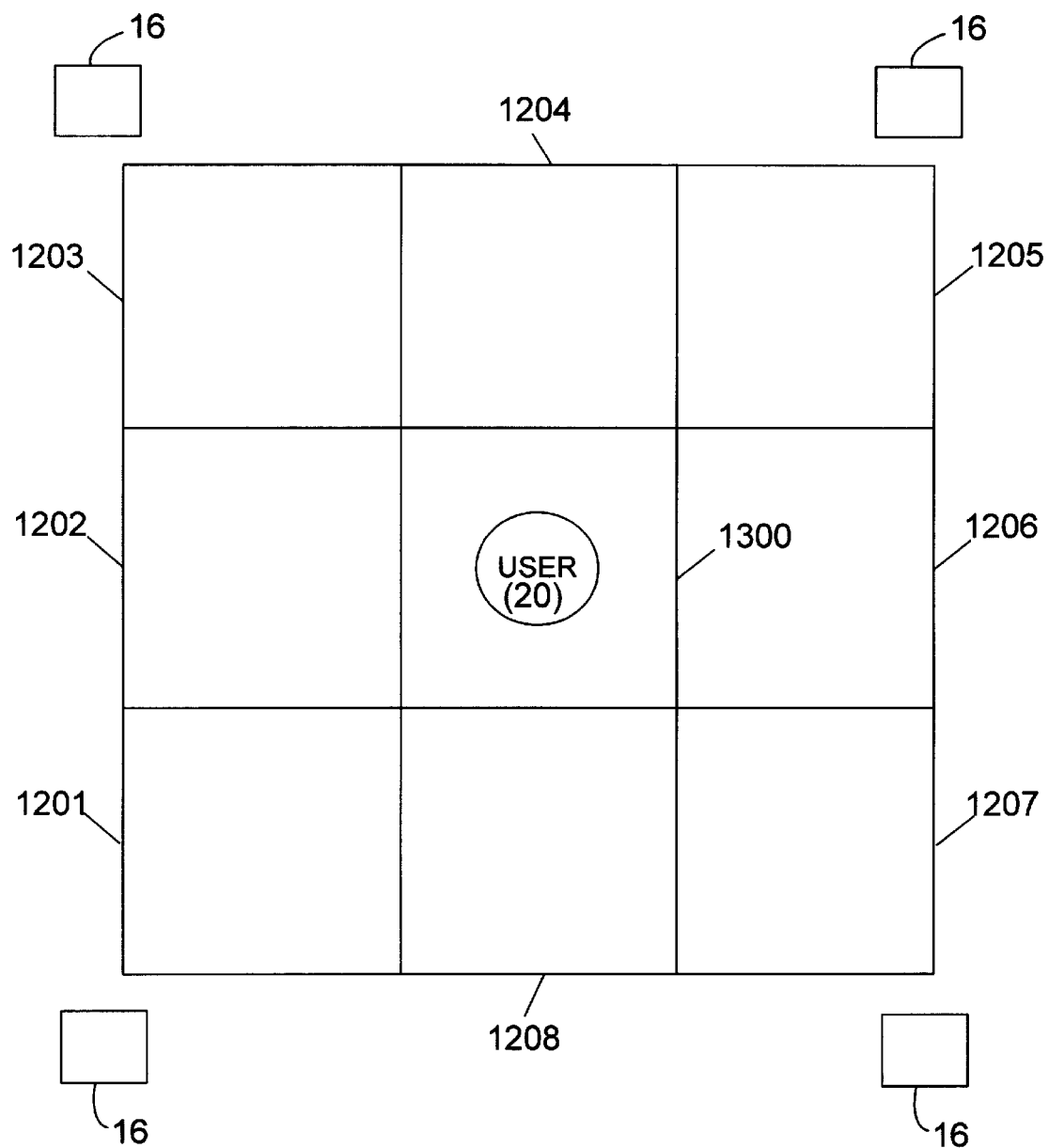
FIG. 12 is a plan view diagram illustrating one embodiment of the present invention having a rectilinear spatial environment.

FIG. 12 is a plan view diagram illustrating one embodiment of the present invention having a rectilinear spatial environment. The spatial environment of FIG. 12 is divided into nine regions. The nine regions are arranged in a three by three rectilinear pattern. Region 1200 is centrally located. Region 1204 is located in front of region 1200. Region 1208 is located behind region 1200. Region 1202 is located to the left of region 1200. Region 1206 is located to the right of region 1200. Region 1203 is located in front of and to the left of region 1200. Region 1205 is located in front of and to the right of 1200. Region 1201 is located behind and to the left of region 1200. Region 1207 is located behind and to the right of region 1200. User 20 is preferably located in region 1200, although the present invention may also be practiced with user 20 in some other region or with multiple users 20 in various regions. Transducers 16 are illustrated as being located peripheral to regions 1203, 1205, 1201, and 1207. Transducer 16 may be located differently with respect to the regions, for example peripheral to regions 1204, 1202, 1206 and 1208.

A table 38 is constructed according to the present invention with attenuation parameters corresponding to each of the regions illustrated in FIG. 12. When it is desired to produce a sound intended to give the perception of being located in a particular region, the attenuation parameters for that region are retrieved from the corresponding table 38 and used to program the attenuation of the sound subsystem. Thus, for example to make a sound seem to be located in region 1203, attenuation parameters from a corresponding table 38 are supplied to a sound subsystem that controls the attenuation of the sound signals before they are converted to an audible form by transducers 16. To make a sound source appear to be located in region 1203, attenuation would be reduced for the sound produced by transducer 16 located approximate to region 1203, while attenuation would be increased for other transducers 16 located distinct to region 1203. Table 6 below provides an example of attenuation parameters for a table 38 that may be used in conjunction with the spatial environment illustrated in FIG. 12. Position 000 corresponds to region 1200, position 001 to region 1201, position 002 to region 1202, position 003 to region 1203, and so on through position 009, which corresponds to region 1209.

One embodiment based on FIG. 12 may be used in configurations where region 1200 is designated as the origin, having the coordinates (0,0). For example, region 1201 may comprise negative x and negative y coordinates (e.g., (−x,−y)). Region 1202 may comprise negative x and zero y coordinates (e.g., (−x,0)). Region 1203 may comprise negative x and positive y coordinates (e.g., (−x,+y)). Region 1204 may comprise zero x and positive y coordinates (e.g., (0,+y)). Region 1205 may comprise positive x and positive y coordinates (e.g., (+x,+y)). Region 1206 may comprise positive x and zero y coordinates (e.g., (+x,0)). Region 1207 may comprise positive x and negative y coordinates (e.g., (+x,−y)). Region 1208 may comprise zero x and negative y coordinates (e.g., (0,−y)).

For such an embodiment, an appropriate region may be determined simply using conditional tests. Conditional tests may be used to determine if the x and y coordinates are positive, zero, or negative. The results of these tests for both the x and y coordinates yield the appropriate region.

Such an embodiment may be used to provide compatibility with existing geometric conventions. Such compatibility may be referred to as "legacy support."

The first column of Table 6 specifies a decimal value for the enumerated position in the circular spatial environment. The second column of Table 6 specifies a hexadecimal value representative of attenuation to be applied to the signal provided to a left front transducer 16. The third column of Table 6 specifies a hexadecimal value representative of attenuation to be applied to the signal provided to a right front transducer 16. The fourth column of Table 6 specifies a hexadecimal value representative of attenuation to be applied to the signal provided to a right rear transducer 16. The fifth column of Table 6 specifies a hexadecimal value representative of attenuation to be applied to the signal provided to a left rear transducer 16. The hexadecimal values of the second through fifth columns of Table 6 are based on a linear attenuation curve having a minimum attenuation corresponding to the hexadecimal value 0xFFFF and a maximum attenuation corresponding to the hexadecimal value 0x0000. An attenuation level of 6 dBV down relative to the minimum attenuation level corresponds to a hexadecimal value of 0x8000, and one of 12 dBV down corresponds to 0x4000.

TABLE 6

| Position | LF | RF | RR | LR |
|---|---|---|---|---|
| 000 | 0x71E2 | 0x71E2 | 0x71E2 | 0x71E2 |
| 001 | 0x0000 | 0x0000 | 0x0000 | 0x0000 |
| 002 | 0xA1A4 | 0x0000 | 0x0000 | 0xA1A4 |
| 003 | 0xFFFF | 0x0000 | 0x0000 | 0x0000 |
| 004 | 0xA1A4 | 0xA1A4 | 0x0000 | 0x0000 |
| 005 | 0x0000 | 0xFFFF | 0x0000 | 0x0000 |
| 006 | 0x0000 | 0xA1A4 | 0xA1A4 | 0x0000 |
| 007 | 0x0000 | 0x0000 | 0xFFFF | 0x0000 |
| 008 | 0x0000 | 0x0000 | 0xA1A4 | 0xA1A4 |

Figure 13:
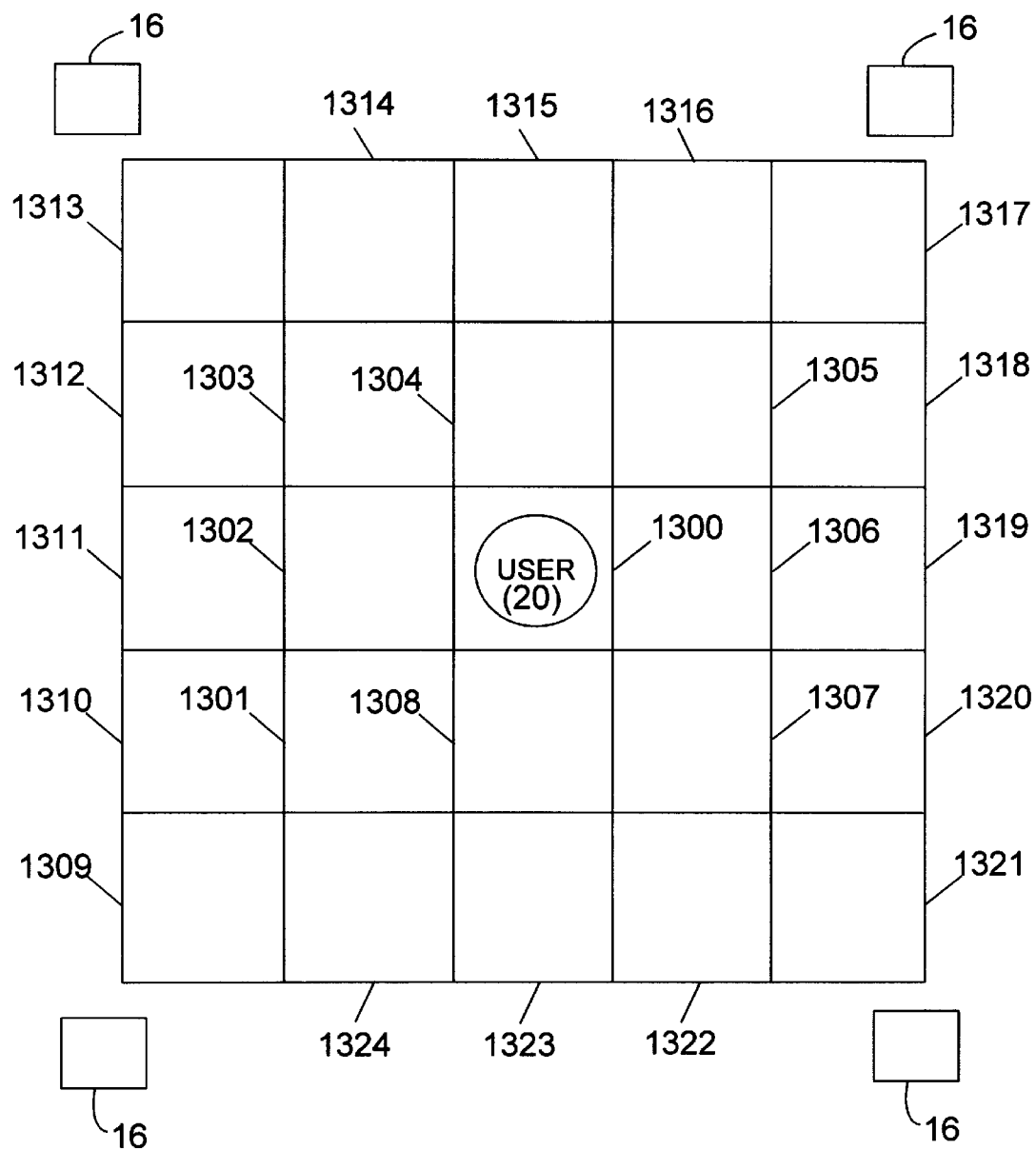
FIG. 13 is a plan view diagram of one embodiment of the present invention having a rectilinear spatial environment.

FIG. 13 is a plan view diagram of one embodiment of the present invention having a rectilinear spatial environment. The spatial environment of FIG. 13 comprises 25 regions arranged in a five by five rectilinear configuration. Region 1300 is located central to the spatial environment. Region 1301 is located behind and to the left of region 1300. Region 1302 is located to the left 1300. Region 1303 is located in front of and to the left of region 1300. Region 1304 is located in front of region 1300. Region 1305 is located in front of and to the right of region 1304. Region 1306 is located to the right of region 1300. Region 1307 is located to the right and behind region 1300. Region 1308 is located behind region 1300.

Region 1309 is located behind and to the left of region 1301. Region 1310 is located to the left of region 1301. Region 1311 is located to the left of region 1302. Region 1312 is located to the left of region 1303. Region 1313 is located in front of and to the left of region 1303. Region 1314 is located in front of region 1303. Region 1315 is located is front of region 1304. Region 1316 is located in front of region 1305. Region 1317 is located in front and to the right of region 1305. Region 1318 is located to the right of region 1305. Region 1319 is located to the right of region 1306. Region 1320 is located to the right of region 1307. Region 1321 is located to the right and behind region 1307. Region 1322 is located behind region 1307. Region 1323 is located behind region 1308. Region 1324 is located behind region 1301.

User 20 is preferably located in region 1300, although user 20 may be located in another region or multiple users 20 may be located in various regions. Transducers 16 are illustrated as being located peripheral regions 1313, 1317, 1309, and 1321. The present invention may also be practiced with different numbers of transducers 16 and with transducers 16 located in different positions relative to regions 1300–1324.

Figure 14:
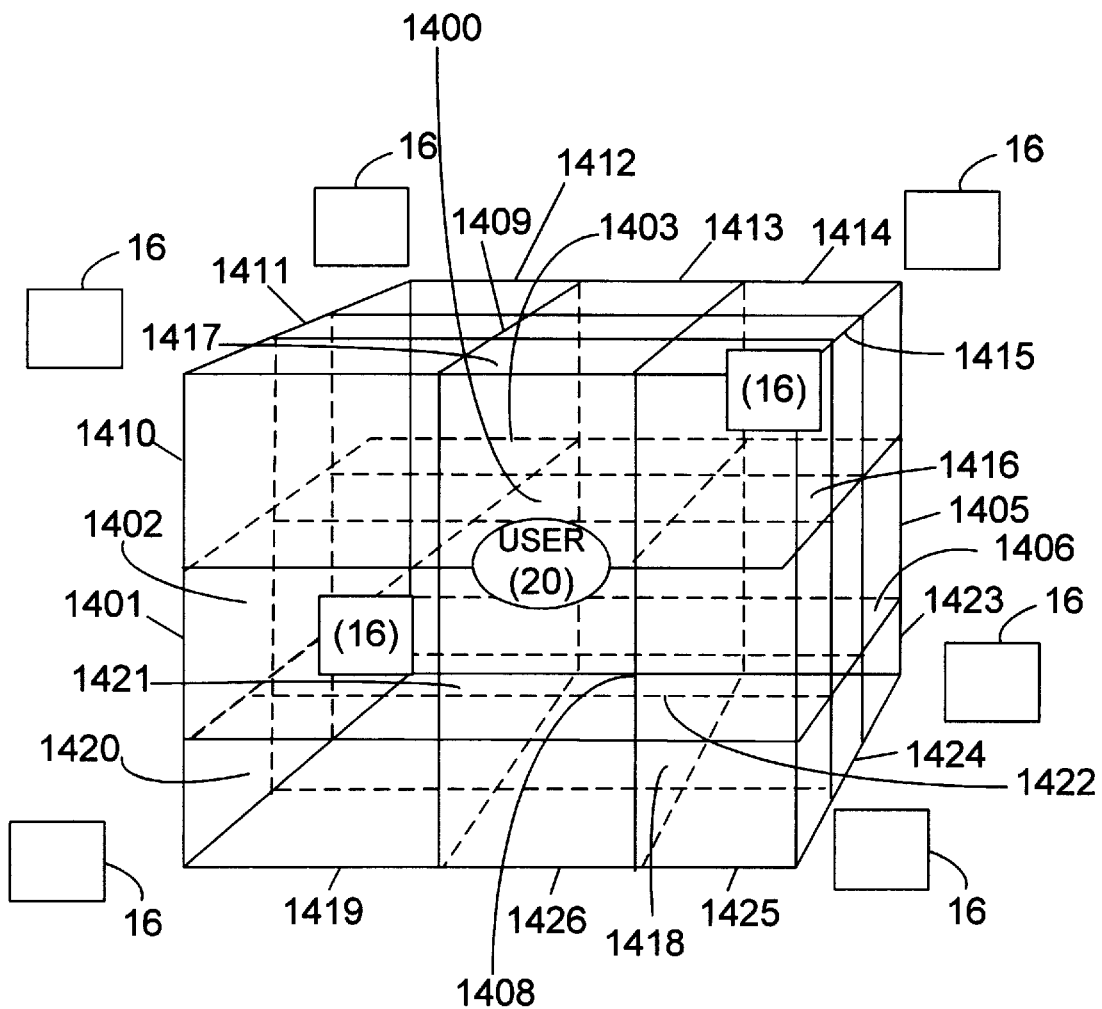
FIG. 14 is a perspective view diagram illustrating one embodiment of the present invention having a three dimensional rectilinear spatial environment.

FIG. 14 is a perspective view diagram illustrating one embodiment of the present invention having a three dimensional rectilinear spatial environment. The spatial environment illustrated in FIG. 14 comprises 27 three dimensional regions 1400–1426. The regions are arranged in a three by three by three cubic configuration.

Region 1400 is centrally located. Region 1401 is located behind and to the left of region 1400. Region 1402 is located to the left of region 1400. Region 1403 is located in front of and to the left of region 1400. Region 1404 is located in front of region 1400. Region 1405 is located in front and to the right of region 1400. Region 1406 is located to the right of region 1400. Region 1407 is located behind and to the right of region 1400. Region 1408 is located behind region 1400.

Region 1409 is located above region 1400. Region 1410 is located above region 1401. Region 1411 is located above region 1402. Region 1412 is located above region 1403. Region 1413 is located above region 1404. Region 1414 is located above region 1405. Region 1415 is located above region 1406. Region 1416 is located above region 1407. Region 1417 is located above region 1408.

Region 1418 is located below region 1400. Region 1419 is located below region 1401. Region 1420 is located below region 1402. Region 1421 is located below region 1403. Region 1422 is located below region 1404. Region 1423 is located below region 1405. Region 1424 is located below region 1406. Region 1425 is below region 1407. Region 1426 is located below region 1408.

User 20 is preferably located in region 1400, although user 20 may be located in another region or multiple users 20 may be located in various regions. Transducers 16 are preferably located peripheral regions 1410, 1412, 1414, 1416, 1419, 1421, 1423, and 1425. The present invention may be practiced with other numbers of transducers 16 or with transducers located differently relative to regions 1400–1426.

Figure 15:
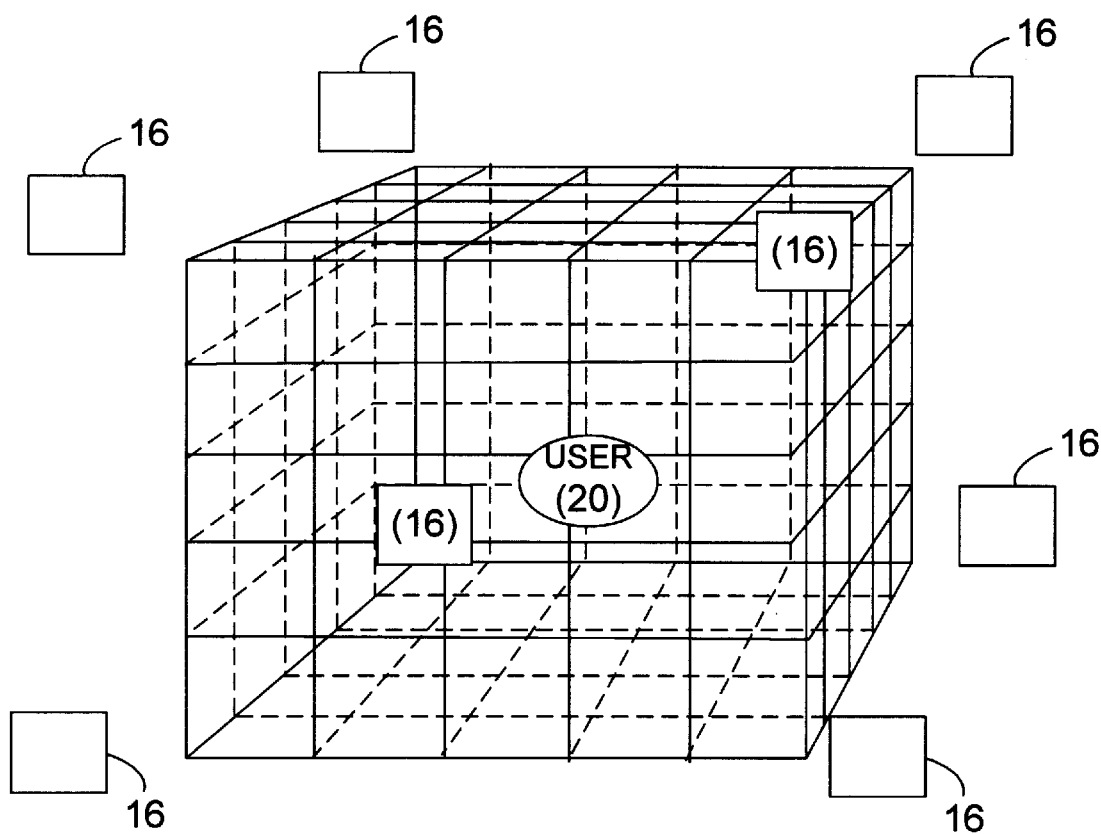
FIG. 15 is a perspective view diagram illustrating one embodiment of the present invention having a three dimensional rectilinear spatial environment.

FIG. 15 is a perspective view diagram illustrating one embodiment of the present invention having a three dimensional rectilinear spatial environment. The spatial environment of FIG. 15 comprises 125 three dimensional regions. These regions are arranged in a five by five by five cubic configuration. User 20 is preferably located in the central region, although user 20 may be located in another region or multiple users 20 may be located in various regions. Transducers 16 are illustrated as being located peripheral to the regions at the vertices of the five by five by five cubic configuration. The present invention may also be practiced with different numbers of transducers 16 and with transducers 16 located in different positions relative to the spatial environment.

A table 38 is constructed containing attenuation parameters for each of the 125 regions defined in FIG. 15. For example, with 8 transducers 16, a table 38 may be constructed having 125 rows and 8 columns. Each row corresponds to a particular region of the spatial environment, while each column provides an attenuation constant for each of the 8 transducers 16. When spatial coordinates are provided to designate a location relative to user 20 at which a sound source is desired to be perceived, the region to which those spatial coordinates correspond is identified. The attenuation parameters corresponding to the appropriate region are determined from the corresponding table 38. The attenuation parameters are used to control the signal levels applied to each of transducers 16. By appropriately controlling the signal levels supplied to transducer 16, the perceived location of the sound source may be accurately controlled within the spatial environment. The present invention may be used to simultaneously control the apparent positioning of multiple sound sources in various regions throughout the spatial environment.

Figure 16:
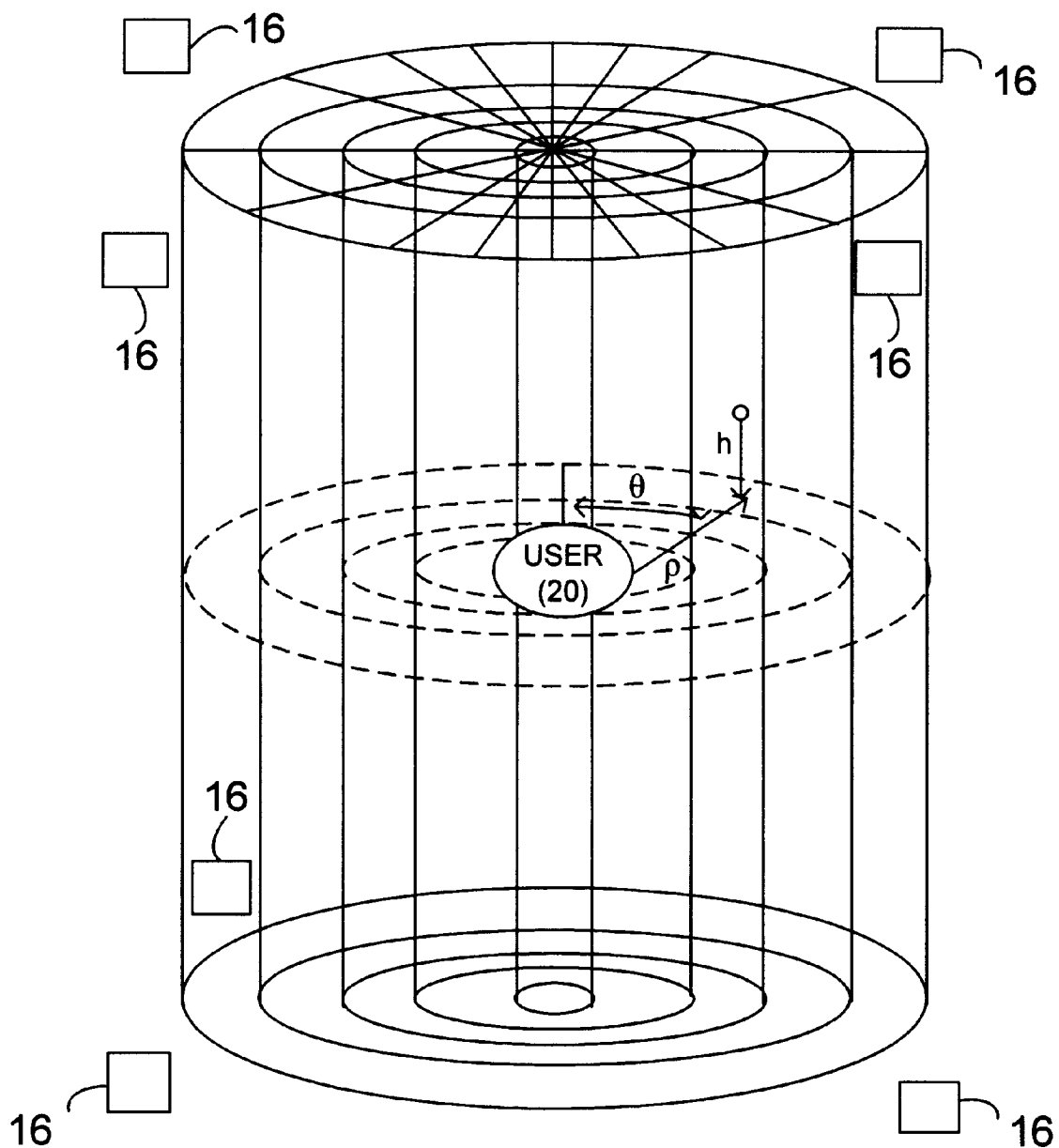
FIG. 16 is a perspective view diagram illustrating one embodiment of the present invention having a three dimensional spatial environment.

FIG. 16 is a perspective view diagram illustrating one embodiment of the present invention having a three dimensional spatial environment. The spatial environment is defined according to cylindrical coordinates. These coordinates are designated by specifying a radial component $\rho$, and angular component $\theta$, and a height component h. While the third component is referred to as a height coordinate, it may have any spatial orientation including but not limited to vertical. The spatial environment of FIG. 16 is divided into a plurality of regions wherein each region contains all points having a radial component between a minimum radially component for that region and a maximum radial component for that region, an angular component between a minimum angular component for that region and a maximum angular for that region, and a height component between a minimum height component and a maximum height component for that region. Transducers 16 are illustrated as being located peripheral to regions having maximal radial and height components for the spatial environment and equally spaced angular components over the full range of possible angular components. Transducers 16 are also located with similar spacing peripheral to similar locations having a minimal height component for the spatial environment. The invention may also be practiced with other numbers of transducers 16 and with transducer 16 located at different positions with respect to the spatial environment.

Moreover, a spatial environment may be defined based on a combination of a plurality of other spatial environments. For example, an embodiment such as that illustrated in FIG. 5 may be combined with an embodiment such as one illustrated in FIG. 3 or 4 either above or below it to yield another embodiment of a three dimensional spatial environment according to the present invention. Furthermore, an embodiment such as that illustrated in FIG. 7 may be translated in the (x,z) plane to give a listener a sensation of moving from one type of spatial environment, for example one representative of a room, to another type of spatial environment, for example, one representative of a hallway or tunnel.

Figure 17:
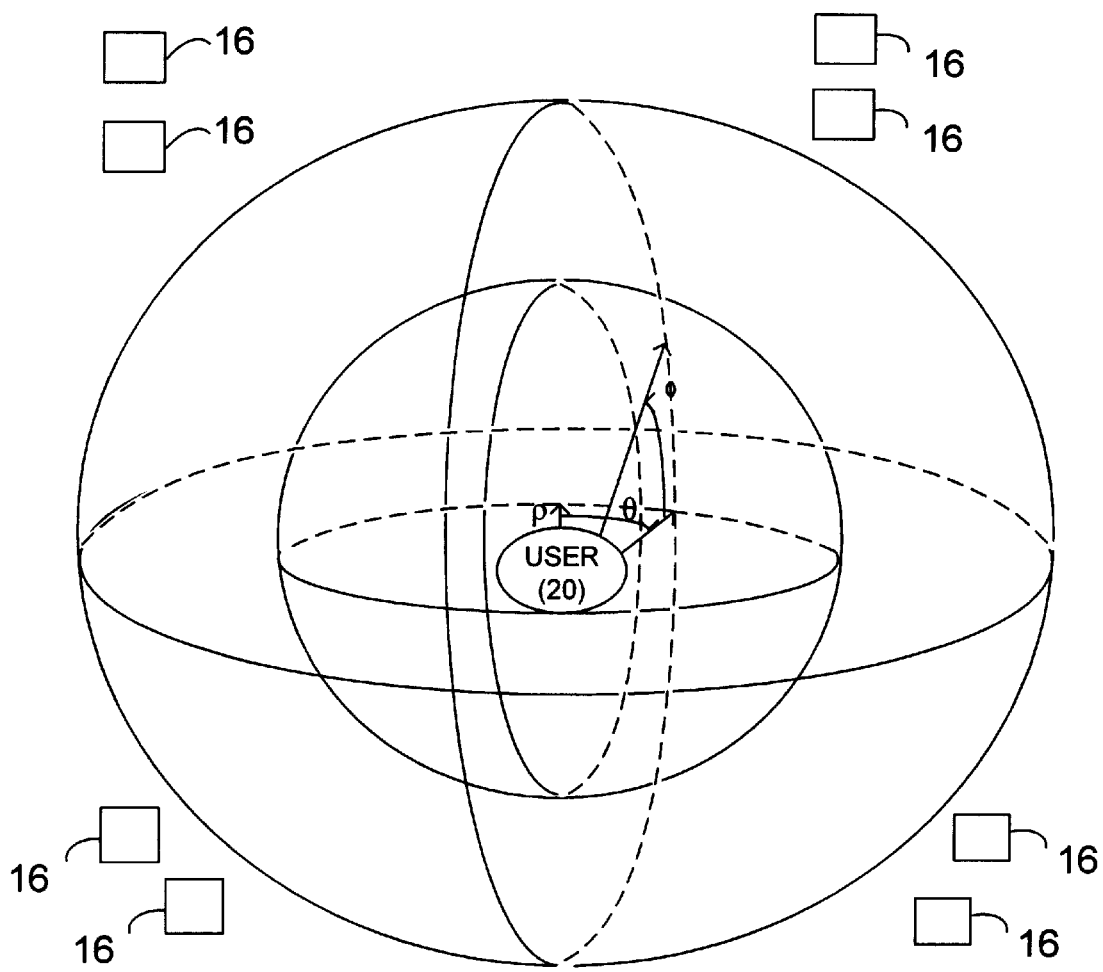
FIG. 17 is a perspective view diagram illustrating an embodiment of the present invention having a three dimensional spherical spatial environment.

FIG. 17 is a perspective view diagram illustrating an embodiment of the present invention having a three dimensional spherical spatial environment. The spherical spatial environment is defined in terms of a radial component $\rho$, an angular azimuth component $\theta$ and an angular elevation component $\phi$. The spatial environment is divided into a plurality of regions where each region contains all points having a radial component between a minimum radial component for that region and a maximum radial component for that region, an angular azimuth component between a minimum angular azimuth component for that region and a maximum angular azimuth component for that region, and an angular elevation component between a minimum angular elevation component for that region and a maximum angular elevation component for that region.

User 20 is preferably located at the center of the spherical spatial environment, although user 20 may be located at some other point within the spherical spatial environment or multiple users 20 may be located at various points within the spherical spatial environment. Transducer 16 are illustrated as being located at the vertices of an imaginary cube peripheral to the spherical spatial environment. However, transducers 16 may be located at other positions with respect to the spherical spatial environment and different numbers of transducer 16 may be employed.

As an example, the spherical spatial environment of FIG. 17 may be practiced in conjunction with a virtual reality cage that allows user 20 to undergo motion about a plurality of axes. User 20 experiences psychoacoustic effects in combination with motion and optional visual effects. These effects are combined to induce in user 20 the intended sensations.

Figure 18:
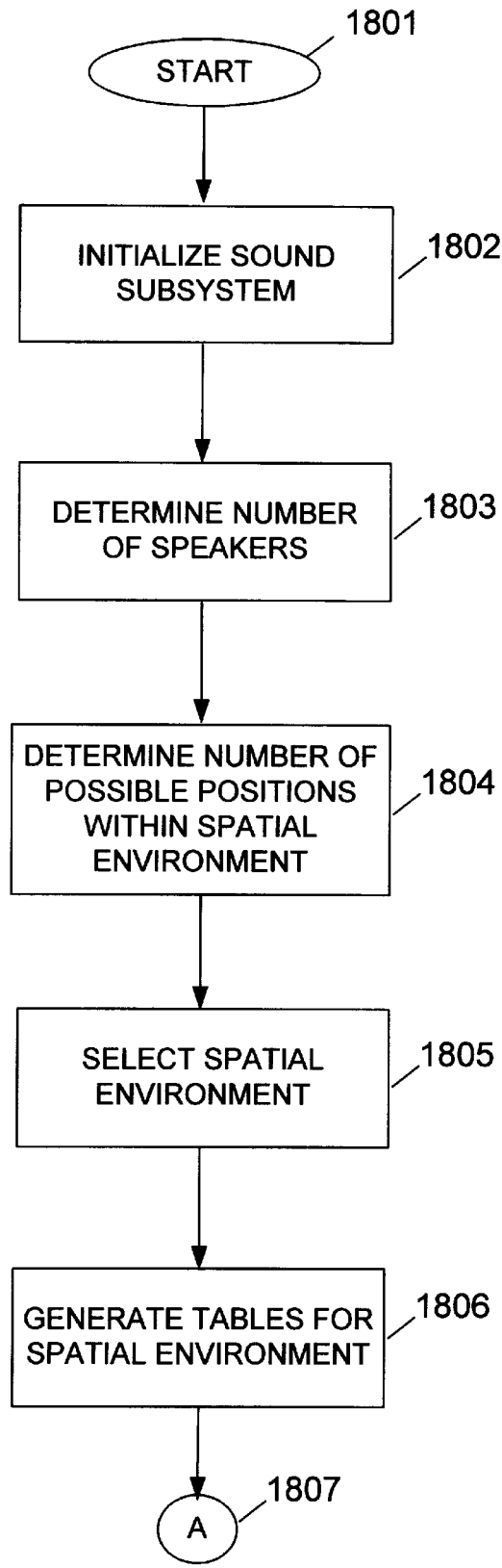
FIG. 18 is a flow diagram illustrating one embodiment of a process according to the present invention.

FIG. 18 is a flow diagram illustrating one embodiment of a process according to the present invention. The process begins at step 1801. From step 1801, the process proceeds to step 1802. In step 1802, the process initializes the sound subsystem. All hardware components of the system use to produce sound are placed in a known state and prepared for the production of sound. From step 1802, the process continues to step 1803. In step 1803, the process determines the number of speakers to be used in the system. From step 1803, the process continues to step 1804. In step 1804, the process determines the number possible positions defined within the spatial environment. From step 1804, the process continues to step 1805. In step 1805, the process selects one or more spatial environments to be used with the system. The spatial environments may be selected from default spatial environments that may be preloaded or arbitrary spatial environments may be specifically defined. From step 1805, the process continues at step 1806. At step 1806, the process generates tables for the selected spatial environments. Each table contains attenuation parameters for each transducer 16 for each region defined within the spatial environment. From step 1806, the process continues in reference to step A 1807. Reference step A 1807 is used to provide reference for other flow charts illustrated in other figures.

Figure 19:
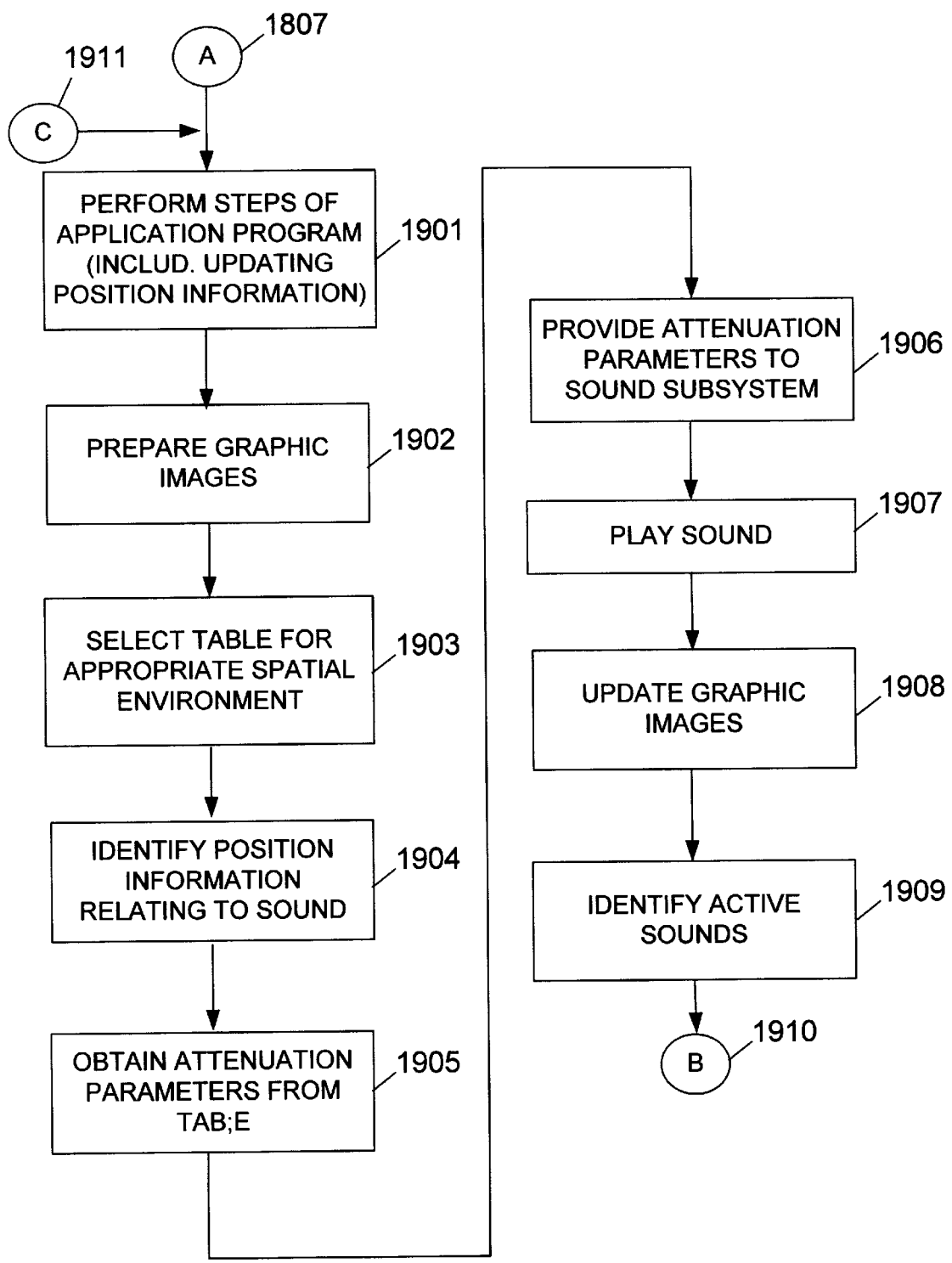
FIG. 19 is a flow diagram that is a continuation of the flow diagram illustrated in FIG. 18.

FIG. 19 is a flow diagram that is a continuation of the flow diagram illustrated in FIG. 18. The process continues from reference step A 1807 to step 1901. In step 1901, the process performs steps of a application program. These steps may include the updating of position information associated with objects defined in the application program. For example, the application program may be a computer game program in which a player interacts with various objects at various locations relative to the player. As the game is played, the relative locations of the various objects may be dynamically updated. If the objects are intended to be perceived as producing sounds the locations of the objects may be specified and updated so that the present invention may be able to cause the perception that the sounds are being produced at the corresponding locations.

From step 1901, the process continues to step 1902. In step 1902, the process prepares graphic images. The graphic images may be used to provide a graphic representation of the objects corresponding to the sound sources intended to be perceived at specific locations within the spatial environment. From step 1902, the process continues to step 1903. In step 1903, tables are selected for the appropriate spatial environments to be used for producing sounds. From step 1903, the process continues to step 1904. In step 1904, the process identifies position information relating to sounds to be produced. From step 1904, the process continues to step 1905. In step 1905, the process obtains attenuation parameters from the tables selected in 1903. From step 1905, the process continues to step 1906. In step 1906 the process provides the attenuation parameters to the sound subsystem.

From step 1906, the process continues in step 1907. In step 1907, the process plays the sounds using the sound subsystem. From step 1907, the process continues in step 1908. In step 1908, the process updates the graphic images. From step 1908, the process continues to step 1909. In step 1909, the process identifies active sounds. Active sounds are sounds that have not been completely produced. From step 1909, the process continues in reference step B 1910. Reference step 1910 provides a reference in other flow charts for steps not illustrated in FIG. 19.

Figure 20:
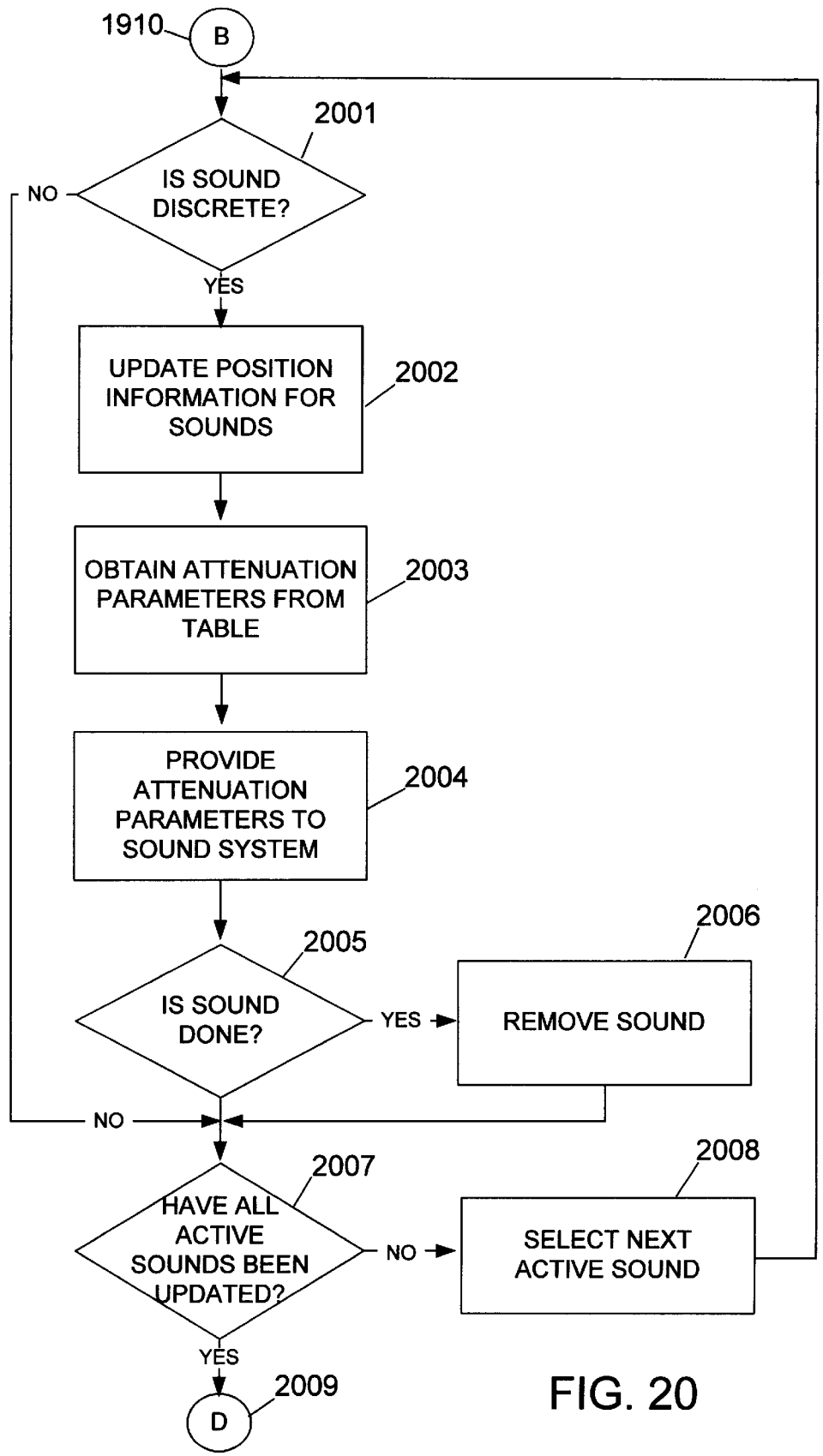
FIG. 20 is a flow diagram that is a continuation of the flow diagram illustrated in FIGS. 18 and 19.

FIG. 20 is a flow diagram that is a continuation of the flow diagram illustrated in FIGS. 18 and 19. The process continues in reference step B 1910. From reference step B 1910, the process continues to decision block 2001. In decision block 2001, a decision is made as to whether or not a sound is discrete. A sound is discrete if it is intended to be perceived as being localized in a particular region of the spatial environment. The present invention allows the particular region in which a sound is perceived as being localized to be changed over time. By changing the region in which a sound is perceived as being localized, a sensation of movement can be associated with the sound. Not all sounds produced must be discrete. Other sounds may be produced so as to be perceived as ambient or generalized in origin. If a sound is not discrete, the process continues at decision block 2007. If the sound is discrete, the process continues at step 2002. In step 2002, the process updates position information for the sounds being produced. The updated position information may be based upon position information and updated by the application program or may be updated without reliance on the application program, for example by extrapolating a updated position from previous positions.

From step 2002, the process continues in step 2003. In step 2003, the process obtains attenuation parameters from a table 38 corresponding to the region of the spatial environment indicated by the position information. From step 2003, the process continues in step 2004. In step 2004, the process provides attenuation parameters to the sound subsystem. If the sound system is currently playing a sound, the perceived position of the sound is dynamically updated based on the new attenuation parameters. From step 2004, the process continues to decision block 2005. In step 2005, a decision is made as to whether or not a sound is done playing. If the sound is done playing, the process continues from decision block 2005 to step 2006. In step 2006, the process removes the sound. From step 2006, the process continues at decision block 2007. If in decision block 2005, the sound is not done playing, the process continues in decision block 2007.

In decision block 2007, a decision is made as to whether all active sounds have been updated. If all active sounds have not been updated, the process continues from decision block 2007 to step 2008. In step 2008, the process selects the next active sound from step 2008, the process continues to decision block 2001. If in decision block 2007, all active sounds have been updated, the process continues to reference step D 2009. Reference step D 2009 provides a reference for steps in the process not shown on FIG. 20.

Figure 21:
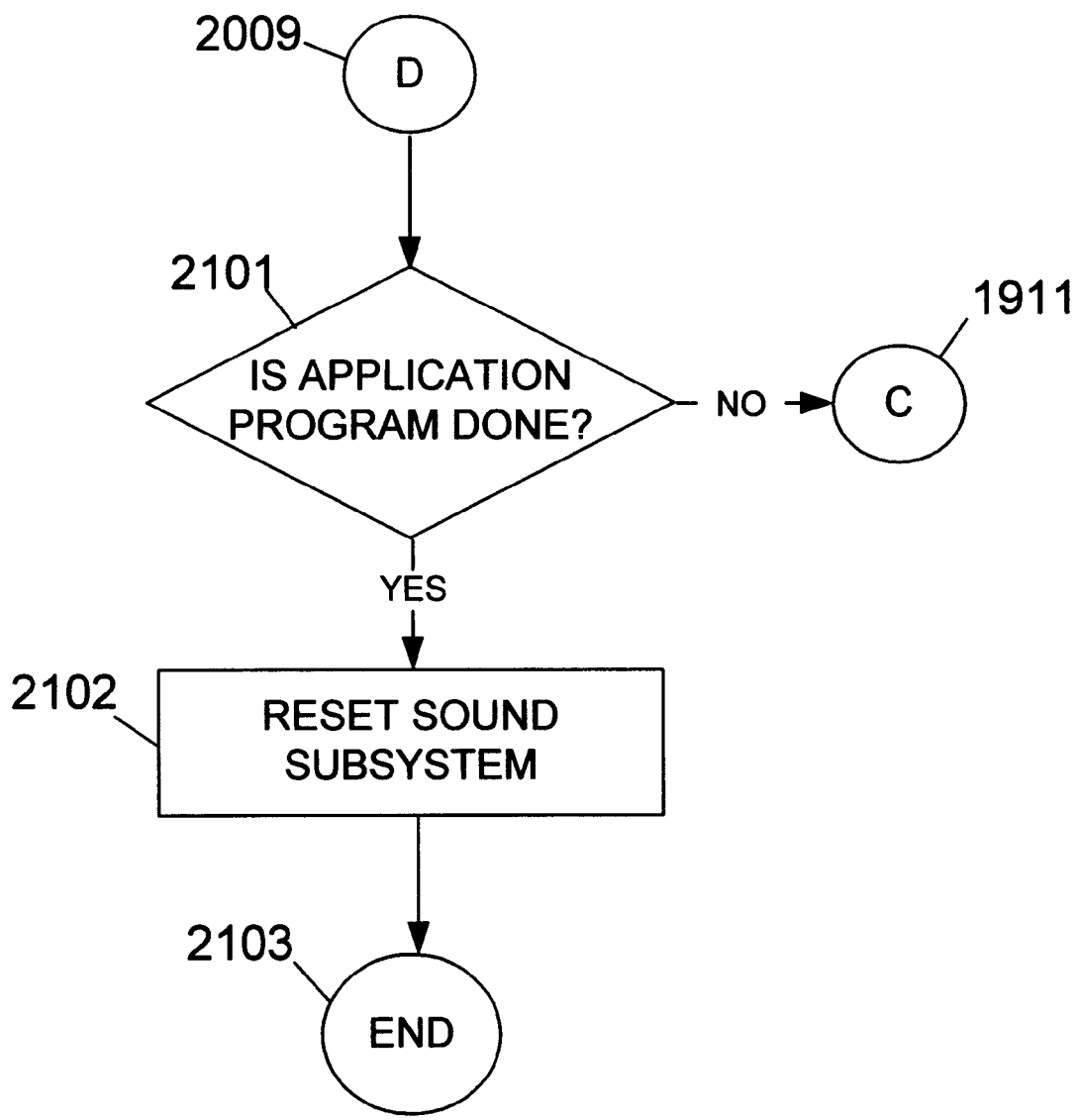
FIG. 21 is a flow diagram that is a continuation of the flow diagram illustrated in FIGS. 18, 19 and 20.

FIG. 21 is a flow diagram that is a continuation of the flow diagram illustrated in FIGS. 18, 19 and 20. The process continues in reference step D 2009. From reference step 2009, the process continues to decision block 2101. In decision block 2101, a decision is made as to whether the application program is done. If the application program is not done, the process proceeds to reference block C 1911. From reference block C 1911, the process continues in step 1901 of FIG. 19. If in decision block 2101, the application program is done the process resets the sound subsystem in step 2102. In step 2102, the process may reconfigure the sound system to be in the same state that is was in prior to step 1802 of FIG. 18. Alternatively, the process may reconfigure the sound subsystem in any known state. From step 2102, the process continues to step 2103. The process ends in step 2103.

Figure 22:
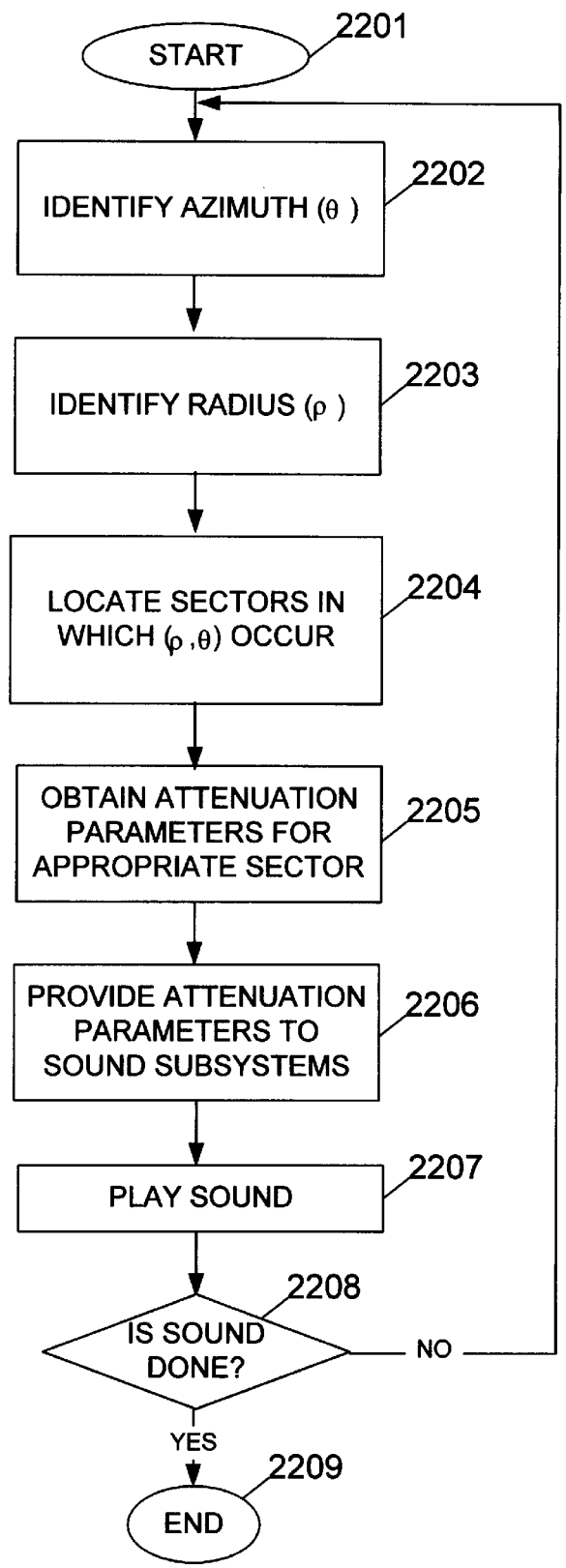
FIG. 22 is a flow diagram illustrating one embodiment of a process according to the present invention.

FIG. 22 is a flow diagram illustrating one embodiment of a process according to the present invention. The process begins in step 2201 and continues to step 2202. In step 2202, the process identifies an azimuth coordinate. From step 2202, the process continues to step 2203. In step 2203, the process identifies a radial component. From step 2203 the process continues in step 2204. In step 2204 the process locates a sector in which the azimuth radius identified in steps 2202 and 2203 occur. From step 2204, the process continues to step 2205. In step 2205 the process obtains attenuation parameters from table 38 for the appropriate sector indicated in step 2204. From step 2205, the process continues to step 2206. In step 2206, the process provides attenuation parameters to a sound subsystem. From step 2206, the process continues to step 2207. In step 2207, the process plays a sound using the sound subsystem. From step 2207, the process continues to decision block 2208. In decision block 2208, a decision is made as to whether the sound is done or not. If the sound is not done, the process continues from decision block 2208 to step 2202. If the sound is done, the process continues from decision block 2208 to step 2209. The process ends in step 2209.

Figure 23:
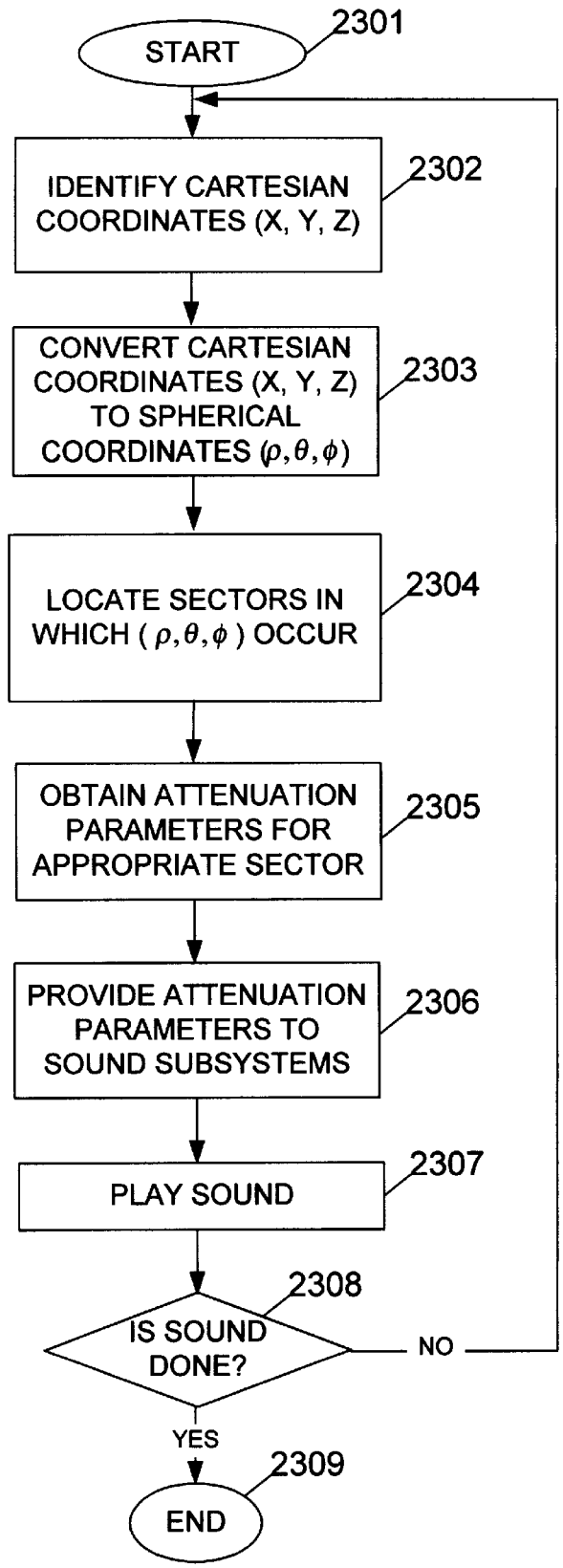
FIG. 23 is a flow diagram illustrating one embodiment of a process according to the present invention.

FIG. 23 is a flow diagram illustrating one embodiment of a process according to the present invention. The process begins in step 2301. From step 2301, the process continues to step 2302. In step 2302, the process identifies Cartesian coordinates at which a sound is desired to be perceived. From step 2302, the process continues to step 2303. In step 2303, the process converts Cartesian coordinates to spherical coordinates. From step 2303, the process continues to step 2304. In step 2304, the process locates the sector in which the designated spherical coordinates occur. From step 2304, the process continues to step 2305. In step 2305, the process obtains attenuation parameters for the indicated sector. From step 2305, the process continues to step 2306. In step 2306, the process provides attenuation parameters to the sound subsystem. From step 2306, the process continues to step 2307. In step 2307, the process plays the sound using the sound subsystem. From step 2307, the process continues to decision block 2308. In decision block 2308, a decision is made as to whether or not the sound is done. If the sound is not done, the process continues from decision block 2308 to step 2302. If the sound is done, the process continues from decision block 2308 to step 2309. The process ends in step 2309.

Figure 24:
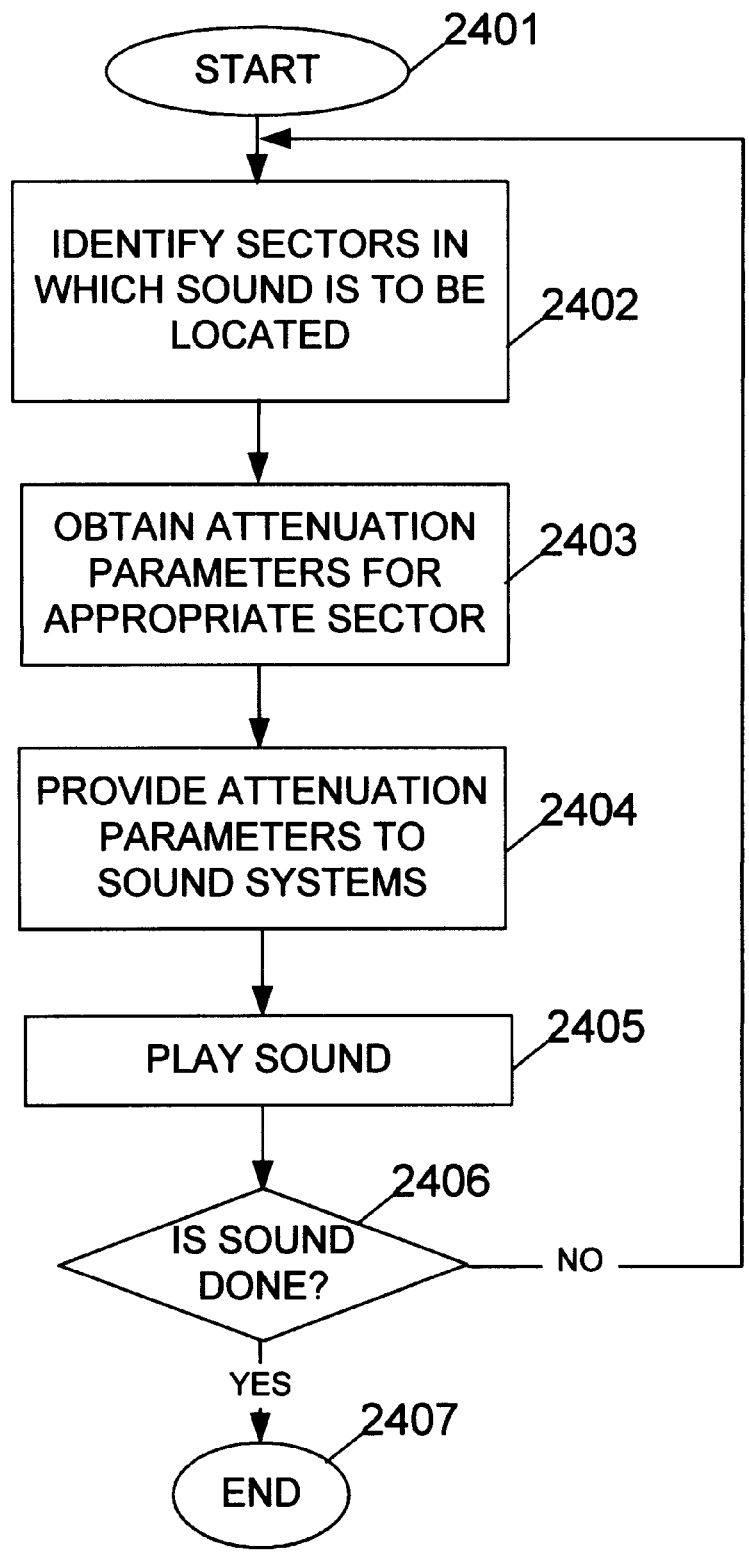
FIG. 24 is a flow diagram illustrating one embodiment of a process according to the present invention.

FIG. 24 is a flow diagram illustrating one embodiment of a process according to the present invention. The process begins in step 2401. From step 2401, the process continues to step 2402. In step 2402, the process identifies a sector in which a sound is desired to be perceived. From step 2402, the process continues to step 2403. In step 2403, the process obtains attenuation parameters for the indicated sector. From step 2403, the process continues to step 2404. In step 2404, the process provides attenuation parameters to the sound subsystem. From step 2404, the process continues to step 2405. In step 2405, the process plays the sound. From step 2405, the process continues in decision block 2406. In decision block 2406, a decision is made as to whether the sound is done or not. If the sound is not done, the process continues from decision block 2406 to step 2402. If the sound is done, the process continues from decision block 2406 to step 2407. The process ends in step 2407.

Figure 25:
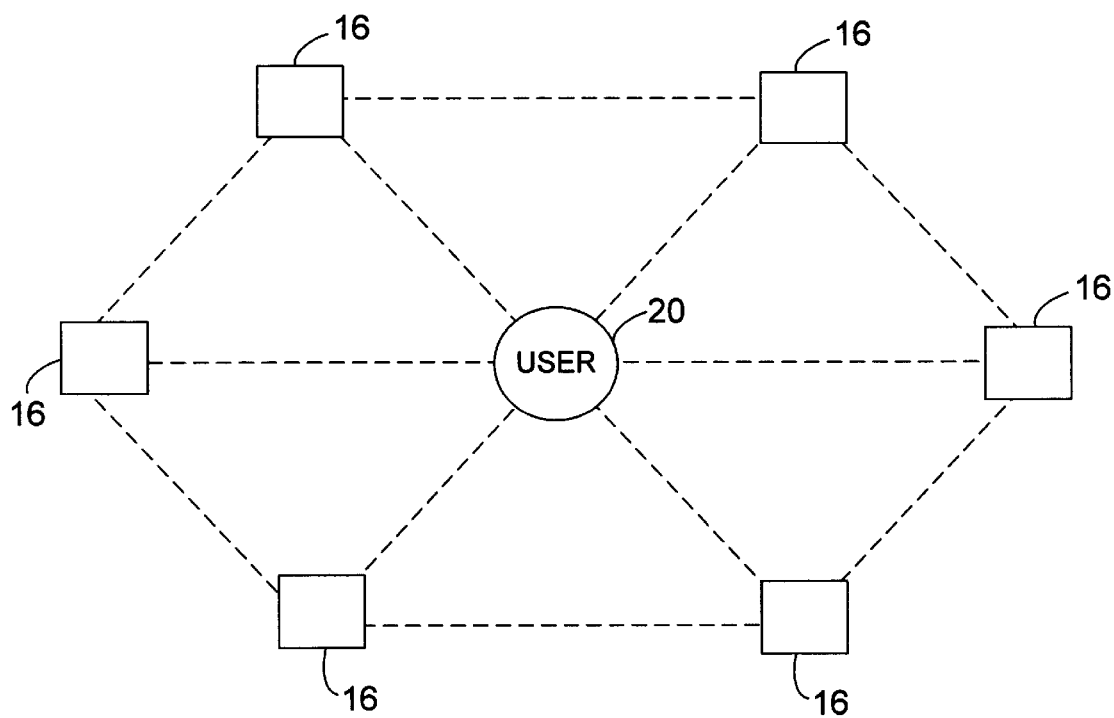
FIG. 25 is a plan view diagram illustrating placement of transducers 16 relative to user 20 for one embodiment of the present invention.

FIG. 25 is a plan view diagram illustrating placement of transducers 16 relative to user 20 for one embodiment of the present invention. This example illustrates six transducers 16 located at an equal distance and separated by equal angular increments from each other with respect to user 20. Alternatively, various numbers of transducers 16 may be located at various distances from user 20 and at various angular increments with respect to each other as viewed from the perspective of user 20.

Figure 26:
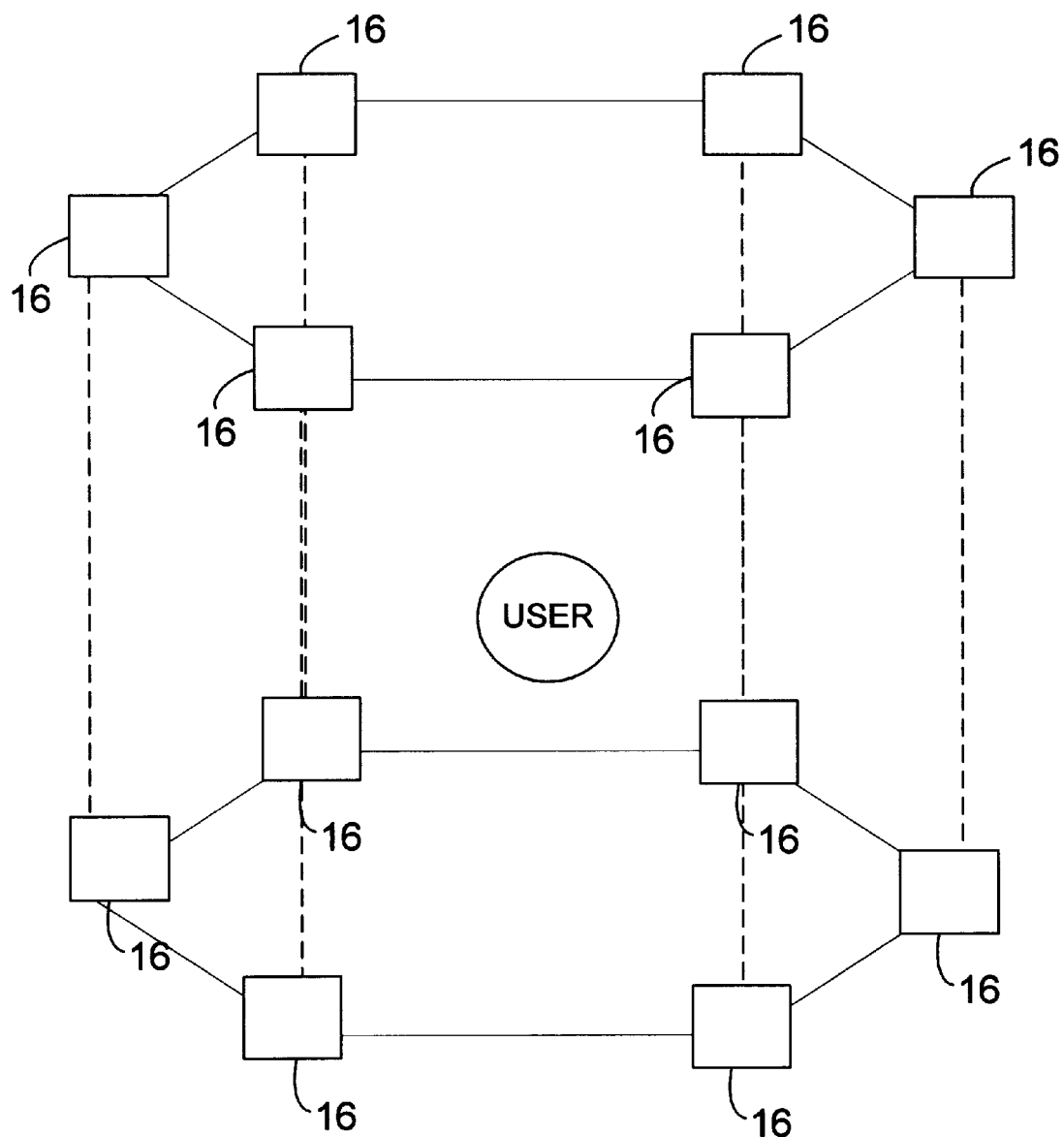
FIG. 26 is a perspective view diagram illustrating the placement of transducers 16 relative to user 20 for one embodiment of the present invention.

FIG. 26 is a perspective view diagram illustrating the placement of transducers 16 relative to user 20 for one embodiment of the present invention. In this embodiment, twelve transducers 16 are illustrated. Six of transducers 16 may be oriented as illustrated in FIG. 25, but with the plane in which these six transducers 16 lie being translated to a location above user 20. The other six of transducer 16 may also be configured as illustrated in FIG. 25, but with the plane in which these six transducers 16 lie being translated to a location below user 20. Thus, an imaginary octahedron having six sides, a top, and a bottom is formed with transducers 16 located at the vertices. User 20 is preferably located approximately central to the octahedron, although user 20 may be located elsewhere within the octahedron, outside the octahedron, or multiple users 20 may be located at various locations with respect to the octahedron. Moreover, transducer 16 may be oriented in a different three dimensional configuration providing adequate spatial diversity. Variations in the positioning of transducer 16 may be accommodated by modifying the attenuation parameters stored in tables 38.

Figure 27:
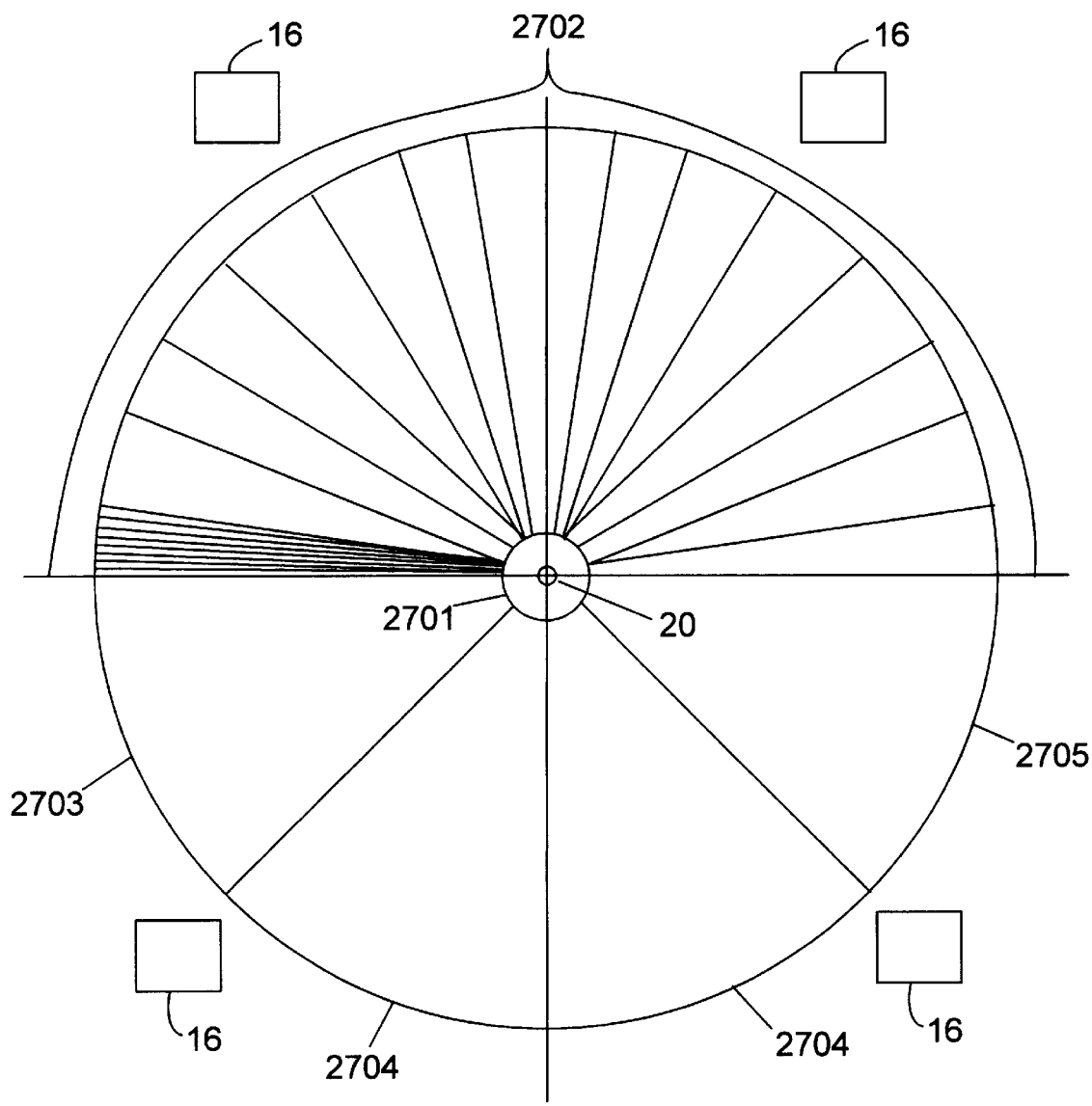
FIG. 27 is a plan view diagram illustrating an embodiment of the present invention.

FIG. 27 is a plan view diagram illustrating an embodiment of the present invention. The present invention may be practiced with spatial environments having varying spatial resolution over their area or volume. For example, a planar circular spatial environment may be defined to have 128 regions, with 124 spatial regions spanning an arc of 180° extending from directly left of user 20, across the front of user 20, to directly right of user 20. A fewer number of regions may be defined along the arc of 180° extending from directly left of user 20, behind user 20, to directly right of user 20. Another region may be a central circular region centered about the center of the spatial region and encompassing a circular area of limited radius proximate to the center of the spatial region.

In FIG. 27, region 2701 is a central circular region centered on the center of the circular spatial environment. Regions 2702 are a plurality of regions that span the 180° arc in front of user 20. Region 2703 is a single region spanning a 60° arc to the left and behind user 20. Region 2704 is a single region spanning a 60° arc directly behind user 20. Region 2705 is a single region spanning a 60° arc to the right and behind user 20. Transducers 16 are positioned peripheral to the spatial environment.

Figure 28:
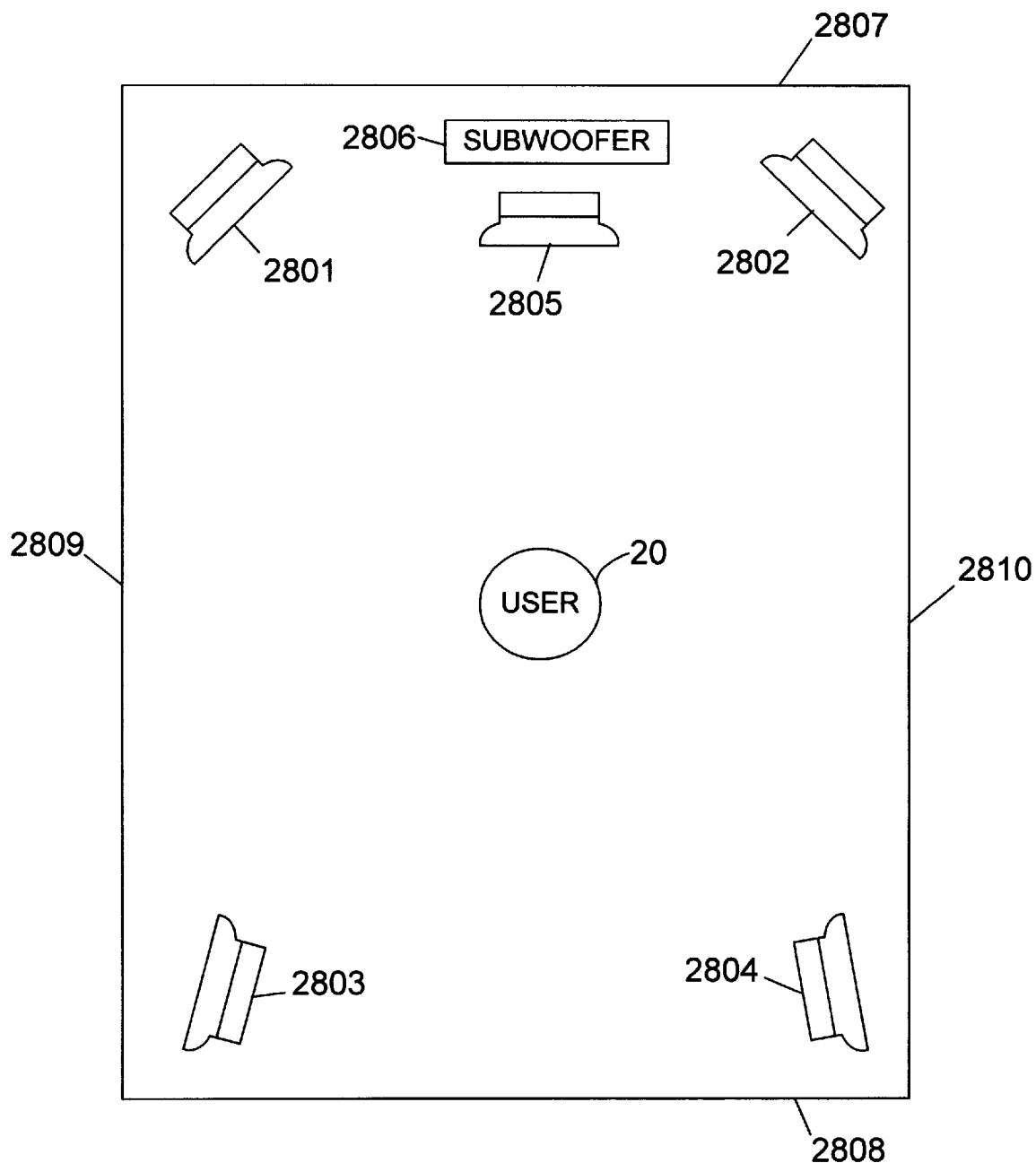
FIG. 28 is a plan diagram illustrating an example of a configuration of transducers 2801–2806 that may be used in conjunction with the present invention.

FIG. 28 is a plan diagram illustrating an example of a configuration of transducers 2801–2806 that may be used in conjunction with the present invention. User 20 is preferably approximately centrally located with respect to walls 2807–2810 of a room. Transducer 2801 is preferably located in proximity to a left front corner of the room. Transducer 2801 is preferably directed toward user 20. Transducer 2802 is preferably located in a right front corner of the room. Transducer 2802 is preferably directed toward user 20. Transducer 2803 is preferably located in a left rear corner of the room. Transducer 2803 may be directed toward user 20. Alternatively, transducer 2803 may be directed toward wall 2809 or 2808 to provide indirect sound to user 20. Transducer 2804 is preferably located in a right rear corner of the room. Transducer 2804 may be directed toward user 20. Alternatively, transducer 2804 may be directed toward wall 2810 or 2808 to provide indirect sound to user 20. Transducer 2805 and subwoofer 2806 are preferably located somewhere between transducers 2801 and 2802.

Such a configuration provides compatibility with sound processing techniques such as Dolby AC3, Prologic, and stereo PCM wave playback. For example, when stereo signals are provided to transducers 2801 and 2802, sound signals produced according to the present invention may be applied to transducers 2803 and 2804. Alternatively, sound signals produced according to the present invention may be applied to transducers 2801–2804, but with the sound signals provided to transducers 2801 and 2802 being muted.

A center dialogue sound signal may be provided to transducer 2805 and a low frequency sound signal may be provided to subwoofer 2806. Transducers 2801–2804 may be driven by sound signals produced according to the present invention, sound signals produced using a technique such as Dolby AC3 or Prologic, or a combination thereof. Thus, the present invention provides compatibility with existing sound processing techniques.

The present invention may also be practiced with other types of spatial environments. For example, a spatial environment may be defined to be compatible with the Musical Instrument Digital Interface (MIDI) standard. Information relating to such a spatial environment may be easily processed by and communicated between MIDI apparatus. Spatial environments may be defined over arbitrary areas and volumes in a plurality of dimensions. Spatial environments may be based on virtually any geometric shapes. Spatial environments may have any number of spatial regions of any size that may be defined in any configuration with respect to the spatial environment. Spatial regions may be equal in area or volume over the spatial environment or may differ in area or volume.

Spatial environments may be defined to correspond to any desired size. Spatial environments may also be scaled to accommodate a range of sizes. For example, a rectilinear spatial environment may be scaled to provide the psychoacoustic effects of a small room or of a football field. Thus, the range of perceived distance between regions of the spatial environment may be controlled. The sense of distance can be psychoacoustically enhanced by introducing a delay in the process by which the sound is produced in accordance with the distance from the perceived sound source to the user and the speed of sound desired to be simulated between the perceived sound source and user. The speed of sound can be selected according to realistic physical values, for example the speed of sound through air at room temperature, of other values that need not have any relation to actual physical phenomena.

The present invention may be used to specify minimum and maximum levels for sounds being produced. For example, when a sound is specified to be produced, a minimum level may be given for that sound and a maximum level may be given for that sound. When adjustment of the level of the sound is made according to adjustment parameters based on the location at which the sound is to be perceived, the adjusted level may be compared against the specified minimum and maximum levels for that sound. If the adjusted level is below the minimum level for that sound, the sound can be produced at the specified minimum level, the sound may be muted, or the production of that sound may be avoided. If the adjusted level is above the specified maximum level, the sound may be produced at the specified maximum level. The minimum and maximum levels may be set either dependently or independently for the level of each of the transducers or for the level provided by the action of all of the transducers together. The minimum and maximum levels may be specified in terms of sound pressure level, power, amplitude, sound intensity level, or any convenient acoustic or electrical parameter.

The present invention also allows an inner range and an outer range between the user and the perceived location of a sound source. If a location is specified at which the sound source is to be perceived that is closer than the inner range, the sound may be produced according to the adjustment parameters corresponding to a location no closer than the inner range. If a location is specified at which the sound source is to be perceived that is farther than the outer range, the sound may be produced according to parameters corresponding to a location no farther than the outer range, the sound may be muted, or production of the sound may be avoided.

Different types of sound may be produced according to the present invention. For example, a data file containing PCM sound data (such as a file of the type commonly referred to as a .WAV file), another type of PCM sound data source, an FM synthesis technique, a microphone, a MIDI-controlled wavetable synthesizer device, or some other sound signal source or sound data source may be used to supply the sound signal or sound data for the sound to be produced. Sound may also vary according to the perceived location they are intended to have. For example, sounds may be designated as discrete, static, or ambient. A discrete sound is intended to be perceived as originating from a sound source located in a region of a spatial environment. Different regions may be specified over time for the perceived sound source for a discrete sound. Thus, the perceived location of a perceived sound source for a discrete sound may be made to seem to move over time. When a discrete sound is desired, a starting location for its perceived sound source may be initially specified. As the sound is being produced, the location of the perceived sound source may be dynamically updated. The updated location of the perceived sound source may be determined based on position information received from an application program or using any other location updating technique. The location may be updated to correspond to changes of locations of visual objects in a graphic environment, for example while playing an interactive game.

A static sound is intended to be perceived as originating from a sound source located in a region of a spatial environment that does not change over time. The perceived location of a static sound source is not updated over time, thereby reducing the computational effort required to produce a static sound. Thus, a static sound source is perceived as remaining stationary over time. An ambient sound is intended to be perceived as originating from a diffuse sound source that may be internal or external to the defined spatial environment. Since the ambient sound is intended to be perceived as originating from a diffuse sound source, particular position information need not be provided for ambient sounds. Ambient sounds may be produced by driving all transducers at equal levels or with signals that psychoacoustically diffuse the perceived sound source. Different combinations of these types of sound may be combined simultaneously to provide the overall effect desired.

Since the present invention may be practiced with various spatial environments, transducer configurations, and user locations, the present invention also provides a technique for calibrating system performance. For calibration, the user should preferably be located at the center of the spatial environment for which calibration is being performed. Alternatively, if the user is not expected to be at the center when using the invention, the user may be located at the location at which the user is expected to be during sound production according to the invention. A sound should be produced with a perceived sound source located at a specified location, preferably the center or central region. The user is instructed to adjust the gain of circuits driving the individual transducers until the sound is perceived as originating from the specified location. Once the relative outputs of the transducers are adjusted, the absolute total output of the transducers may be adjusted by adjusting the gain of circuits driving the transducers while maintaining the same relative relationships between the outputs of the transducers. Thus, the transducers may be calibrated relative to each other as well as to an absolute reference, for example a given decibel value of sound pressure level. When configuring the transducers and the circuits driving them, care should be taken to maintain proper phasing of the circuits and transducers.

The present invention may be practiced with transducers that are wired to the circuits driving them, or wireless transducers may be used. For example, wireless speakers using infrared, radio frequency (RF), or microwave links to the driving circuits may be used. The present invention may also be practiced with a subwoofer channel for producing low frequency sounds. Since it is difficult to perceive direction and position of low frequency sound sources, the subwoofer channel may be used to drive one or more subwoofer transducers that may be separate from and independent of transducers used to produce sounds for which a specific direction or position is intended to be perceived.

The present invention may be practiced as a system integrating sound, video display or other visual display, and user input. The invention may be used in conjunction with a computer, an arcade game, a set-top box, or with other apparatus.

Thus, a method and apparatus for providing sound in a spatial environment has been provided.

What is claimed is:

1. A method for producing sound in a spatial environment comprising the steps of:
   defining said spatial environment to include a plurality of spatial regions;
   generating a table comprising adjustment parameters indexed to said plurality of spatial regions;
   specifying a spatial region from among said plurality of spatial regions;
   obtaining adjustment parameters corresponding to said spatial region from said table;
   adjusting relative amplitudes of a plurality of signals representative of said sound according to said adjustment parameters;
   applying said plurality of signals to a plurality of spatially diverse transducers.

2. The method of claim 1 further comprising steps of:
   specifying a second spatial region from among said plurality of spatial regions;
   obtaining second adjustment parameters corresponding to said second spatial region;
   adjusting second relative amplitudes of a plurality of second signals representative of a second sound according to said second adjustment parameters;
   applying said plurality of second signals to said plurality of spatially diverse transducers.

3. The method of claim 2 wherein said step of generating said table comprising said adjustment parameters indexed to said plurality of spatial regions comprises a step of:
   generating a plurality of tables comprising adjustment parameters indexed to said plurality of spatial regions.

4. The method of claim 1 wherein said step of generating said table comprising said adjustment parameters indexed to said plurality of spatial regions comprises a step of:
   providing said adjustment parameters for each of said plurality of spatially diverse transducers for each of said plurality of spatial regions.

5. The method of claim 4 wherein said step of specifying a spatial region from among said plurality of spatial regions comprises a step of:
   receiving an input signal based on user actions.

6. The method of claim 1 including the step of adjusting relative amplitudes of a plurality of signals representative of said sound according to said adjustment parameters corresponding to more than two transducers.

7. The method of claim 1 including the step of defining said spatial environment to include a plurality of spatial regions in three-dimensional space and generating a table comprising adjustment parameters indexed to said plurality of spatial regions in said three-dimensional space.

8. The method of claim 1 including the step of applying said plurality of signals to more than two spatially diverse transducers.

9. The method of claim 1 wherein said plurality of signals are applied to three-dimensionally spatially diverse transducers.

10. The method of claim 1 including the step of adjusting relative amplitudes of at least six signals representative of said sound according to said adjustment parameters.

11. The method of claim 10 including the step of applying at least one of said signals to a low frequency sound reproducing transducer, applying at least one of said signals to a center channel sound reproducing transducer, applying at least one of said signals to a left signal sound reproducing transducer, and applying at least one of said signals to a right signal sound reproducing transducer.

12. An article of manufacture comprising:
   a computer usable medium having computer readable program code embodied therein for causing a sound to be sensible as originating from a sound source located in a spatial region of a spatial environment, said computer readable program code in said article of manufacture comprising:
   computer readable program code configured to cause said computer to generate a table comprising adjustment parameters indexed to a plurality of spatial regions in said spatial environment;
   computer readable program code configured to cause said computer to obtain adjustment parameters corresponding to said spatial region from said table; and
   computer readable program code configured to cause said computer to adjust relative amplitudes of a plurality of signals representative of said sound according to said adjustment parameters.

13. Said article of manufacture according to claim 12 further comprising:
   computer readable program code configured to cause said computer to apply said plurality of signals to a plurality of spatially diverse transducers.

14. Said article of manufacture according to claim 13 further comprising:
   computer readable program code configured to cause said computer to specify a spatial region from among said plurality of spatial regions.

15. Said article of manufacture according to claim 13 further comprising:
   computer readable program code configured to cause said computer to calculate a spatial region from among said plurality of spatial regions based on a set of coordinates representative of a location within said spatial region.

16. Said article of manufacture according to claim 13 further comprising:
   computer readable program code configured to cause said computer to specify a spatial region from among said plurality of spatial regions based on an input signal received in response to a user action.

17. Said article of manufacture according to claim 13 further comprising:
computer readable program code configured to cause said computer to maintain a known correspondence between said adjustment parameters and said plurality of spatially diverse transducers.

18. Said article of manufacture according to claim 13 further comprising:
computer readable program code configured to cause said computer to obtain second adjustment parameters corresponding to a second spatial region from said table; and
computer readable program code configured to cause said computer to adjust second relative amplitudes of a plurality of second signals representative of a second sound according to said second adjustment parameters.

19. Said article of manufacture according to claim 13 further comprising:
computer readable program code configured to cause said computer to generate a second table comprising said second adjustment parameters indexed to a plurality of second spatial regions in said spatial environment.

20. The article of manufacture of claim 12 wherein said computer readable code is configured to cause said computer to adjust relative amplitudes of more than two signals representative of said sound according to said adjustment parameters.

21. The article of manufacture of claim 12 wherein said computer readable program code is configured to cause said computer to generate a table comprising adjustment parameters indexed to a plurality of spatial regions in three-dimensional space.

22. A system for producing a sound in a spatial environment comprising:
more than two transducers for producing said sound;
a table containing parameters, said parameters for controlling the relative amplitudes of each of said transducers; wherein said table is indexed according to a spatial region defined within said spatial environment; and
a gain control coupled to said transducers for adjusting the relative amplitudes of signals provided to said more than two transducers based on said parameters, such that amplitude of said sound produced at each of said more than two transducers is determined by a parameter associated with said each transducer.

23. The system of claim 22 wherein said parameters comprise adjustment values for said signals for each of said transducers.

24. The system of claim 23 wherein a total power of said signals provided to said transducers does not vary as a function of a location of said spatial region within said spatial environment.

25. The system of claim 23 wherein a total power of said signals provided to said transducers generally increases as a proximity of said spatial region to a central region of said spatial environment generally increases.

26. The system of claim 23 wherein a total power of said signals provided to said transducers generally decreases as a proximity of said spatial region to a central region of said spatial environment generally increases.

27. The system of claim 23 herein said spatial region is selected from a plurality of defined spatial regions in response to an input signal responsive to user action.

28. The system of claim 23 wherein a plurality of sounds are produced simultaneously using different of said parameters.

29. The system of claim 28 wherein a plurality of tables are used to produce said plurality of sounds.

30. The system of claim 22 wherein there are at least four transducers.

31. The system of claim 30 wherein there are six transducers, at least one of said transducers arranged to generate center channel sound and at least one of said transducers arranged to generate primarily only a low frequency sound signal.

32. The system of claim 22 wherein said parameters comprise amplitude adjustment values for said signals for each of said transducers based on a position of said transducers in three-dimensional space.

33. The system of claim 32 wherein said more than two transducers are positioned in other than a single horizontal plane.

34. A method for producing a sound in a spatial environment comprising steps of:
generating a signal representative of said sound;
generating an amplitude-adjusted signal for each of more than two transducers according to a region within said spatial environment from which said sound is to be perceived as originating;
applying said amplitude-adjusted signals to said transducers, such that amplitude of said sound produced at each of said more than two transducers is determined by said amplitude adjusted signal associated with said each transducer; and
providing a table comprising a plurality of adjustment parameters for use in said step of adjusting said amplitude by indexing said table according to a plurality of regions within said spatial environment.

35. The method of claim 34 wherein said step of providing a table comprises a step of:
organizing said plurality of adjustment parameters so as to exhibit a known correspondence with said plurality of transducers.

36. The method of claim 35 further comprising a step of:
calculating said region based on a set of coordinates representative of a location within said region.

37. The method of claim 36 further comprising steps of:
generating a second signal representative of a second sound;
adjusting a second amplitude of said second signal for each of said plurality of transducers according to a second region within said spatial environment from which said second sound is to be perceived as originating.

38. The method of claim 34 wherein said step of adjusting said amplitude of said signal comprises a step of:
adjusting said amplitude of said signal based on an input signal received in response to a user action.

39. The method of claim 34 wherein said step of adjusting said amplitude of said signal comprises a step of:
adjusting said amplitude of said signal for each of said plurality of transducers such that a total power applied to said plurality of transducers is independent of said region within said spatial environment.

40. The method of claim 34 wherein said step of adjusting said amplitude of said signal comprises a step of:
adjusting said amplitude of said signal for each of said plurality of transducers such that a total power applied to said plurality of transducers is greater as a proximity of said region to a central region is closer.

41. The method of claim 34 wherein said step of adjusting said amplitude of said signal comprises a step of:
adjusting said amplitude of said signal for each of said plurality of transducers such that a total power applied to said plurality of transducers is lesser as a proximity of said region to a central region is closer.

42. The method of claim 34 including the step of generating an amplitude-adjusted signal for each of at least four transducers.

43. The method of claim 34 including the step of generating an amplitude-adjusted signal for application to a left-front transducer, a left-rear transducer, a right-front transducer, a right-rear transducer, a center transducer and a sub-woofer type transducer.

44. The method of claim 34 wherein said amplitude-adjusted signal is generated according to a region with a three-dimensional spatial environment.

* * * * *